US012032309B2

(12) United States Patent
Mitsumata et al.

(10) Patent No.: US 12,032,309 B2
(45) Date of Patent: Jul. 9, 2024

(54) IMAGE FORMING APPARATUS HAVING A STACKING PORTION WITH FIRST AND SECOND SURFACES

(71) Applicant: CANON KABUSHIKI KAISHA, Tokyo (JP)

(72) Inventors: Akinori Mitsumata, Tokyo (JP); Takeo Kawanami, Kanagawa (JP); Masaaki Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/855,973

(22) Filed: Jul. 1, 2022

(65) Prior Publication Data

US 2022/0334516 A1 Oct. 20, 2022

Related U.S. Application Data

(63) Continuation of application No. 17/156,719, filed on Jan. 25, 2021, now Pat. No. 11,402,767.

(30) Foreign Application Priority Data

Feb. 7, 2020 (JP) ................................ 2020-020198
Apr. 10, 2020 (JP) ................................ 2020-070709

(51) Int. Cl.
*G03G 15/08* (2006.01)
*G03G 15/00* (2006.01)
*G03G 21/16* (2006.01)

(52) U.S. Cl.
CPC ..... *G03G 15/0877* (2013.01); *G03G 15/0865* (2013.01); *G03G 15/6552* (2013.01);
(Continued)

(58) Field of Classification Search
CPC ........... G03G 15/0877; G03G 15/6573; G03G 15/0865; G03G 2215/0636; G03G 21/18;
(Continued)

(56) References Cited

U.S. PATENT DOCUMENTS 5,141,790 A 8/1992 Calhoun et al.
5,200,781 A * 4/1993 Hata ................. G03G 21/1628 399/125

(Continued)

FOREIGN PATENT DOCUMENTS

CN 1379292 A 11/2002
CN 2606378 Y 3/2004

(Continued)

OTHER PUBLICATIONS

Chinese Office Action dated Nov. 18, 2023, in Chinese Patent Application No. 202110160656.X.

(Continued)

*Primary Examiner* — Arlene Heredia
*Assistant Examiner* — Laura Roth
(74) *Attorney, Agent, or Firm* — VENABLE LLP

(57) ABSTRACT

An image forming apparatus includes a stacking portion which is a part of a top surface of an exterior of the image forming apparatus. The stacking portion is positioned downstream of a discharging outlet in a discharging direction and on which the recording material discharged from the discharging outlet is stacked and includes a first surface on which the recording material discharged from the discharging outlet is stacked, and a second surface which is positioned outward with respect to the discharging outlet in a width direction orthogonal to the discharging direction. A supplying inlet is located below the first surface, wherein a downstream end of the first surface is positioned downstream of a downstream end of the second surface in the (Continued)

discharging direction, and wherein the first surface is rotatable to expose the supplying inlet.

11 Claims, 41 Drawing Sheets

(52) U.S. Cl.
CPC ..... *G03G 15/6573* (2013.01); *G03G 21/1633* (2013.01); *G03G 15/0874* (2013.01); *G03G 2215/00421* (2013.01); *G03G 2215/0636* (2013.01)

(58) Field of Classification Search
CPC ..... G03G 15/6552; G03G 2215/00421; G03G 15/0874; G03G 2221/169; G03G 21/1633
See application file for complete search history.

(56) References Cited

U.S. PATENT DOCUMENTS

| | | | | |
|---|---|---|---|---|
| 5,337,134 | A * | 8/1994 | Sato | G03G 15/234 271/291 |
| 6,154,623 | A | 11/2000 | Suzuki et al. | |
| 6,212,338 | B1 | 4/2001 | Hagihara et al. | |
| 6,879,789 | B2 | 4/2005 | Yamada et al. | |
| 6,920,298 | B2 | 7/2005 | Yamada et al. | |
| 7,127,193 | B2 | 10/2006 | Yamada et al. | |
| 7,246,963 | B2 | 7/2007 | Nishimura | |
| 7,469,113 | B2 | 12/2008 | Yamada et al. | |
| 7,647,012 | B2 | 1/2010 | Yamada et al. | |
| 7,881,645 | B2 | 2/2011 | Yamada et al. | |
| 7,890,027 | B2 | 2/2011 | Yamada et al. | |
| 7,965,963 | B2 | 6/2011 | Yamada et al. | |
| 7,970,321 | B2 | 6/2011 | Yamada et al. | |
| 8,045,901 | B2 | 10/2011 | Yamada et al. | |
| 8,290,394 | B2 | 10/2012 | Yamada et al. | |
| 8,909,094 | B2 | 12/2014 | Yamada et al. | |
| 9,046,820 | B1 | 6/2015 | Yamada et al. | |
| 10,061,263 | B2 | 8/2018 | Kawanami | |
| 10,429,788 | B2 | 10/2019 | Morishita et al. | |
| 10,488,810 | B2 | 11/2019 | Kawanami | |
| 2008/0038023 | A1 | 2/2008 | Eto | |
| 2008/0290590 | A1* | 11/2008 | Mizuguchi | G03G 15/6552 271/207 |
| 2009/0060575 | A1* | 3/2009 | Sato | G03G 21/1628 399/151 |
| 2014/0103603 | A1* | 4/2014 | Horita | B65H 1/00 271/171 |
| 2016/0299455 | A1 | 10/2016 | Tsuritani et al. | |
| 2018/0210370 | A1* | 7/2018 | Wakimoto | G03G 21/1864 |
| 2020/0019112 | A1 | 1/2020 | Ito | |
| 2021/0318642 | A1 | 10/2021 | Koguchi et al. | |
| 2021/0318645 | A1 | 10/2021 | Oba et al. | |

FOREIGN PATENT DOCUMENTS

| | | | |
|---|---|---|---|
| JP | H01-147565 | A | 6/1989 |
| JP | H01-173677 | A | 7/1989 |
| JP | H01-183677 | A | 7/1989 |
| JP | H06-222667 | A | 8/1994 |
| JP | H07-261534 | A | 10/1995 |
| JP | H07-295355 | A | 11/1995 |
| JP | H08-30084 | A | 2/1996 |
| JP | H09-006111 | A | 1/1997 |
| JP | H09-106123 | A | 4/1997 |
| JP | 2005-195704 | A | 7/2005 |
| JP | 2015-197626 | A | 11/2015 |
| JP | 2018-072611 | A | 5/2018 |
| JP | 2020-154299 | A | 9/2020 |

OTHER PUBLICATIONS

Japanese Office Action dated Jan. 30, 2023, in related Japanese Patent Application No. 2020-070709.

* cited by examiner

IMAGE FORMING APPARATUS HAVING A STACKING PORTION WITH FIRST AND SECOND SURFACES

This application is a continuation of application Ser. No. 17/156,719, filed Jan. 25, 2021.

BACKGROUND OF THE INVENTION

Field of the Invention

The present invention relates to an image forming apparatus that forms images on recording materials.

Description of the Related Art

In general, an electrophotographic image-forming apparatus forms an image by transferring a toner image formed on the surface of a photosensitive drum, onto a transfer material that serves as a transfer medium. For supplying developer, a known system, such as a process cartridge system or a toner supply system, is used. In the process cartridge system, a photosensitive drum and a developer container are integrated with each other into a process cartridge, and the process cartridge is replaced with a new one when the developer runs out.

In the toner supply system, when the toner runs out, new toner is supplied to a developer container. Japanese Patent Application Publication No. H08-30084 proposes a one-component developing apparatus with the toner supply system. In the developing apparatus, a toner supplying box that can supply toner is connected to a toner conveyance path, along which the toner is conveyed. The toner stored in the toner supplying box is conveyed toward the toner conveyance path by a conveyance screw.

In recent years, an image forming apparatus is required by users, to have various systems including the above-described process cartridge system and the toner supply system, and to be used in various manners.

SUMMARY OF THE INVENTION

According to a first aspect of the present invention, an image forming apparatus to which a supplying container that stores developer is configured to be detachably attached and which forms a toner image on a recording material, includes a developer container including a storage portion and a supplying inlet, the storage portion being configured to store developer, the developer being supplied from the supplying container to the storage portion through the supplying inlet, a discharging portion configured to discharge a recording material, onto which a toner image has been transferred, in a discharging direction, a discharging outlet through which the recording material is discharged to an outside of the image forming apparatus by the discharging portion, and a stacking portion which is a part of a top surface of an exterior of the image forming apparatus, the stacking portion being positioned downstream of the discharging outlet in the discharging direction and on which the recording material discharged from the discharging outlet is stacked. The stacking portion includes a first area on which the recording material discharged from the discharging outlet is stacked, and a second area which is positioned outward with respect to the discharging outlet in a width direction orthogonal to the discharging direction. The supplying inlet is disposed at a position corresponding to the first area in the width direction. At least a part of the second area is positioned below the discharging outlet.

According to a second aspect of the present invention, an image forming apparatus, to which a supplying container that stores developer is configured to be detachably attached and which forms a toner image on a recording material, includes a discharging portion configured to discharge a recording material, onto which a toner image has been transferred, in a discharging direction, a discharging outlet through which the recording material is discharged to an outside of the image forming apparatus by the discharging portion, a stacking surface which is a part of a top surface of an exterior of the image forming apparatus, and on which the recording material discharged from the discharging outlet is stacked, a developer container including a storage portion and a supplying inlet, the storage portion being configured to store developer, the developer being supplied from the supplying container to the storage portion through the supplying inlet, the supplying inlet being positioned at a position corresponding to the stacking surface in a width direction orthogonal to the discharging direction, and a moving member positioned downstream of the discharging outlet in the discharging direction and outward with respect to the stacking surface in the width direction, and configured to constitute a part of the exterior of the image forming apparatus and move in a direction separating away from the supplying inlet.

Further features of the present invention will become apparent from the following description of exemplary embodiments with reference to the attached drawings.

DESCRIPTION OF THE EMBODIMENTS

Hereinafter, some embodiments of the present invention will be described, as examples, with reference to the accompanying drawings.

First Embodiment

Figure 1:
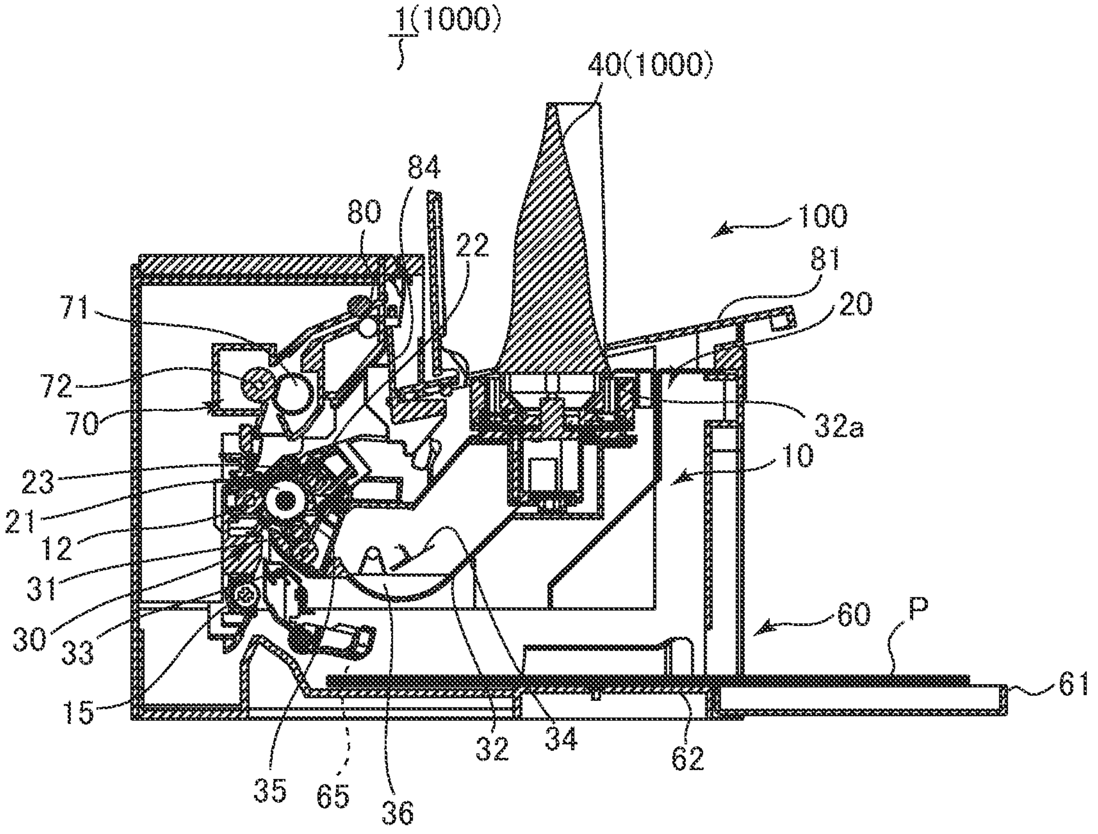
FIG. 1 is a cross-sectional view illustrating an image forming apparatus of a first embodiment.

FIG. 1 is a schematic diagram illustrating a configuration of an image forming apparatus 1 of a first embodiment. The image forming apparatus 1 is a monochrome printer that forms an image on a recording material in accordance with image information sent from an external device. The recording material may be of a variety of sheets having different materials. For example, the recording material may be a paper sheet such as a plain paper sheet or a thick paper sheet, a plastic film used as a sheet for overhead projectors, a specialized shape of sheet such as an envelope or an index paper sheet, or a cloth sheet.

Overall Configuration

Figure 2:
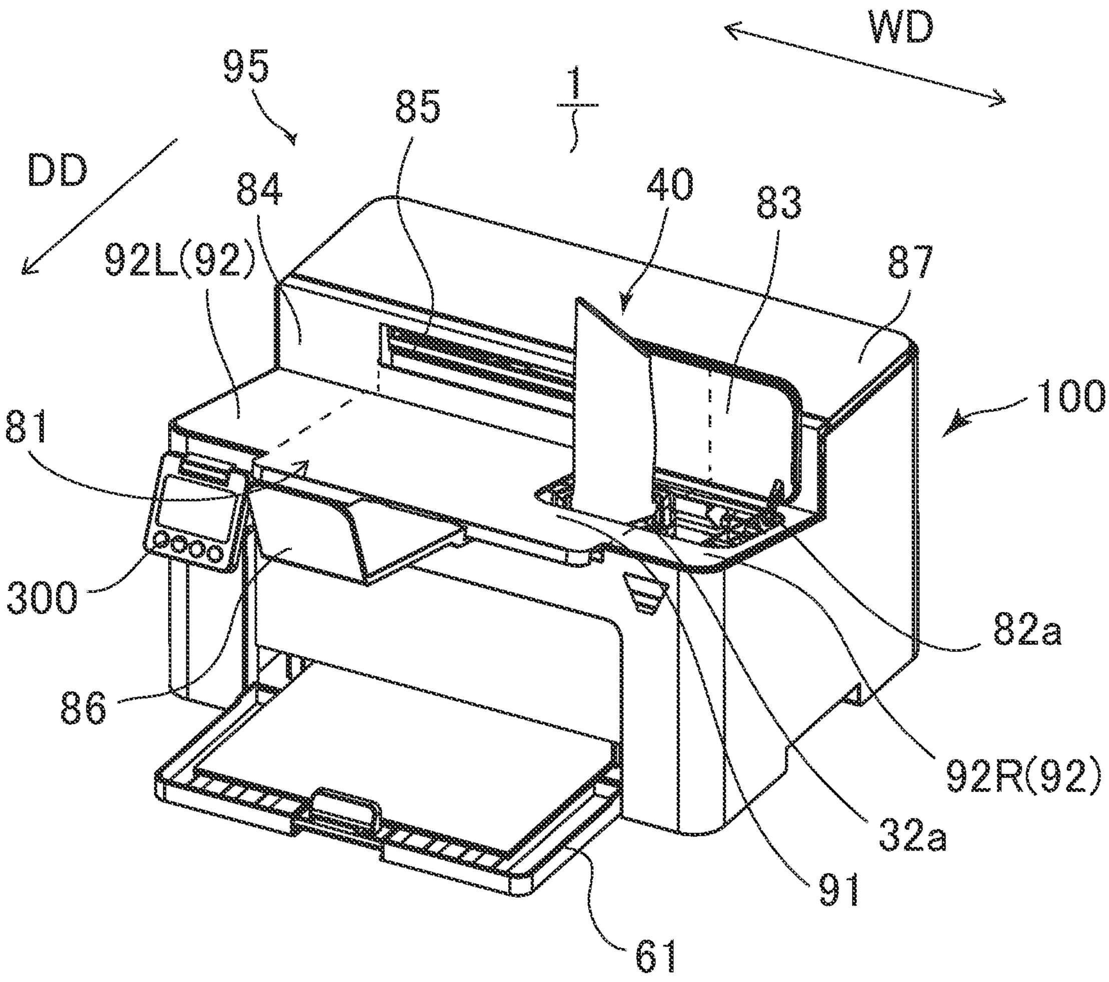
FIG. 2 is a perspective view illustrating the image forming apparatus.

As illustrated in FIGS. 1 and 2, the image forming apparatus 1 includes a printer body 100 and an operation unit 300. The printer body 100 serves as an apparatus body, and the operation unit 300 is attached to an exterior surface of the printer body 100. The printer body 100 includes an image forming portion 10, a feeding portion 60, a fixing portion 70, and a discharging roller pair 80. The image forming portion 10 forms a toner image on a recording material; the feeding portion 60 feeds the recording material to the image forming portion 10; and the fixing portion 70 fixes the toner image formed by the image forming portion 10, to the recording material.

The image forming portion 10 includes a scanner unit (not illustrated), an electrophotographic process cartridge 20, and a transfer roller 12 that transfers a toner image formed on a photosensitive drum 21 of the process cartridge 20, onto a recording material. The process cartridge 20 includes the photosensitive drum 21, a charging roller 22, a pre-exposure apparatus 23, and a developing apparatus 30 that includes a developing roller 31. The charging roller 22, the pre-exposure apparatus 23, and the developing apparatus 30 are disposed around the photosensitive drum 21.

The photosensitive drum 21 is a cylindrical photosensitive member. The photosensitive drum 21 of the present embodiment includes a drum-like base body, and a photosensitive layer formed on the base body. The base body is made of aluminum, and the photosensitive layer is made of organic photoreceptor that is negatively charged. The photosensitive drum 21, which is an image bearing member, is driven and rotated by a motor in a predetermined direction (i.e., clockwise direction in FIG. 1), at a predetermined process speed.

The charging roller 22 is in contact with the photosensitive drum 21 at a predetermined pressure contact force, and forms a charging portion. In addition, the charging roller 22 is applied with a desired charging voltage by a charging high-voltage power supply, and uniformly charges the surface of the photosensitive drum 21 at a predetermined electric potential. In the present embodiment, the photosensitive drum 21 is negatively charged by the charging roller 22. The pre-exposure apparatus 23 removes the electric potential of a portion of the surface of the photosensitive drum 21 before the portion enters the charging portion, for causing the charging roller 22 to stably discharge electricity in the charging portion.

The scanner unit (not illustrated), which serves as an exposing portion, generates a laser beam in accordance with image information sent from an external device, and emits the laser beam to the photosensitive drum 21 via a polygon mirror for scanning and exposing the surface of the photosensitive drum 21. With this exposure, an electrostatic latent image is formed on the surface of the photosensitive drum 21 in accordance with the image information. Note that the scanner unit is not limited to the laser scanner apparatus. For example, the scanner unit may be an LED exposure apparatus including an LED array, in which a plurality of LEDs is arrayed along a longitudinal direction of the photosensitive drum 21.

The developing apparatus 30 includes the developing roller 31, a developer container 32, and a supplying roller 33. The developing roller 31 serves as a developer bearing member that bears developer; the developer container 32 is a frame of the developing apparatus 30; and the supplying roller 33 supplies the developer to the developing roller 31. The developing roller 31 and the supplying roller 33 are rotatably supported by the developer container 32. The developing roller 31 is disposed in an opening portion of the developer container 32 so as to face the photosensitive drum 21. The supplying roller 33 is rotatably in contact with the developing roller 31. Thus, the toner stored in the developer container 32 and serving as the developer is applied onto the surface of the developing roller 31 by the supplying roller 33. Note that the supplying roller 33 may not be disposed if the toner can be sufficiently supplied to the developing roller 31 without using the supplying roller 33.

The developing apparatus 30 of the present embodiment uses a contact developing system as a developing system. Specifically, the toner layer borne by the developing roller 31 is in contact with the photosensitive drum 21 in a developing portion (developing area) in which the photosensitive drum 21 and the developing roller 31 face each other. The developing roller 31 is applied with a developing voltage by a developing high-voltage power supply. Thus, the toner borne by the developing roller 31 is moved from the developing roller 31 to the surface of the photosensitive drum 21 by the developing voltage in accordance with the electric potential distribution of the surface of the photosensitive drum 21. As a result, the electrostatic latent image is developed into a toner image. Note that the present embodiment uses a reversal development method. Specifically, since the photosensitive drum 21 is charged in the charging process and exposed in the exposure process, the amount of electric charge of an exposed area of the surface of the photosensitive drum 21 decreases. The toner sticks to the exposed area, so that a toner image is formed on the photosensitive drum 21.

In the present embodiment, the toner has a particle size of 6 μm, and the normal charging polarity of the toner is negative polarity. As one example, the toner of the present embodiment is polymerized toner produced by using the polymerization method. In addition, the toner of the present embodiment is a so-called one-component nonmagnetic developer that contains no magnetic component. Thus, the toner of the present embodiment is borne by the developing roller 31, mainly by the action of the intermolecular force and the electrostatic force (image force). Note that, however, a one-component developer that contains magnetic component may be used. These one-component developers may contain not only toner particles but also additives (e.g., wax and silica fine particles) for adjusting the fluidity and charging capability of the toner. In another case, two-component developer that contains nonmagnetic toner and magnetic carrier may be used as the developer. In the case where the magnetic developer is used, a cylindrical developing sleeve is used as a developer bearing member. The developing sleeve may have a magnet disposed inside the developing sleeve.

The developer container 32 includes a storage portion 36 that stores toner, and an agitating member 34 disposed in the storage portion 36 and serving as an agitating portion. The agitating member 34 is driven and rotated by a motor (not illustrated), and thereby agitates the toner of the developer container 32 and sends the toner toward the developing roller 31 and the supplying roller 33. In addition, the agitating member 34 circulates the toner having not been used for the developing and removed from the developing roller 31, in the developer container 32, and thereby makes the toner of the developer container 32 uniform in the developer container 32. Note that the agitating member 34 that rotates may not be used. Instead, another agitating member that swings may be used, for example.

In an opening portion of the developer container 32 in which the developing roller 31 is disposed, a developing blade 35 is disposed for adjusting the amount of toner borne by the developing roller 31. When the toner supplied to the surface of the developing roller 31 is fed by the rotation of the developing roller 31 and passes through a portion in which the developing blade 35 and the developing roller 31 face each other, the toner is made into a uniform thin layer and is negatively charged by friction.

As illustrated in FIG. 1, the feeding portion 60 includes a front door 61, a tray portion 62, and a pickup roller 65. The front door 61 is openably supported by the printer body 100, and the pickup roller 65 can move up and down. The tray portion 62 serves as a bottom surface of a recording-material storage space, which appears when the front door 61 is opened. The front door 61 closes the recording-material storage space when closed toward the printer body 100. After the front door 61 is opened from the printer body 100, the front door 61 supports a recording material P, together with the tray portion 62.

The fixing portion 70 is a heat fixing system that performs an image fixing process by heating and melting a toner image formed on a recording material. The fixing portion 70 includes a fixing film 71; a fixing heater, such as a ceramic heater, that heats the fixing film 71; a thermistor that measures the temperature of the fixing heater, and a pressure roller 72 that is in pressure contact with the fixing film 71.

Next, an image forming operation of the image forming apparatus 1 will be described. When an image forming instruction is received by the image forming apparatus 1, the image forming portion 10 starts an image forming process in accordance with image information sent from an external computer connected to the image forming apparatus 1. The scanner unit (not illustrated) emits a laser beam to the photosensitive drum 21 in accordance with the image information sent from the external computer. The photosensitive drum 21 is charged in advance by the charging roller 22. Thus, when the laser beam is emitted to the photosensitive drum 21, an electrostatic latent image is formed on the photosensitive drum 21. The electrostatic latent image is then developed by the developing roller 31, and thereby a toner image is formed on the photosensitive drum 21.

In parallel with the above-described image forming process, the pickup roller 65 of the feeding portion 60 sends the recording material P, which has been supported by the front door 61 and the tray portion 62. The recording material P is fed to a registration roller pair 15 by the pickup roller 65. When the recording material P abuts against a nip portion of the registration roller pair 15, the skew of the recording material P is corrected. The registration roller pair 15 is driven in synchronization with a transfer timing of the toner image, and conveys the recording material P toward a transfer nip formed by the transfer roller 12 and the photosensitive drum 21.

The transfer roller 12, which serves as a transfer portion, is applied with a transfer voltage by a transfer high-voltage power source, and the toner image borne by the photosensitive drum 21 is transferred onto the recording material P conveyed by the registration roller pair 15. The recording material P onto which the toner image has been transferred is conveyed to the fixing portion 70, and the toner image is heated and pressed when the recording material P passes through a nip portion formed between the fixing film 71 and the pressure roller 72 of the fixing portion 70. With this operation, toner particles are melted, and then solidify and adhere to the recording material P, so that the toner image is fixed to the recording material P. The recording material P having passed through the fixing portion 70 is discharged in a discharging direction DD by a discharging roller pair 80, which serves as a discharging portion. Specifically, the recording material P passes through a discharging outlet 85, formed to discharge the recording material to the outside of the image forming apparatus; and is discharged to the outside of the image forming apparatus 1, and stacked on a discharging tray 81 formed in an upper portion of the printer body 100.

The discharging tray 81 is sloped upward in the discharging direction DD of the recording material. Thus, the recording material P having been discharged to the discharging tray 81 slides down on the discharging tray 81, and the trailing edge of the recording material P is aligned by a regulation surface 84. The discharging outlet 85 is an opening formed in the regulation surface 84, and has a width in a width direction WD orthogonal to the discharging direction DD. The width is sized so that a recording material conveyed by the image forming apparatus 1 and having the maximum width can pass through the outlet 85. Note that in the following description, a front and rear direction, a right and left direction, and an up and down direction are the same as the front and rear direction, the right and left direction, and the up and down direction with respect to the front surface of the operation unit 300.

The discharging tray 81 is structured such that an extension tray 86 can be attached to the discharging tray 81. Thus, the recording material P having been discharged from the discharging outlet 85 can be supported by the discharging tray 81 and the extension tray 86. Note that the extension tray 86 may move between a use position and a storage position. In the use position, the extension tray 86 is supported by the discharging tray 81 such that the extension tray 86 can pivot on the discharging tray 81 and support the recording material P. The storage position is used when the extension tray 86 is not used. The extension tray 86 may be detachably attached to the discharging tray 81.

In the discharging tray 81, an opening portion 82*a* is formed. The opening portion 82*a* is covered with an opening-and-closing member 83, which serves as a cover portion. The opening-and-closing member 83 can move between a closing position and an opening position. The closing position is a position at which the opening-and-closing member 83 covers a supplying inlet 32*a* so that the toner pack 40 cannot be attached to the developer container 32. The opening position is a position at which the opening-and-closing member 83 exposes the supplying inlet 32*a* so that the toner pack 40 can be attached to the developer container 32. At the closing position, the opening-and-closing member 83 functions as a part of the discharging tray 81. The opening-and-closing member 83 and the opening portion 82*a* are formed in a right-side portion of the discharging tray 81.

The opening portion 82*a* of the discharging tray 81 is open so that the supplying inlet 32*a*, formed on a top portion of the developer container 32 and used for supplying toner, is exposed. Thus, a user can access the supplying inlet 32*a* by opening the opening-and-closing member 83. Note that a direct supply system is used in the present embodiment. In the direct supply system, in a state where the developing apparatus 30 is attached to the image forming apparatus 1, a user supplies toner from the toner pack 40 filled with the supplying developer, to the developing apparatus 30.

Thus, in the direct supply system, when the amount of remaining toner of the process cartridge 20 runs short, it is not necessary to remove the process cartridge 20 from the printer body 100 and attach a new process cartridge to the printer body 100 for replacement. Thus, the usability can be improved. In addition, the direct supply system can inexpensively supply the toner to the developer container 32, compared to a case where the whole of the process cartridge 20 is replaced. Note that the direct supply system can reduce the cost more, even in comparison with a case where only the developing apparatus 30 of the process cartridge 20 is replaced. This is because the direct supply system eliminates the need to replace various rollers and gears with new ones. The image forming apparatus 1 and the toner pack 40 constitute an image forming system 1000.

Collection of Transfer Residual Toner

In the present embodiment, a cleanerless configuration is used. In the cleanerless configuration, transfer residual toner having not been transferred onto the recording material P and left on the photosensitive drum 21 is collected and reused in the developing apparatus 30. The transfer residual toner is removed from the photosensitive drum 21 in the following process. The transfer residual toner includes positively charged toner, and negatively charged toner having insufficient electric charge. When the transfer has been performed from a portion of the surface of the photosensitive drum 21, electricity of the portion is removed by the pre-exposure apparatus 23, and then electricity is discharged uniformly to the portion by the charging roller 22. As a result, the transfer residual toner left on the portion is negatively charged again. The transfer residual toner that has been negatively charged again in the charging portion is conveyed by the rotation of the photosensitive drum 21, and reaches the developing portion. The portion of the surface of the photosensitive drum 21 having passed through the charging portion is exposed by the scanner unit, while the transfer residual toner is still sticking to the portion, and an electrostatic latent image is formed on the portion by the scanner unit exposing the portion.

Next, the behavior of the transfer residual toner left on an exposure portion of the photosensitive drum 21 and having reached the developing portion, and the behavior of the transfer residual toner left on a non-exposure portion of the photosensitive drum 21 and having reached the developing portion will be described individually. In the developing portion, the transfer residual toner sticking to the non-exposure portion of the photosensitive drum 21 is moved to the developing roller 31 by a potential difference between an electric potential (dark-area potential) of the non-exposure portion of the photosensitive drum 21 and the developing voltage, and collected in the developer container 32. The transfer residual toner moves because the normal charging polarity of the toner is negative polarity, and because the developing voltage applied to the developing roller 31 is positive relative to the electric potential of the non-exposure portion. The toner collected in the developer container 32 is agitated, together with the toner of the developer container 32 by the agitating member 34, and dispersed. The dispersed toner is borne by the developing roller 31, and used again in the developing process.

On the other hand, the transfer residual toner sticking to the exposure portion of the photosensitive drum 21 does not move from the photosensitive drum 21 to the developing roller 31 in the developing portion, and remains on the surface of the photosensitive drum 21. The transfer residual toner remains because the normal charging polarity of the toner is negative polarity, and because the developing voltage applied to the developing roller 31 is further negative relative to the electric potential (light-area potential) of the exposure portion. The transfer residual toner left on the surface of the photosensitive drum 21 and other toner having moved from the developing roller 31 to the exposure portion are borne by the photosensitive drum 21, moved to the transfer portion, and transferred onto the recording material P in the transfer portion.

Thus, in the present embodiment, the cleanerless configuration is used, and the transfer residual toner is collected in the developing apparatus 30 and reused. However, a known cleaning blade that abuts against the photosensitive drum 21 may be used for collecting the transfer residual toner. In this case, the transfer residual toner collected by the cleaning blade is collected into a collection container, which is disposed separately from the developing apparatus 30. The cleanerless configuration, however, can eliminate the space used to dispose the collection container that collects the transfer residual toner, and can downsize the image forming apparatus 1. In addition, the cleanerless configuration can reduce printing cost by reusing the transfer residual toner.

Configuration of Toner Pack

Next, a configuration of the toner pack 40 will be described. The toner pack 40 can be detachably attached to the image forming apparatus 1, and serves as a supplying container that stores toner. As illustrated in FIGS. 3A to 5, the toner pack 40 includes a shutter member 41, a seal member 504, a supply base 501, an outer ring member 510, an inner ring member 511, and a pouch 503, and is formed by assembling these members. The pouch 503 is a flexible container that stores toner. A rotation axis z indicated by a dot-and-dash line in FIGS. 3A to 5 is a center line of rotation of the toner pack 40.

The supply base 501 serves as a container base portion, and includes an outer circumferential portion 501*b* and a toner outlet 501*r*. The outer circumferential portion 501*b* is a side surface of the supply base 501, and extends along an axis direction D1 parallel to the rotation axis z. The toner outlet 501*r* is formed in the outer circumferential portion 501*b*. The supply base 501 also includes a concave portion 501*f* and convex portions 501*y*, 501*y*. The concave portion 501*f* is concaved inward in the radial direction, with respect to the outer circumferential portion 501*b*. The convex portions 501*y*, 501*y* project outward in the radial direction, from the outer circumferential portion 501*b*. The toner outlet 501*r* is a through-hole, and communicates with the pouch 503. The convex portions 501*y*, 501*y* are disposed, with their phases shifted by 180 degrees from each other.

As illustrated in FIGS. 4 to 7, the outer ring member 510 is a resin member whose outer circumferential surface is nearly hexagonal. In addition, the outer ring member 510 has engaging portions 510*y* and 510*y*, with which the convex portions 501*y*, 501*y* of the supply base 501 can engage. The outer ring member 510 is disposed so as to cover the inner ring member 511, and forms an outermost shape of the toner pack 40 for serving as a grip when the toner pack 40 is held. Since the outer ring member 510 is handled at a position separated more from the rotation axis z in the radial direction, the outer ring member 510 can reduce the force necessary for a user to handle the outer ring member 510. Thus, the usability can be improved.

The inner ring member 511 that serves as a supporting member is a resin member whose outer circumferential surface is nearly hexagonal, similarly to the outer ring member 510. The inner ring member 511 is joined with an opening portion 503*a* (see FIG. 10A) of the pouch 503. Thus, the opening portion 503*a* of the pouch 503 is supported by the inner ring member 511 such that the opening portion 503*a* is opened. As described later, the inner ring member 511 is fixed to the supply base 501 such that the opening portion 503*a* and the toner outlet 501*r* communicate with each other. The inner ring member 511 and the pouch 503 can be joined with each other in any method. For example, one of various adhesives, such as hot melt, may be used; or otherwise, the pouch 503 may be welded to the inner ring member 511. Preferably, the outer circumferential surface of the outer ring member 510 has a shape, such as a polygon, that makes the outer ring member 510 less slippery when a user holds and rotates the outer ring member 510.

The inner ring member 511 has concave portions 511*y*, 511*y*, with which the convex portions 501*y*, 501*y* can engage. The concave portions 511y, 511y have a groove shape such that the convex portions 501y, 501y can pass through the concave portions 511y, 511y. The engaging portions 510y, 510y have a rib shape that surrounds each of the convex portions 501y, 501y.

Figure 6:
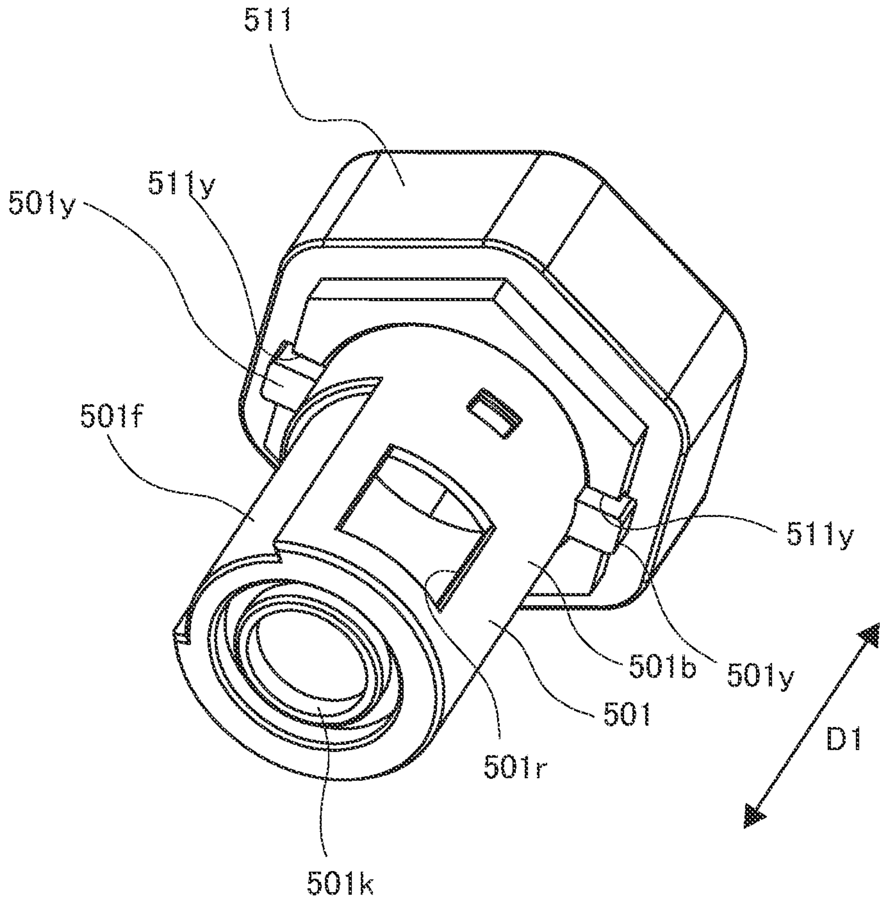
FIG. 6 is a perspective view illustrating an inner ring member and a supply base.
Figure 7:
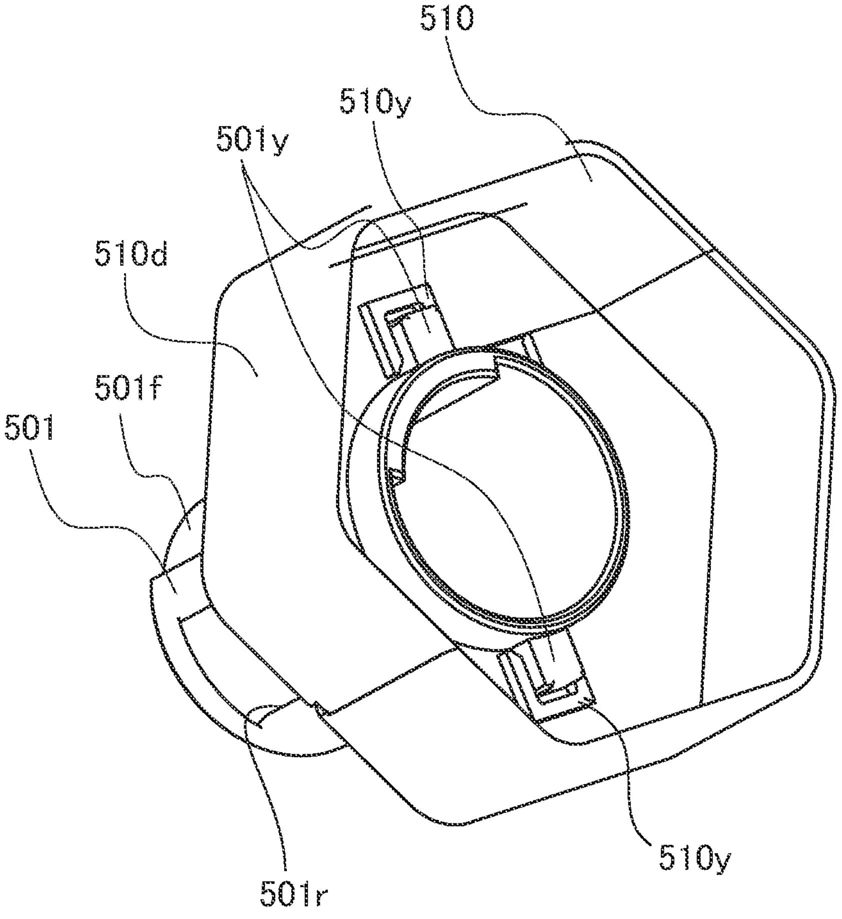
FIG. 7 is a perspective view illustrating an outer ring member and the supply base.

As illustrated in FIG. 6, the inner ring member 511 is assembled to the supply base 501 such that each convex portion 501y engages with a corresponding concave portion 511y. As illustrated in FIG. 7, the outer ring member 510 is assembled to the supply base 501 such that each convex portion 501y engages with a corresponding engaging portion 510y. With this assembly, the outer ring member 510 and the inner ring member 511 are supported by the supply base 501 such that the outer ring member 510 and the inner ring member 511 are prevented from rotating relative to the supply base 501.

Figure 8A:
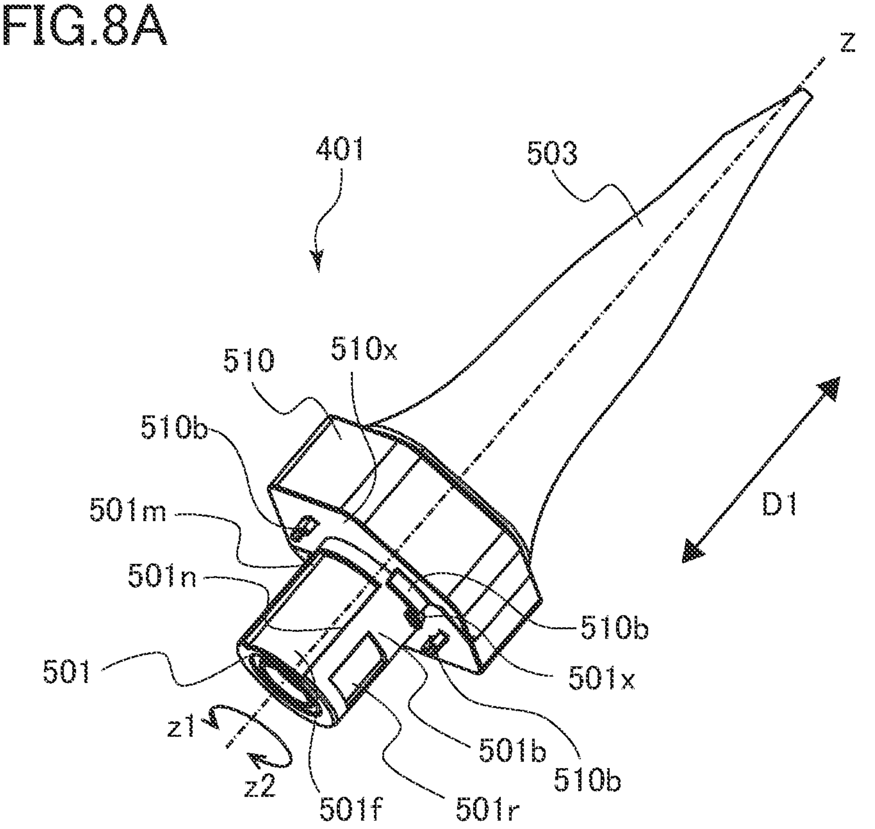
FIG. 8A is a perspective view illustrating a rotation container unit of the toner pack.
Figure 8B:
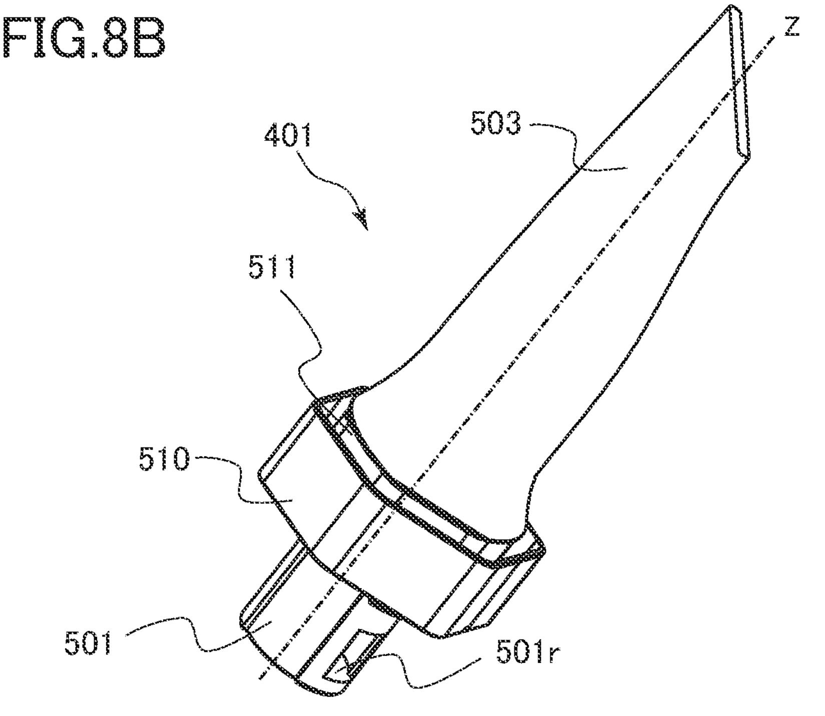
FIG. 8B is a perspective view illustrating the rotation container unit.

In addition, each convex portion 501y is joined with a corresponding concave portion 511y and a corresponding engaging portion 510y in the axis direction D1 of the rotation axis z and in the radial direction orthogonal to the axis direction D1. Each convex portion 501y may be press-fit in a corresponding concave portion 511y and a corresponding engaging portion 510y, or may be joined with the corresponding concave portion 511y and the corresponding engaging portion 510y through welding or by using adhesive. With this joining, the supply base 501, the outer ring member 510, the inner ring member 511, and the pouch 503 are joined with each other into one body, as illustrated in FIGS. 8A and 8B. Note that the outer ring member 510 is a cylindrical member that has an outer circumferential surface 510d, and the position of the outer circumferential surface 510d is separated from the rotation axis z more than the position of the supply base 501 in the radial direction orthogonal to the axis direction D1. In addition, the inner ring member 511 is fixed to the supply base 501, inside the outer ring member 510.

Figure 5:
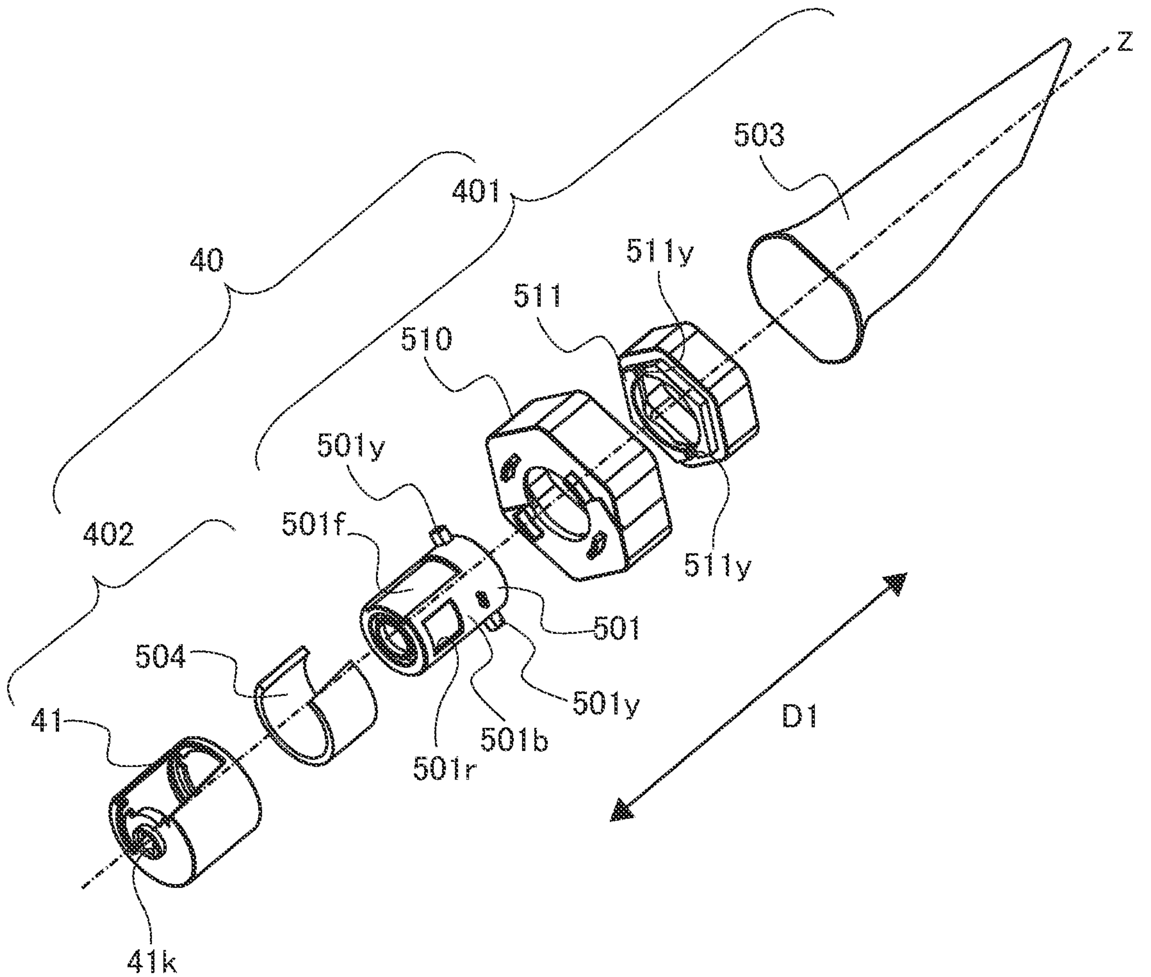
FIG. 5 is an exploded perspective view illustrating the toner pack.

Hereinafter, the supply base 501, the outer ring member 510, the inner ring member 511, and the pouch 503 that are joined with each other into one body are referred to as a rotation container unit 401. In addition, the shutter member 41 and the seal member 504 that are joined with each other into one body as described later are referred to as a container shutter unit 402. That is, as illustrated in FIG. 5, the toner pack 40 includes the container shutter unit 402, and the rotation container unit 401 that can rotate relative to the container shutter unit 402. As illustrated in FIG. 8A, the rotation container unit 401 can rotate on the rotation axis z, relative to the container shutter unit 402, in a z1 direction or a z2 direction opposite to the z1 direction.

Figure 9A:
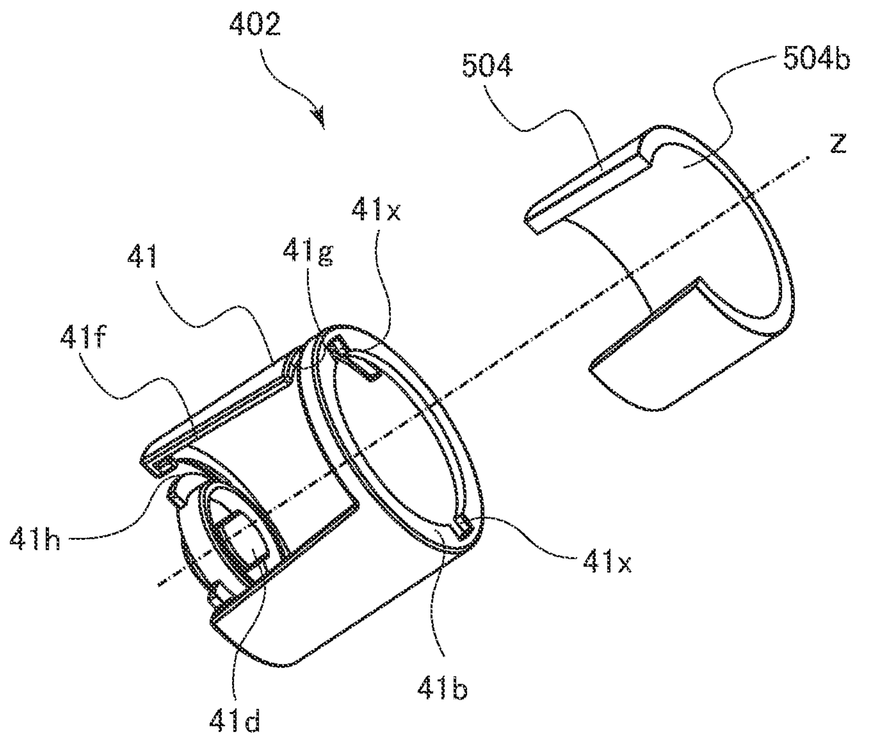
FIG. 9A is an exploded perspective view illustrating a shutter member and a seal member.
Figure 9B:
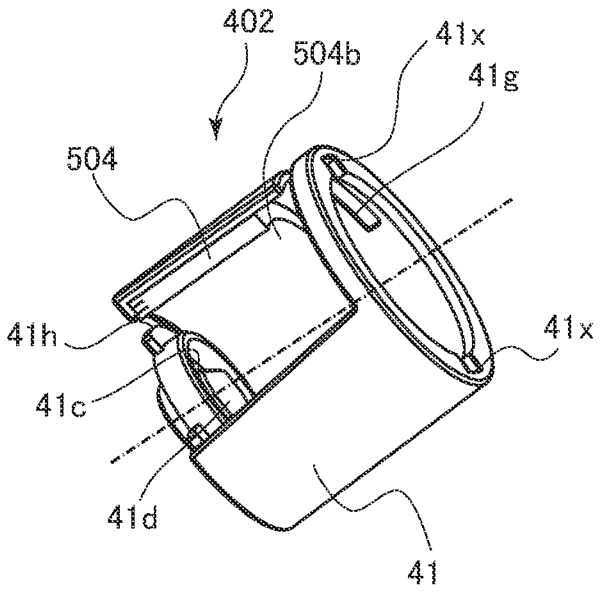
FIG. 9B is a perspective view illustrating the shutter member and the seal member.

As illustrated in FIGS. 9A and 9B, the shutter member 41 serves as a container shutter, and is a nearly cylindrical resin member. The shutter member 41 includes a cutout portion 41f and groove portions 41g and 41h. The cutout portion 41f and the groove portion 41g are formed in the outer circumferential portion of the shutter member 41, and the groove portion 41h is formed in the bottom surface portion of the shutter member 41. The cutout portion 41f is nearly rectangular. The groove portion 41g extends in a range (about 90°) of a circumference of the shutter member 41, in the circumferential direction of the shutter member 41. The groove portion 41h is formed in the bottom surface portion, and extends in a range (about 90°) of a circumference of the shutter member 41, in the circumferential direction of the shutter member 41.

The seal member 504 is made of a material, such as urethane foam or nonwoven fabric, that can be elastically deformed; and fixed to the inner surface of the shutter member 41 via a double-sided adhesive tape or the like. More specifically, the seal member 504 is disposed on the shutter member 41 at a position different from the position at which the cutout portion 41f is formed. That is, the seal member 504 and the shutter member 41 are joined with each other into one body, and constitute the container shutter unit 402. With this structure, the container shutter unit 402 can prevent the toner from leaking in the interface between the seal member 504 and the shutter member 41.

As illustrated in FIGS. 8A to 10B, when the rotation container unit 401 is assembled to the container shutter unit 402, ribs 501x that project from the outer circumferential portion 501b of the supply base 501 are positioned at concave portions 41x formed in the shutter member 41. FIG. 10A illustrates a state in which the rotation container unit 401 is assembled to the container shutter unit 402 by inserting the ribs 501x into the concave portions 41x. When the ribs 501x i-s are inserted into the concave portions 41x, a cylindrical portion 41c of the shutter member 41 is inserted into a groove-shaped inner diameter portion 501e formed in the end portion of the supply base 501. The inner diameter portion 501e is a cylindrical groove formed around the rotation axis z, and the cylindrical portion 41c is a cylindrical projecting portion formed around the rotation axis z (the inner diameter portion 501e and the cylindrical portion 41c are coaxially formed around the rotation axis z). Thus, after the cylindrical portion (annular rib) 41c is inserted into the inner diameter portion (annular groove) 501e, the inner diameter portion 501e is guided by the cylindrical portion 41c such that the supply base 501 can rotate with respect to the shutter member 41 on the rotation axis z.

The supply base 501 has a hole portion 501k (see FIG. 6) formed inside the inner diameter portion 501e in the radial direction. In addition, the shutter member 41 has an attachment portion 41d (see FIG. 9A) that is inserted into the hole portion 501k. The attachment portion 41d has an engaged portion 41k that is opened toward the leading end of the toner pack 40. The engaged portion 41k defines a double-D hole. Thus, the attachment portion 41d has a double-D convex shape in accordance with the shape of the engaged portion 41k. The outermost diameter of the attachment portion 41d is set smaller than the inner diameter of the hole portion 501k, and thus the attachment portion 41d can rotate freely in the interior of the hole portion 501k.

On an end surface 50x of the outer ring member 510 on the shutter member 41 side, a plurality of (in the present embodiment, four) ribs 510b are formed, and extends in the axis direction D1. As illustrated in FIG. 10B, since a base end portion 41b of the shutter member 41 is surrounded by the end surface 510x and the ribs 501x, the base end portion 41b is prevented from moving in the axis direction D1 and the radial direction orthogonal to the axis direction D1. Thus, the rotation container unit 401 that includes the supply base 501 is attached to the container shutter unit 402 that includes the shutter member 41, such that the rotation container unit 401 can rotate relative to the container shutter unit 402 on the rotation axis z, and that the rotation container unit 401 is prevented from moving in the axis direction D1 and the radial direction.

The seal member 504 fixed to the shutter member 41 has a sliding surface 504b, which slides on the outer circumferential portion 501b of the supply base 501. The seal member 504 is pressed by the outer circumferential portion 501b toward the shutter member 41, that is, outward in the radial direction orthogonal to the axis direction D1; and produces surface pressure between the outer circumferential portion 501b and the sliding surface 504b. With this structure, the toner can be prevented from leaking in the interface between the seal member 504 and the supply base 501.

More specifically, when viewed in the axis direction D1 of the rotation axis z, the supply base 501 and the shutter member 41 are cylindrical members. The supply base 501 rotates inside the shutter member 41, along an inner circumferential surface of the shutter member 41, on the rotation axis z.

Figure 10A:
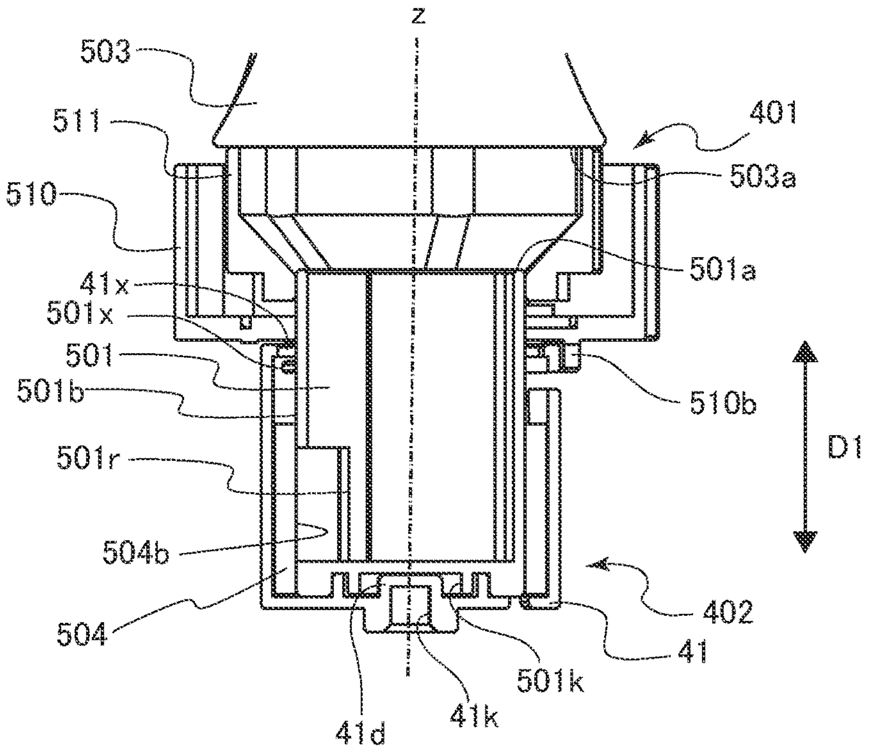
FIG. 10A is a cross-sectional view illustrating the toner pack that is in a shield state.
Figure 10B:
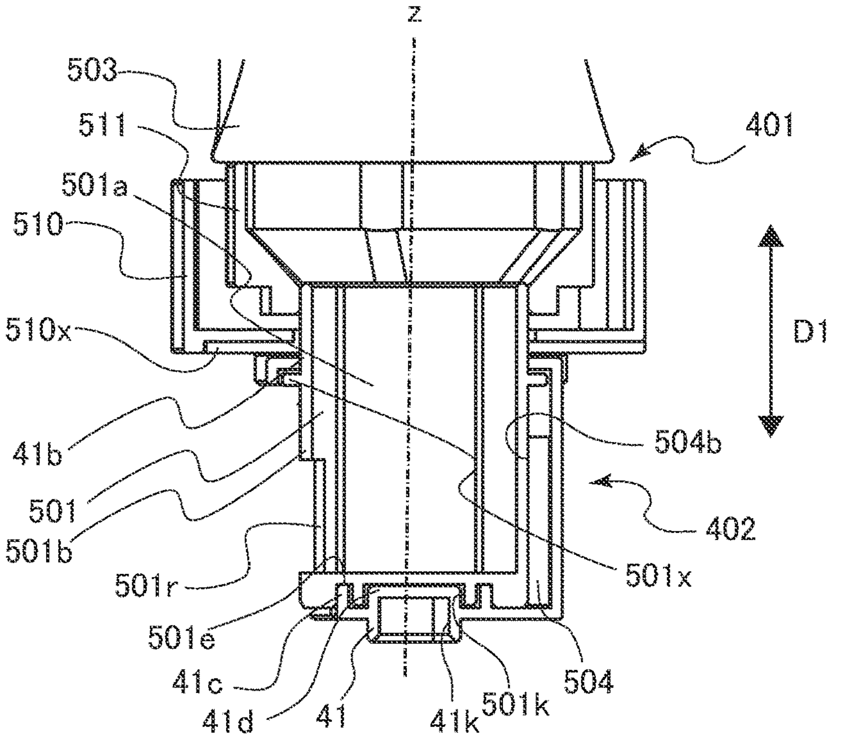
FIG. 10B is a cross-sectional view illustrating the toner pack that is in an open state.
Figure 11A:
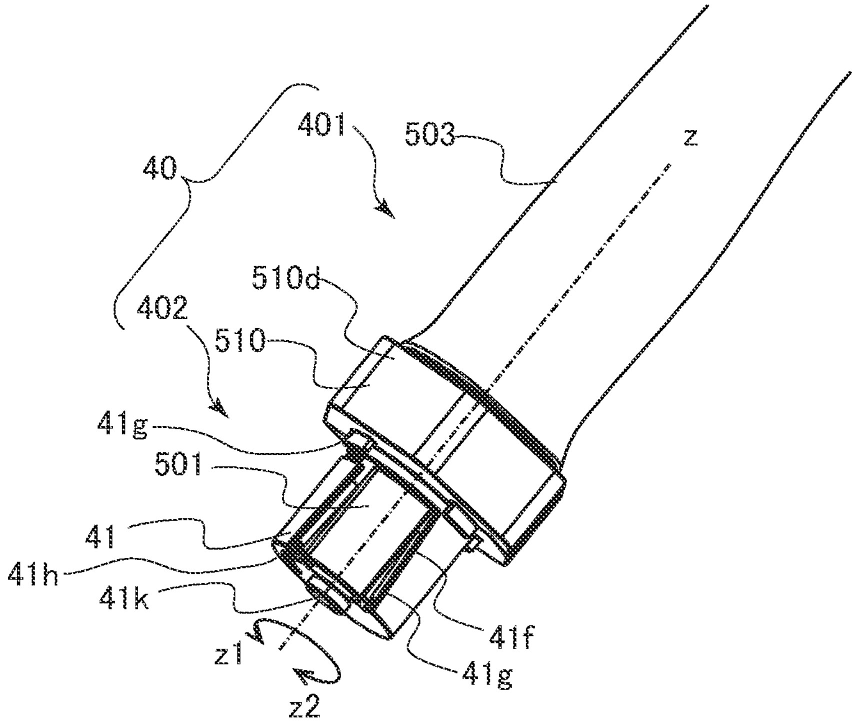
FIG. 11A is a perspective view illustrating the toner pack that is in the shield state.

FIGS. 10A and 11A illustrate a state in which the toner outlet 501*r* formed in the supply base 501 is shielded by the shutter member 41 and the seal member 504. In this state, the toner stored in the pouch 503 can move through the opening portion 503*a* of the pouch 503, the inner space of the inner ring member 511, the opening portion 501*a* of the supply base 501, and the inner space of the supply base 501, to the toner outlet 501*r*. However, since the toner outlet 501*r* is shielded by the shutter member 41 and the seal member 504, the toner outlet 501*r* is sealed so that the toner stored in the pouch 503 does not leak to the outside of the toner pack 40 in a state where the toner pack 40 is not attached to the developer container 32. Note that the opening portion 503*a* of the pouch 503 is formed at one end portion of the pouch 503 in the axis direction D1.

Figure 11B:
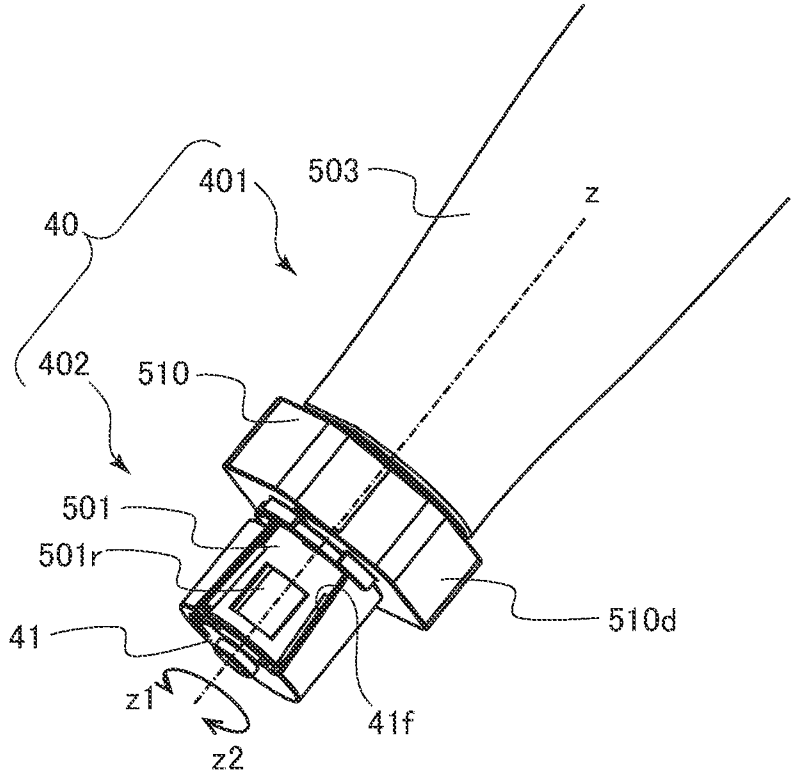
FIG. 11B is a perspective view illustrating the toner pack that is in the open state.

FIGS. 10B and 11B illustrate a state in which the toner outlet 501*r* formed in the supply base 501 is not shielded by the shutter member 41 and the seal member 504 and is opened. In this state, the toner outlet 501*r* faces the cutout portion 41*f* of the shutter member 41, and the toner stored in the pouch 503 can be discharged to the outside of the toner pack 40 through the toner outlet 501*r* and the cutout portion 41*f*.

As an example, the state of the toner pack 40 illustrated in FIG. 11A is defined as a shield state, and the state of the toner pack 40 illustrated in FIG. 11B is defined as an open state. In this case, if the rotation container unit 401 is rotated, in the shield state, by about 90° on the rotation axis z in the direction indicated by an arrow z1, the toner pack 40 becomes the open state. In contrast, if the rotation container unit 401 is rotated, in the open state, by about 90° on the rotation axis z in the direction indicated by an arrow z2, the toner pack 40 becomes the shield state. Note that the degree of rotation of the rotation container unit 401 that changes the state of the toner pack 40 between the open state and the shield state may be set freely.

The position of the supply base 501 when the toner pack 40 is in the shield state, as illustrated in FIG. 11A, is defined as a shielding position and a first shielding position. In addition, the position of the supply base 501 the toner pack 40 is in the open state, as illustrated in FIG. 11B, is defined as an opening position and a first opening position.

When the supply base 501 is located at the shielding position, the toner outlet 501*r* is shielded by the shutter member 41. When the supply base 501 is located at the opening position, the toner outlet 501*r* is opened by the shutter member 41 so that the toner of the pouch 503 is discharged to the outside of the toner pack 40 through the toner outlet 501*r*.

A user attaches the toner pack 40 to the developer container 32, then holds the outer circumferential surface of the outer ring member 510, and then rotates the outer ring member 510 in the direction indicated by the arrow z, on the rotation axis z. With this operation, the supply base 501 also rotates in the direction indicated by the arrow z1 on the rotation axis z, and the toner outlet 501*r* of the supply base 501 is exposed to the outside through the cutout portion 41*f*. As a result, the state of the toner pack 40 changes from the shield state to the open state, and the toner of the pouch 503 can be discharged to the outside of the toner pack 40. Note that the axis direction D1 that is parallel with the rotation axis z extends along the vertical direction, and the direction in which the toner pack is attached to the image forming apparatus 1 extends along the axis direction D1. That is, the toner pack 40 is attached to the image forming apparatus 1 such that the axis direction D1, which is a direction of the rotation axis z, extends along the vertical direction.

The pouch 503 may be constituted by a resin sheet made from polyethylene (PE), polypropylene (PP), or polyethylene terephthalate (PET), and by a composite material thereof. In another case, the pouch 503 may be constituted by a nonwoven fabric or paper sheet, and by a composite material of PE, PP, and PET. If the pouch 503 is made of a material that can be elastically deformed by a user, the toner of the pouch 503 can be easily discharged by the user pushing or squeezing the pouch 503 with fingers.

After a user finishes discharging the toner of the pouch 503 to the developer container 32, the user holds the outer circumferential surface 510*d* of the outer ring member 510, and rotates the outer ring member 510 in the direction indicated by the arrow z2, on the rotation axis z. With this operation, the supply base 501 also rotates in the direction indicated by the arrow z2 on the rotation axis z, and the toner outlet 501*r* of the supply base 501 is shielded by the shutter member 41 and the seal member 504. As a result, the state of the toner pack 40 changes from the open state to the shield state, and the toner pack 40 can be removed from the developer container 32.

Toner Receiving Portion of Developer Container

Next, a toner receiving portion 600 disposed on the developer container 32 will be described. As illustrated in FIGS. 12A to 15, the toner receiving portion 600 includes a receiving base unit 602 and a receiving shutter unit 601. The receiving shutter unit 601 is supported by the receiving base unit 602 such that the receiving shutter unit 601 can rotate with respect to the receiving base unit 602 on the rotation axis z.

Figure 12A:
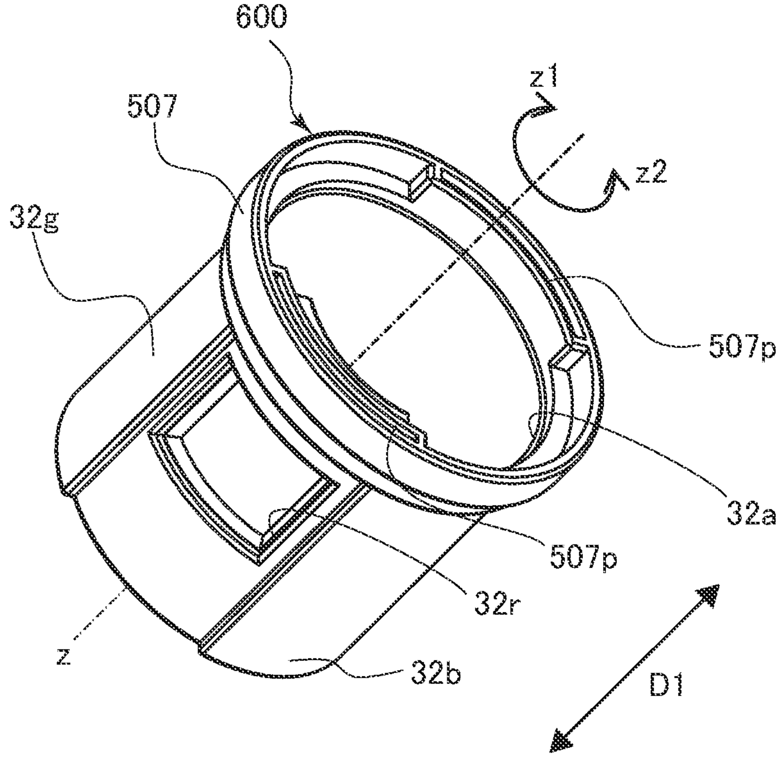
FIG. 12A is a perspective view illustrating a toner receiving portion that is in a shield state.
Figure 12B:
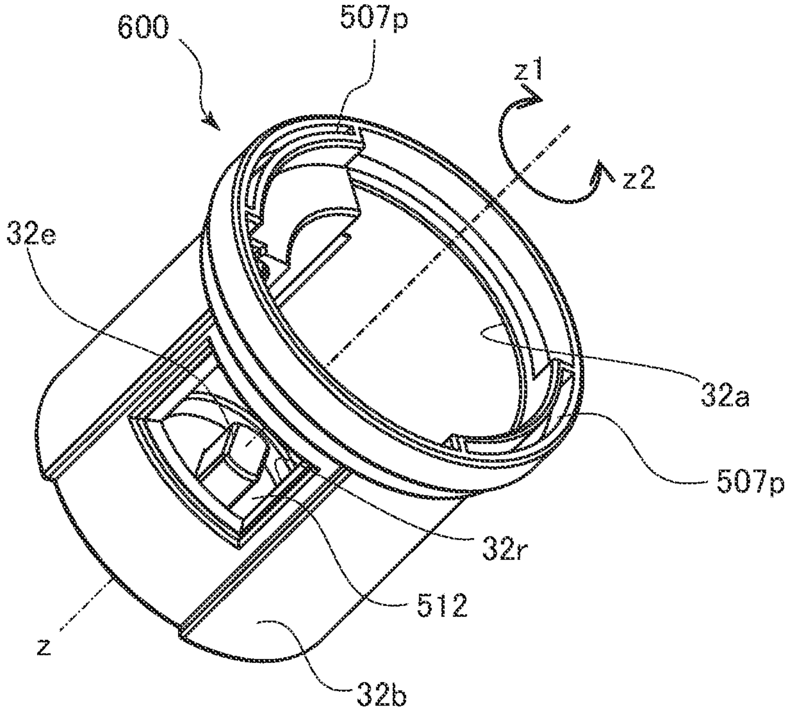
FIG. 12B is a perspective view illustrating the toner receiving portion that is in an open state.
Figure 13A:
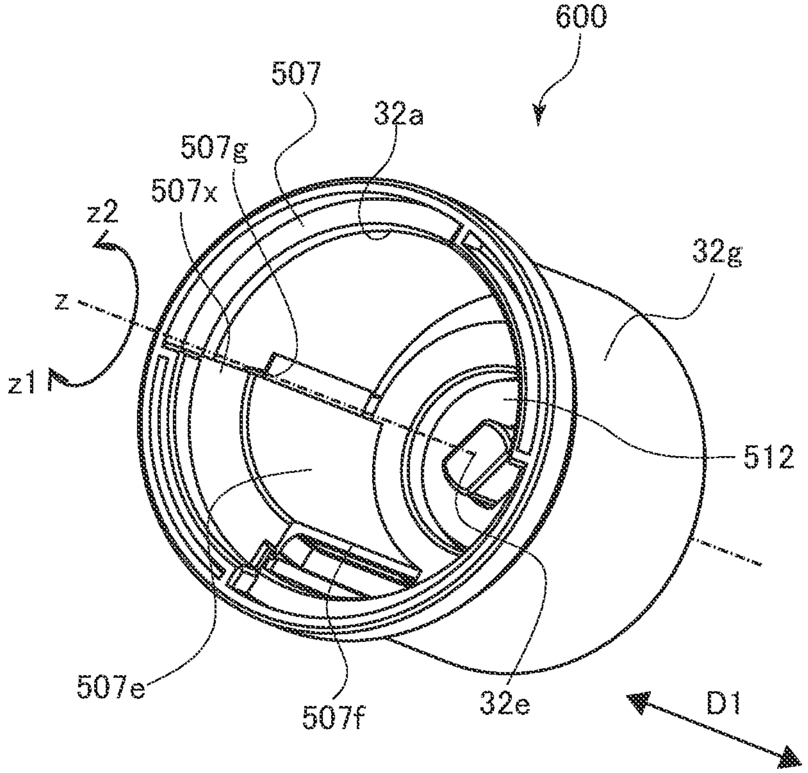
FIG. 13A is a perspective view illustrating the toner receiving portion that is in the shield state.
Figure 13B:
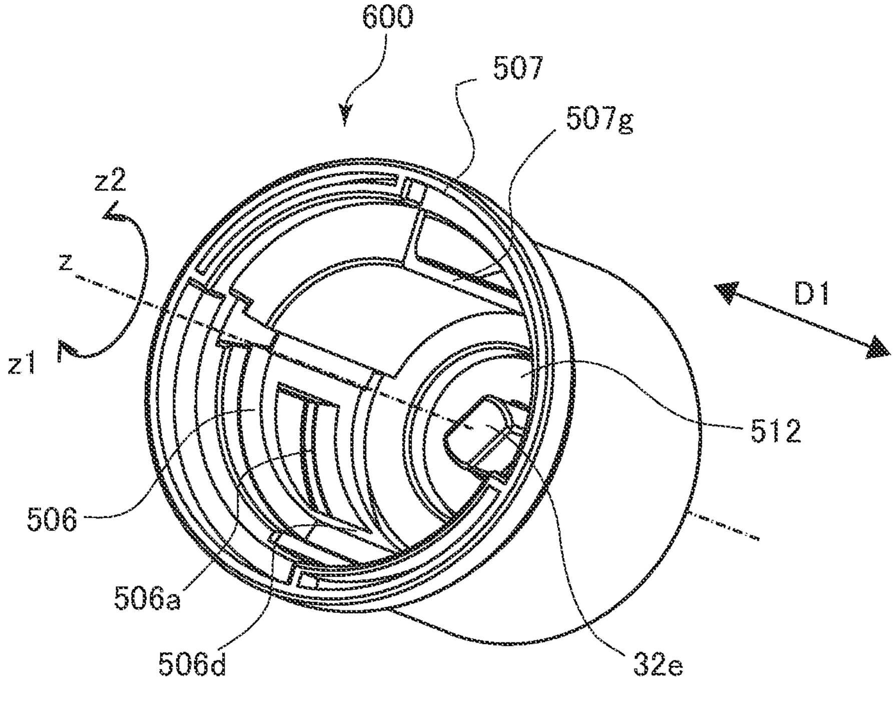
FIG. 13B is a perspective view illustrating the toner receiving portion that is in the open state.
Figure 14:
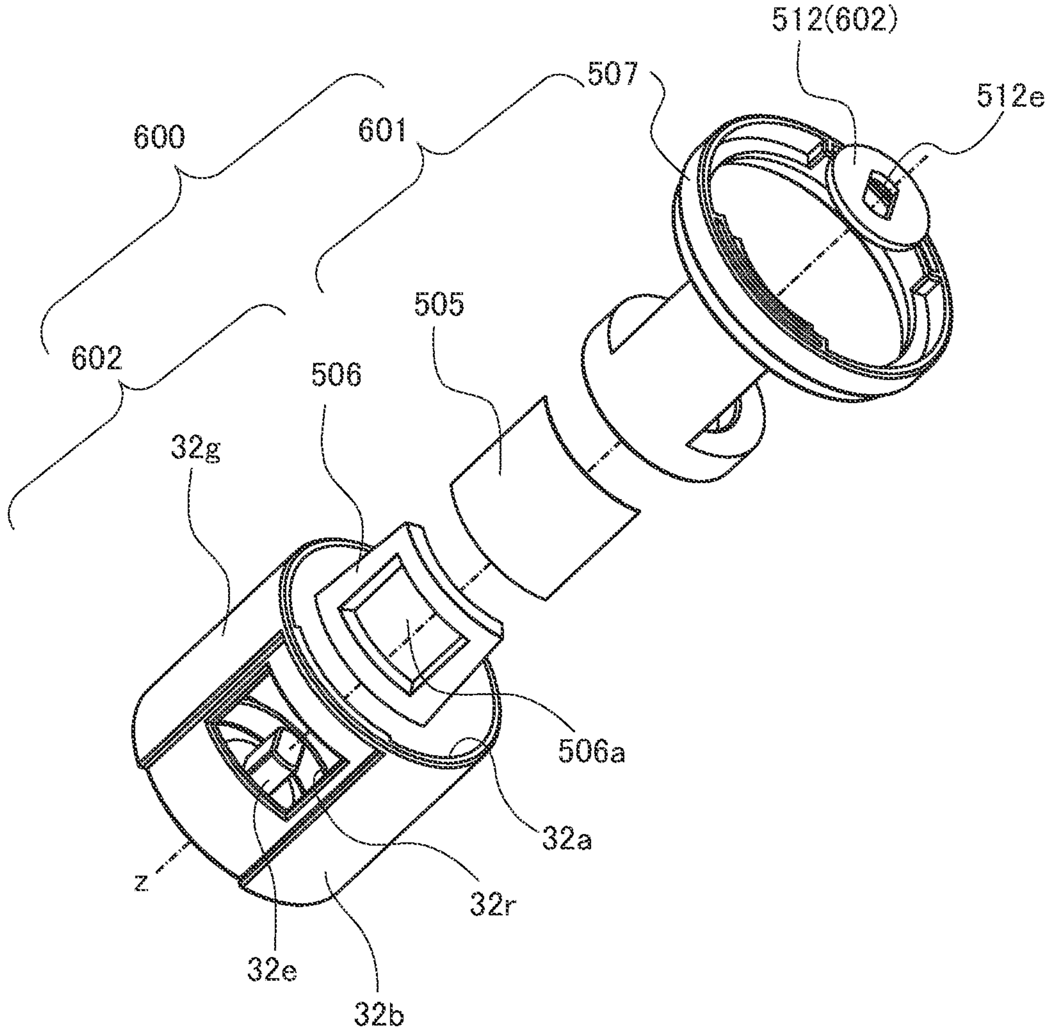
FIG. 14 is an exploded perspective view illustrating the toner receiving portion.

FIGS. 12A and 13A illustrate a state in which the toner inlet 32*r* that communicates with the storage portion 36 is shielded. FIGS. 12B and 13B illustrate a state in which the toner inlet 32*r* is opened. Hereinafter, the state of the toner receiving portion 600 in which the toner inlet 32*r* is shielded as illustrated in FIGS. 12A and 13A is defined as a shield state, and the state of the toner receiving portion 600 in which the toner inlet 32*r* is opened as illustrated in FIGS. 12B and 13B is defined as an open state.

The receiving base unit 602 includes a cylindrical portion 32*g* that serves as a nearly cylindrical main-body base portion, a base seal 506, and a shutter holding member 512. Note that although the cylindrical portion 32*g* is integrated with the developer container (see FIG. 1A) in the present embodiment, the structure of the cylindrical portion 32*g* is not limited to this. For example, the cylindrical portion 32*g* may be formed separately from the developer container 32 and fixed to the developer container 32. In another case, the cylindrical portion 32*g* may be disposed in a portion of the printer body 100 other than the developer container 32, and the toner may be supplied to the developer container 32 through the cylindrical portion 32*g*.

Figure 19A:
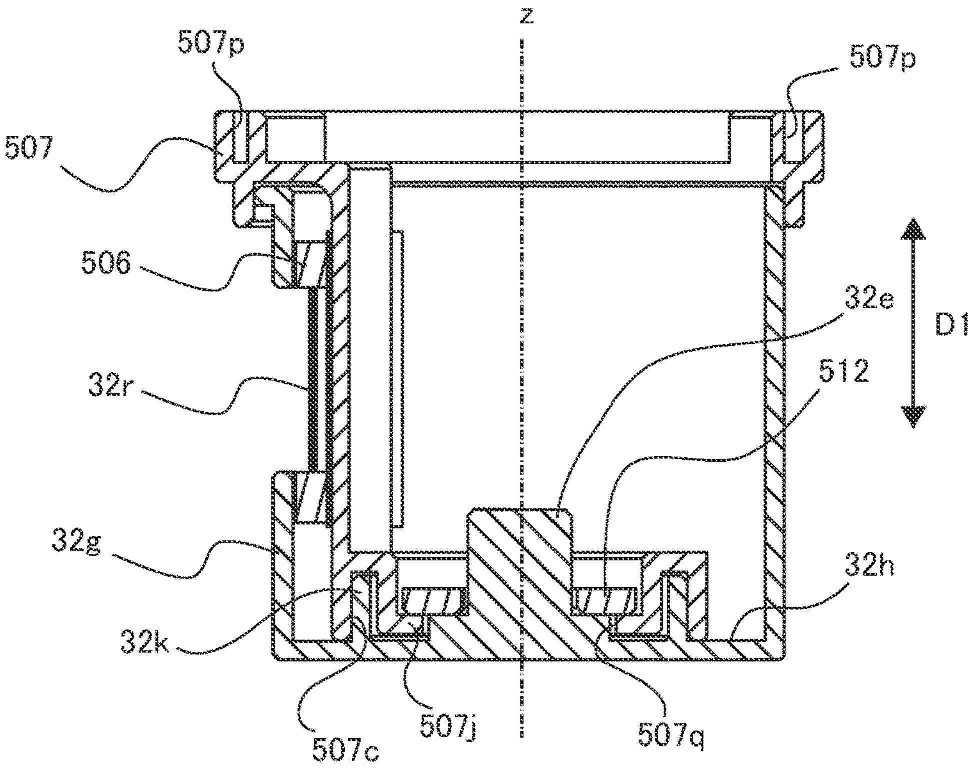
FIG. 19A is a cross-sectional view illustrating the toner receiving portion that is in the shield state.

The cylindrical portion 32*g* includes a supplying inlet 32*a*, an outer circumferential portion 32*b*, and the toner inlet 32*r*. The supplying inlet 32*a* is an inlet through which the toner is supplied from the toner pack 40 to the storage portion 36 (see FIG. 1A) of the developer container 32. The outer circumferential portion 32*b* is a side surface of the cylindrical portion 32*g* that extends along the axis direction D1. The toner inlet 32*r* is formed in the outer circumferential portion 32*b*. In addition, the cylindrical portion 32*g* includes the engaging portion 32*e* that projects from a bottom surface 32*h* (see FIG. 19A) of the cylindrical portion 32*g*, upward in the axis direction D1. As described later, the engaging portion 32*e* engages with the engaged portion 41*k* of the shutter member 41. That is, the engaging portion 32*e* has a double-D boss shape in accordance with the double-D hole shape of the engaged portion 41*k*.

In addition, the engaging portion 32*e* is press-fit in a hole portion 512*e* of the shutter holding member 512. Thus, the hole portion 512*e* has a double-D hole shape, similarly to the engaging portion 32*e*. Note that the shutter holding member 512 is attached to the engaging portion 32*e* of the cylindrical portion 32*g* after the shutter member 507 of the receiving shutter unit 601 is assembled to the cylindrical portion 32*g*. Although the shutter holding member 512 is fixed to the engaging portion 32*e* of the cylindrical portion 32*g* such that the shutter holding member 512 is press-fit to the engaging portion 32*e*, the attachment of the shutter holding member 512 is not limited to this. For example, the shutter holding member 512 may be fixed to the cylindrical portion 32*g* through welding or by using adhesive.

Figure 16A:
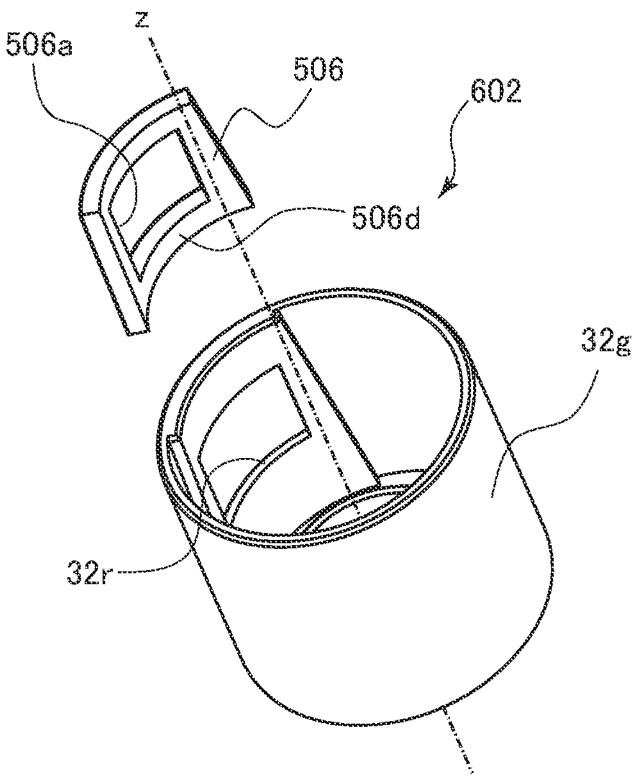
FIG. 16A is an exploded perspective view illustrating a cylindrical portion and a base seal.
Figure 16B:
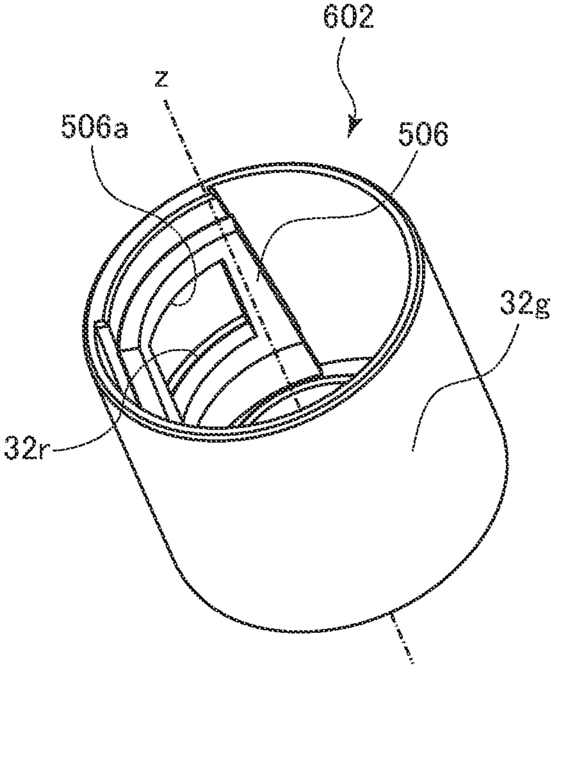
FIG. 16B is a perspective view illustrating the cylindrical portion and the base seal.

As illustrated in FIGS. 16A and 16B, the base seal 500 is made of a material, such as urethane foam or nonwoven fabric, that can be elastically deformed; and fixed to the cylindrical portion 32*g* via a double-sided adhesive tape or the like. With this structure, the base seal 506 can prevent the toner from leaking in the interface between the base seal 506 and the cylindrical portion 32*g*. Since the base seal 506 has an opening portion 506*a* formed at a position corresponding to the position of the toner inlet 32*r*, the toner having passed through the opening portion 506*a* is supplied to the storage portion 36 (see FIG. 1A) of the developer container 32 through the toner inlet 32*r*.

As illustrated in FIGS. 12A to 15 and FIG. 17, the receiving shutter unit 601 includes a shutter member 507 and a shutter sheet 505. Note that the developer container 32 (see FIG. 1A) includes the storage portion 36, the cylindrical portion 32*g*, and the shutter member 507, and supports the developing roller 31 such that the developing roller 31 can rotate. The toner pack 40 is detachably attached to the developer container 32.

The shutter member 507 includes an inner diameter portion 507*h*, an outer diameter portion 507*k*, and a convex portion 507*e* that connects between the inner diameter portion 507*h* and the outer diameter portion 507*k*. The convex portion 507*e* projects from the outer diameter portion 507*k*, inward in the radial direction. As illustrated in FIGS. 13A and 13B, the convex portion 507*e* includes a nearly fan-shaped horizontal portion 507*x* and a wall portion 507*s* extending in the axis direction D1. The horizontal portion 507*x* can pass through the groove portion 41*g* (see FIG. 9A) of the shutter member 41 of the toner pack 40. The wall portion 507*s* can pass through the groove portion 41*h* (see FIG. 9A) of the shutter member 41.

Figure 17A:
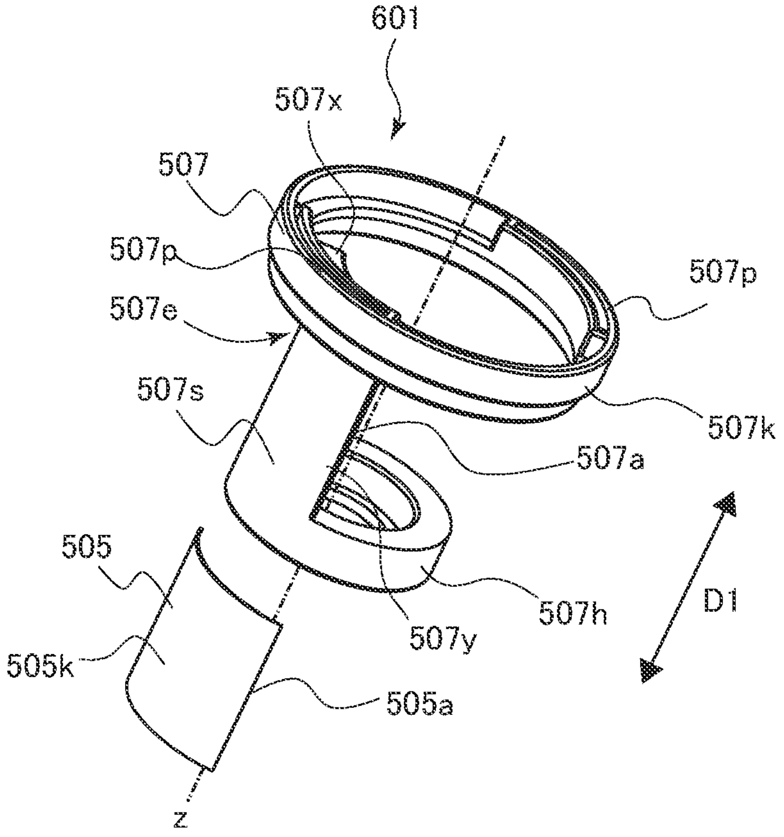
FIG. 17A is an exploded perspective view illustrating a shutter member and a shutter sheet.
Figure 17B:
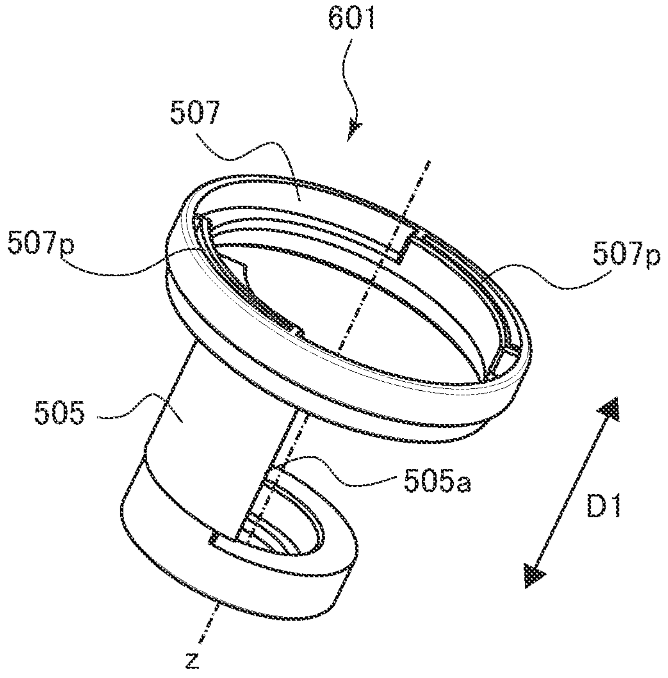
FIG. 17B is a perspective view illustrating the shutter member and the shutter sheet.

As illustrated in FIGS. 17A and 17B, the shutter sheet 505 is fixed to the outer circumferential surface of the wall portion 507*s* via a double-sided adhesive tape or the like. The shutter sheet 505 is a film having a thickness of about 100 μm. In addition, the shutter sheet 505 is disposed such that a leading-edge portion 505*a* of the shutter sheet 505 projects from an edge portion 507*a* of the wall portion 507*s*. A sliding surface 505*k* of the shutter sheet 505 can slide on a sliding surface 506*d* (see FIG. 16A) of the base seal 506.

The outer diameter portion 507*k* of the shutter member 507 has groove portions 507*p*, 507*p*, with which the ribs 510*b* (see FIG. 8A) of the outer ring member 510 of the toner pack 40 can engage. The groove portions 507*p*, 507*p* face each other in the radial direction, and each of the groove portions 507*p*, 507*p* extends in a range (about 90°) of a circumference of the outer diameter portion 507*k*, in the circumferential direction of the outer diameter portion 507*k*. The top portion of the outer diameter portion 507*k* is divided into four sections by the presence of the groove portions 507*p*, 507*p*, and the four ribs 510*b* of the outer ring member 510 engage with the four sections. Thus, in a state where the toner pack 40 is attached to the toner receiving portion 600, the toner pack 40 can rotate only in a range of 90°. In this structure, since the range in which the rotation container unit 401 of the toner pack 40 is rotated when the toner is supplied from the toner pack 40 to the developer container 32 is made clear, the usability can be improved.

Figure 18:
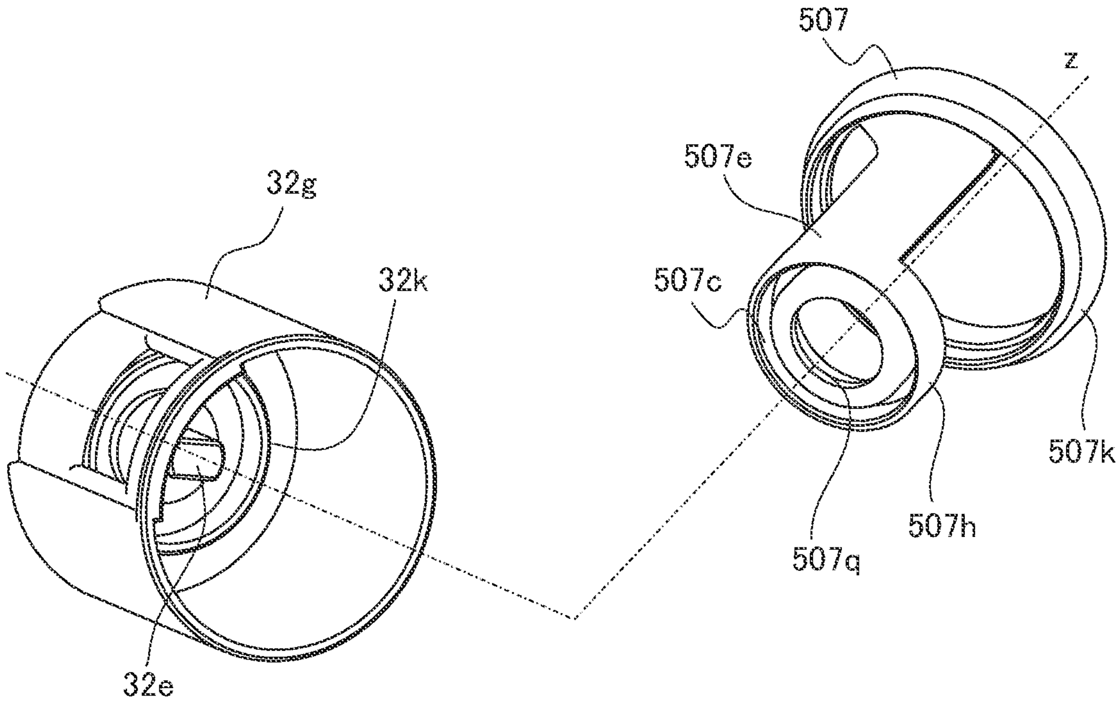
FIG. 18 is an exploded perspective view illustrating the cylindrical portion and the shutter member.
Figure 19B:
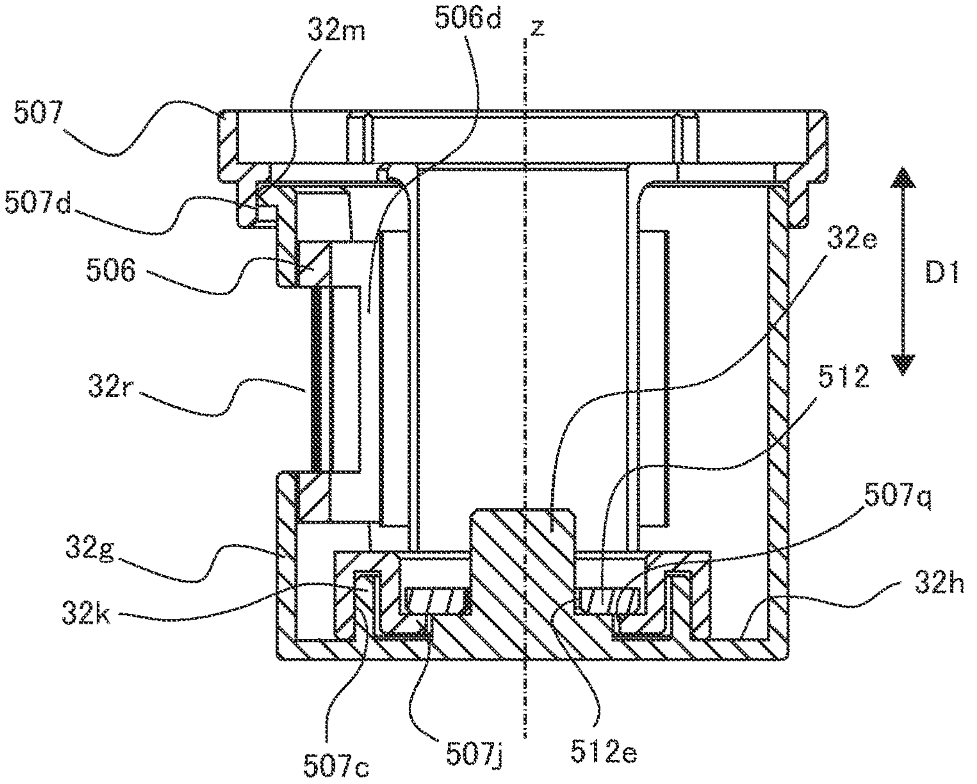
FIG. 19B is a cross-sectional view illustrating the toner receiving portion that is in the open state.

As illustrated in FIG. 18, the inner diameter portion 507*h* of the shutter member 507 has a guide groove portion 507*c*, into which a guide rib 32*k* of the cylindrical portion 32*g* is inserted. As illustrated in FIGS. 18 to 19B, the guide groove portion 507*c* is a cylindrical groove formed around the rotation axis z, and the guide rib 32*k* is a cylindrical projecting portion formed around the rotation axis z (the guide groove portion 507*c* and the guide rib 32*k* are coaxially formed around the rotation axis z). Thus, after the guide rib 32*k* is inserted into the guide groove portion 507*c*, the shutter member 507 is guided by the guide rib 32*k* such that the shutter member 507 can rotate with respect to the cylindrical portion 32*g* on the rotation axis Z.

In addition, an inner circumferential surface 507*d* of the shutter member 507 can slide on a rib 32*m* of the cylindrical portion 32*g*. Thus, the shutter member 507 is supported by the cylindrical portion 32*g* such that the shutter member 507 can rotate with respect to the cylindrical portion 32*g* on the rotation axis z.

In addition, the inner diameter portion 507*h* of the shutter member 507 has a hole portion 507*q* formed inside the guide groove portion 507*c* in the radial direction. The hole portion 507*q* is formed such that the engaging portion 32*e* passes through the hole portion 507*q*. Since the outer diameter of the hole portion 507*q* is set larger than the outermost diameter of the engaging portion 32*e*, the shutter member 507 can freely rotate without interfering with the engaging portion 32*e*.

The shutter holding member 512 is press-fit to the engaging portion 32*e* after the shutter member 507 is assembled to the cylindrical portion 32*g*. With this operation, a rib 507*j* of the shutter member 507 is held between the bottom surface 32*h* of the cylindrical portion 32*g* and the shutter holding member 512 in the axis direction D1. As a result, the shutter member 507 is prevented from moving in the axis direction D1. Thus, the receiving shutter unit 601 that includes the shutter member 507 is attached to the receiving base unit 602 that includes the cylindrical portion 32*g* and the shutter holding member 512, such that the receiving shutter unit 601 can rotate relative to the receiving base unit 602 on the rotation axis z, and that the receiving shutter unit 601 cannot move in the axis direction D1 and the radial direction.

The base seal 506 fixed to the cylindrical portion 32*g* is pressed and deformed by the shutter sheet 505 fixed to the shutter member 507, toward the cylindrical portion 32*g*, that is, outward in the radial direction orthogonal to the axis direction D1. As a result, the base seal 506 produces surface pressure between the sliding surface 506*d* of the base seal 506 and the sliding surface 505*k* (see FIG. 17A) of the shutter sheet 505. Thus, when the toner is stored in the developer container 32 in a state where the developer container 32 is not joined with the toner pack 40, the toner can be prevented from leaking in the interface between the base seal 506 and the shutter sheet 505.

Joining of Toner Pack and Cylindrical Portion of Developer Container

Figure 3A:
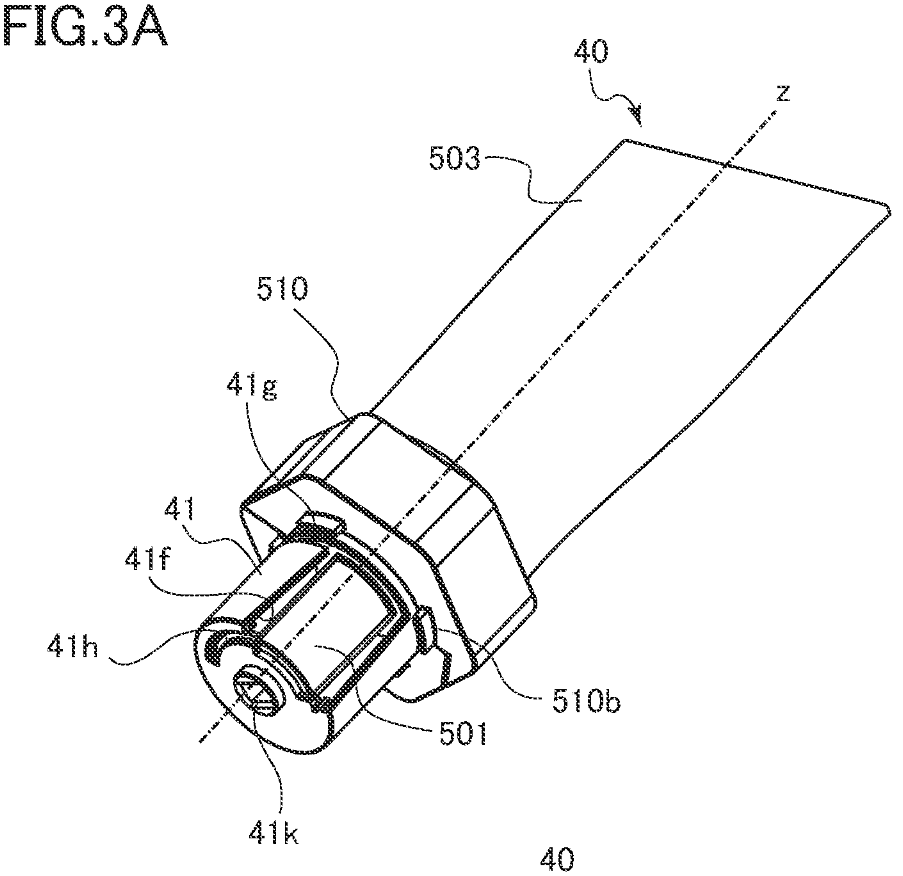
FIG. 3A is a perspective view illustrating a toner pack.
Figure 3B:
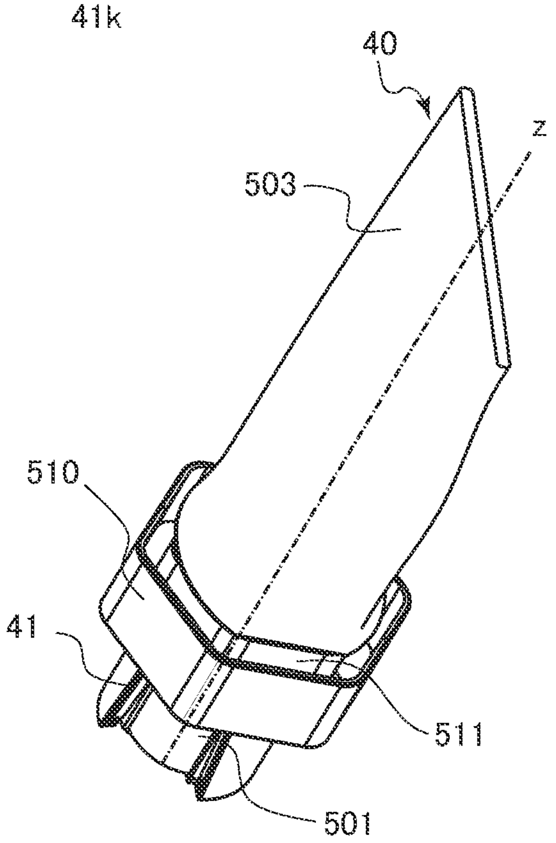
FIG. 3B is a perspective view illustrating the toner pack.
Figure 4:
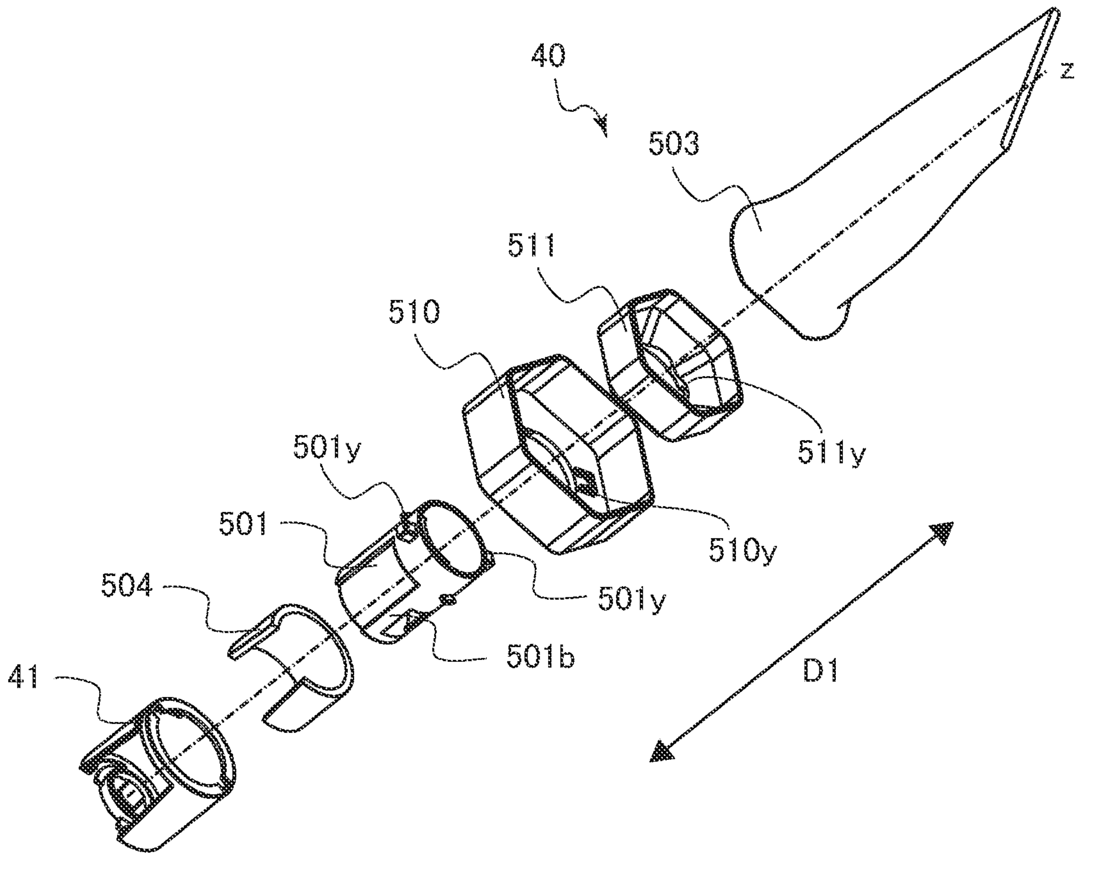
FIG. 4 is an exploded perspective view illustrating the toner pack.

Next, operations for joining and separating the toner pack 40 and the developer container 32 and opening and closing the toner outlet 501*r* and the toner inlet 32*r* will be described. FIGS. 3A and 11A illustrate the shield state of the toner pack 40 in which the toner outlet 501*r* is shielded by the seal member 504 attached to the shutter member 41. FIGS. 12A and 13A illustrate the shield state of the toner receiving portion 600 in which the toner inlet 32*r* is shielded by the shutter sheet 505 attached to the shutter member 507.

Normally, before the toner is supplied to the developer container 32, both the toner pack 40 and the toner receiving portion 600 are in the shield state. In other words, when the supply base 501 is located at the first shielding position, the toner outlet 501*r* is located at a position at which the toner outlet 501*r* does not overlap with the toner inlet 32*r* of the cylindrical portion 32*g* when viewed in the radial direction orthogonal to the axis direction D1, and the shutter member 507 is located at the second shielding position.

Figure 20A:
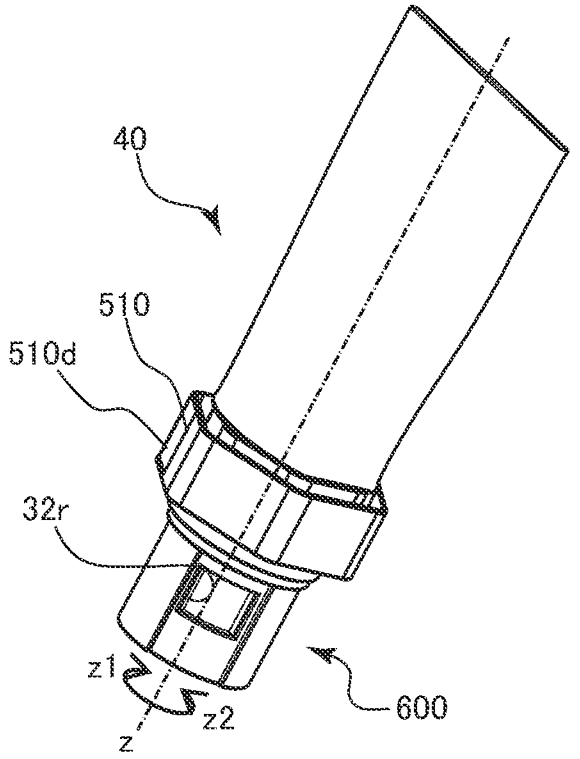
FIG. 20A is a perspective view illustrating the toner receiving portion and the toner pack that are in the shield state.

Then, a user fits the toner pack 40 in the toner receiving portion 600, as illustrated in FIG. 20A. In this time, the engaged portion 41*k* (see FIG. 3A) formed in the shutter member 41 of the toner pack 40 engages with the engaging portion 32*e* formed on the cylindrical portion 32*g* of the toner receiving portion 600.

Since the engaged portion 41*k* and the engaging portion 32*e*, each of which has a double-D shape, engage with each other, the shutter member 41 is attached to the cylindrical portion 32*g* such that the shutter member 41 cannot rotate with respect to the cylindrical portion 32*g* on the rotation axis z. That is, when the toner pack 40 is attached to the image forming apparatus 1, the engaged portion 41*k* engages with the engaging portion 32*e* of the image forming apparatus 1, so that the engaged portion 41*k* is prevented from rotating on the rotation axis z of the shutter member 41.

In other words, the toner pack 40 is attached to the image forming apparatus 1 such that the shutter member 507 is prevented from rotating with respect to the cylindrical portion 32*g* on the rotation axis z, and that the supply base 501 rotates together with the shutter member 507.

In addition, the convex portion 507*e* (see FIG. 13A) of the shutter member 507 of the toner receiving portion 600 passes through the cutout portion 41*f* of the shutter member 41 of the toner pack 40, and engages with the concave portion 501*f* (see FIG. 8A) of the supply base 501. Note that when both the toner pack 40 and the toner receiving portion 600 are in the shield state, and when the toner pack 40 is fit in the toner receiving portion 600, the engagement between the engaged portion 41*k* and the engaging portion 32*e* and the engagement between the convex portion 507*e* and the concave portion 501*f* are performed at the same time.

Next, the case in which the toner of the toner pack 40 is supplied to the developer container 32 by a user rotating the outer circumferential surface 510*d* of the outer ring member 510, in the state of FIG. 20A, on the rotation axis z in the direction indicated by the arrow z1 will be described. When the outer ring member 510 is rotated in the direction indicated by the arrow z1, the supply base 501 also rotates in the direction indicated by the arrow z1, together with the outer ring member 510. In this time, a step portion 501*n* (see FIG. 8A) of the concave portion 501*f* of the supply base 501 presses an edge surface 507*f* (see FIG. 13A) of the convex portion 507*e* of the shutter member 507. The edge surface 507*f* serves as an abutted portion.

In other words, when the toner pack 40 is attached to the image forming apparatus 1, and the outer ring member 510 is rotated in the direction indicated by the arrow z1, the step portion 501*n* that serves as an abutting portion abuts against the edge surface 507*f* so that the shutter member 507 rotates together with the supply base 501 on the rotation axis z. With this operation, the shutter member 507 that serves as a main-body shutter rotates together with the supply base 501, on the rotation axis z in the direction indicated by the arrow z.

On the other hand, the cylindrical portion 32*g* of the toner receiving portion 600 and the shutter member 41 of the toner pack 40 do not rotate because they are prevented from rotating as described above. Thus, as illustrated in FIG. 11B, the supply base 501 of the toner pack 40 rotates relative to the shutter member 41 in the direction indicated by the arrow z1, and the toner outlet 501*r* faces the cutout portion 41*f* of the shutter member 41. That is, the toner pack 40 becomes the open state, and can discharge the toner stored in the toner pack 40.

At the same time, as illustrated in FIG. 13B, the shutter member 507 of the toner receiving portion 600 rotates relative to the cylindrical portion 32*g* in the direction indicated by the arrow z, and the shutter sheet 505 fixed to the shutter member 507 moves away from the toner inlet 32*r*. That is, the toner receiving portion 600 becomes the open state, and can receive the toner discharged from the toner pack 40. In other words, the shutter member 507 is located at the second opening position that causes the toner inlet 32*r* to be opened by the shutter member 507, so that the toner from the toner pack 40 is supplied to the storage portion 36 of the developer container 32 through the toner inlet 32*r*. In addition, when the supply base 501 is located at the first opening position, the toner outlet 501*r* is located at a position at which the toner outlet 501*r* overlaps with the toner inlet 32*r* of the cylindrical portion 32*g* when viewed in the radial direction orthogonal to the axis direction D1, and the shutter member 507 is located at the second opening position.

Figure 20B:
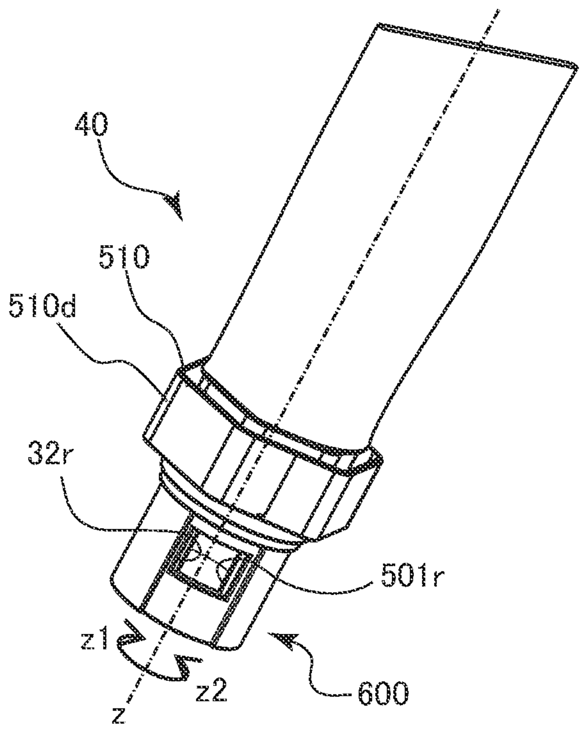
FIG. 20B is a perspective view illustrating the toner receiving portion and the toner pack that are in the open state.

In this manner, as illustrated in FIG. 20B, the toner stored in the toner pack 40 is supplied to the developer container 32 through the toner outlet 501*r* and the toner inlet 32*r*. Note that the rotation angle of the outer ring member 510 is limited to about 90° by the engagement between the convex portion 507*e* of the shutter member 507 and the groove portions 41*g* and 41*h* of the shutter member 41 and the engagement between the ribs 510*b* of the outer ring member 510 and the groove portions 507*p* of the shutter member 507. In another case, however, the rotation angle of the outer ring member 510 may not be limited to about 90°, and may be less than 90° or equal to or larger than 90°.

Since the convex portion 507*e* of the shutter member 507 engages with the groove portion 41*g* of the shutter member 41, the toner pack 40 is prevented from moving with respect to the toner receiving portion 600 in the axis direction D1, and can be locked on the toner receiving portion 600. In this state, the toner pack 40 can be prevented from being mistakenly separated from the toner receiving portion 600 when the toner is being supplied, and thus the toner can be prevented from flying into the interior of the image forming apparatus 1. Thus, the workability of toner supply operation can be improved.

Next, the case in which the toner pack 40 is separated from the cylindrical portion 32*g* of the developer container 32 by a user rotating the outer circumferential surface 510*d* of the outer ring member 510, in the state of FIG. 20B, on the rotation axis z in the direction indicated by the arrow z2 will be described. When the outer ring member 510 is rotated in the direction indicated by the arrow z2, the supply base 501 also rotates in the direction indicated by the arrow z2, together with the outer ring member 510. In this time, a step portion 501*m* (see FIG. 8A) of the concave portion 501*f* of the supply base 501 presses an edge surface 507*g* (see FIG. 13B) of the convex portion 507*e* of the shutter member 507. With this operation, the shutter member 507 rotates together with the supply base 501, on the rotation axis z in the direction indicated by the arrow z2.

On the other hand, the cylindrical portion 32*g* of the toner receiving portion 600 and the shutter member 41 of the toner pack 40 do not rotate because they are prevented from rotating as described above. Thus, as illustrated in FIG. 11A, the supply base 501 of the toner pack 40 rotates relative to the shutter member 41 in the direction indicated by the arrow z2, and the toner outlet 501*r* faces the seal member 504 (see FIG. 10A) fixed to the shutter member 41. That is, the toner pack 40 becomes the shield state, and cannot discharge the toner stored in the toner pack 40.

At the same time, as illustrated in FIG. 13A, the shutter member 507 of the toner receiving portion 600 rotates relative to the cylindrical portion 32*g* in the direction indicated by the arrow z2, and the shutter sheet 505 fixed to the shutter member 507 covers the toner inlet 32*r*. That is, the toner receiving portion 600 becomes the shield state, and cannot receive the toner to be discharged from the toner pack 40. In this time, the shutter member 507 is located at the second shielding position at which the shutter member 507 shields the toner inlet 32*r*.

In this state, since the convex portion 507*e* of the shutter member 507 is separated from the groove portions 41*g* and 41*h* of the shutter member 41, the toner pack 40 can be removed from the toner receiving portion 600. In addition, since both the toner pack 40 and the toner receiving portion 600 are in the shield state, the toner pack 40 can be removed from the toner receiving portion 600 without causing the toner to fly.

Configuration for Toner Leakage Prevention

Next, a configuration to prevent the toner from leaking from between the toner pack 40 and the toner receiving portion 600 will be described with reference to FIGS. 21A to 23B. FIGS. 21A to 23B are schematic cross-sectional views illustrating a relationship in arrangement between the toner pack 40 and the toner receiving portion 600 of the developer container 32. Note that although each of the seal member 504 and the base seal 506 is actually disposed on a cylindrical curved surface, each of the seal member 504 and the base seal 506 is schematically illustrated as a flat sheet in FIGS. 21A to 23B.

FIGS. 21A to 23B illustrate the toner pack 40 and the toner receiving portion 600 when viewed in the axis direction D1. Note that when the outer ring member 510 (see FIG. 20A) of the toner pack 40 is rotated in the direction indicated by the arrow z1, the supply base 501 moves leftward in FIGS. 21A to 23B.

Figure 21A:
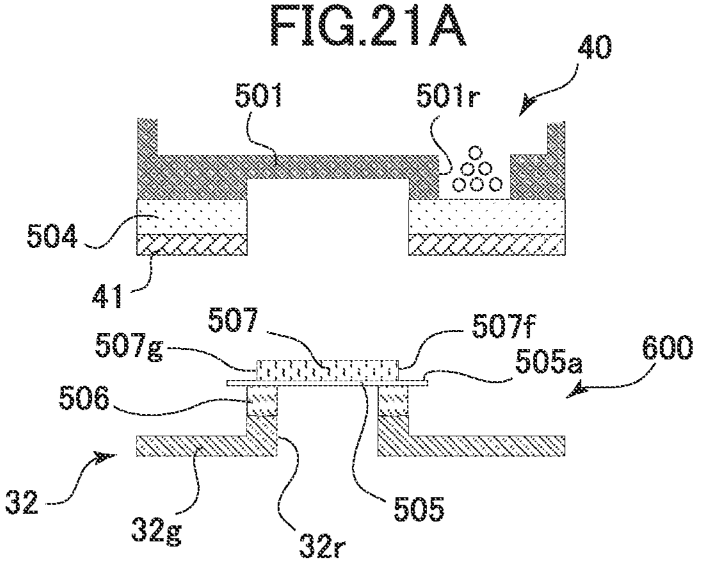
FIG. 21A is a cross-sectional view illustrating a state in which the toner pack is still not attached to a developer container.
Figure 21B:
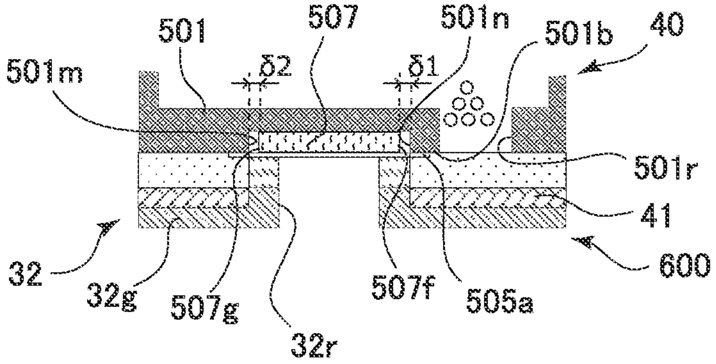
FIG. 21B is a cross-sectional view illustrating a state in which the toner pack is attached to the developer container.

FIG. 21A illustrates a state in which the developer container 32 is still not joined with the toner pack 40. FIG. 21B illustrates a state in which the toner pack 40 that was in the state of FIG. 21A is attached to the developer container 32. In the state of FIG. 21B, the supply base 501 of the toner pack 40 and the shutter member 507 of the toner receiving portion 600 are still not rotated. In the state of FIG. 21B, the toner inlet 32*r* and the toner outlet 501*r* are shielded, and the toner stored in the pouch 503 (see FIG. 3A) is not discharged to the outside of the toner pack 40.

Figure 21C:
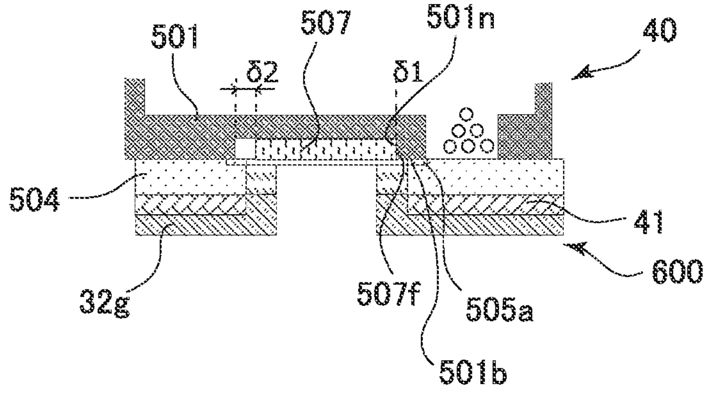
FIG. 21C is a cross-sectional view illustrating a state in which the supply base that was in the state illustrated in FIG. 21B has been rotated by a predetermined angle.
Figure 22A:
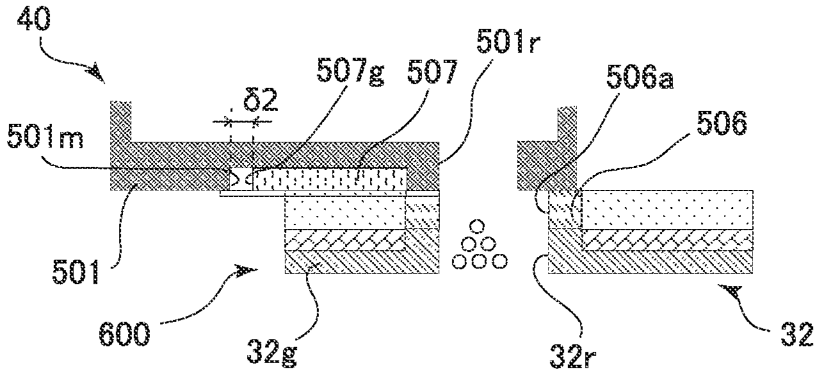
FIG. 22A is a cross-sectional view illustrating a state in which a toner inlet and a toner outlet are opened.

FIG. 21C illustrates a state in which the supply base 501 and the shutter member 507 that were in the state of FIG. 21B have been rotated by an angle of Θ1 (0°<Θ1<90°) on the rotation axis z in the direction indicated by the arrow z1 (see FIG. 20A). FIG. 22A illustrates a state in which the supply base 501 and the shutter member 507 that were in the state of FIG. 21B have been rotated by 90° in the direction indicated by the arrow z1 (see FIG. 20A). In this state, the toner inlet 32*r* and the toner outlet 501*r* are opened.

As illustrated in FIG. 21B, in the state where the toner pack 40 in the shield state is attached to the toner receiving portion 600 in the shield state, the leading-edge portion 505*a* of the shutter sheet 505 is in contact with the outer circumferential portion 501*b* of the supply base 501. In addition, the step portion 501*n* of the supply base 501 is located such that a clearance 81 is formed between the step portion 501*n* and the edge surface 507*f* of the shutter member 507 in a direction of a circumference around the rotation axis z. The step portion 501*m* of the supply base 501 is located such that a clearance δ2 is formed between the step portion 501*m* and the edge surface 507*g* of the shutter member 507 in the direction of the circumference around the rotation axis z.

Each of the clearances 51 and 82 is a clearance (play) necessary for a user to attach the toner pack 40 to the developer container 32. The clearances 51 and 52 allow a user to easily attach the toner pack 40 to the developer container 32, and thus can improve the attachability of the toner pack 40.

After attaching the toner pack 40 to the toner receiving portion 600 of the developer container 32, the user rotates the supply base 501 in the direction indicated by the arrow z1. With this operation, as illustrated in FIG. 21C, the clearance 51 of FIG. 21B is removed, and the step portion 501*n* of the supply base 501 contacts the edge surface 507*f* of the shutter member 507. The edge surface 507*f* is pressed by the step portion 501*n*, and the supply base 501 and the shutter member 507 are rotated together in the direction indicated by the arrow z1. In the state of FIG. 21C, the clearance δ2 is made larger than the clearance δ2 in the initial state. The leading-edge portion 505*a* of the shutter sheet 505 remains in contact with the outer circumferential portion 501*b* of the supply base 501, without being separated from the outer circumferential portion 501*b*.

As illustrated in FIG. 22A, if the user further rotates the supply base 501 in the direction indicated by the arrow z1, the toner outlet 501*r* and the toner inlet 32*r* are opened, without being covered by the shutter member 507 and the shutter sheet 505. Then, the toner stored in the toner pack 40 is supplied to the developer container 32 through the toner outlet 501*r* and the toner inlet 32*r*. While the toner is supplied, the base seal 506 prevents the toner from entering the interface between the supply base 501 and the base seal 506.

Figure 22B:
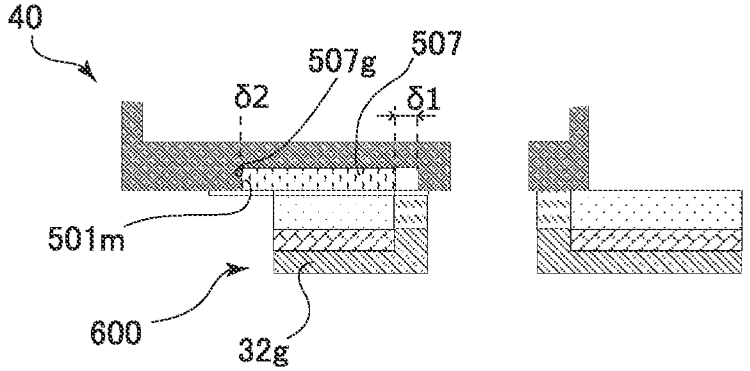
FIG. 22B is a cross-sectional view illustrating a state in which the supply base that was in the state illustrated in FIG. 22A has been rotated by a predetermined angle.

As illustrated in FIG. 22B, when the user removes the toner pack 40 after finishing discharging the toner, the user rotates the supply base 501, in the state of FIG. 22A, by an angle of Θ3 (0°<Θ3<90°) in the direction indicated by the arrow z2 (i.e. rightward in FIG. 22B). With this operation, the step portion 501*m* of the supply base 501 contacts the edge surface 507*g* of the shutter member 507, and the clearance 52 of FIG. 22A is removed. The edge surface 507*g* is pressed by the step portion 501*m*, and the supply base 501 and the shutter member 507 are rotated together in the direction indicated by the arrow z2. In the state of FIG. 22B, the clearance 51 is made larger than the clearance 61 in the initial state.

Figure 23A:
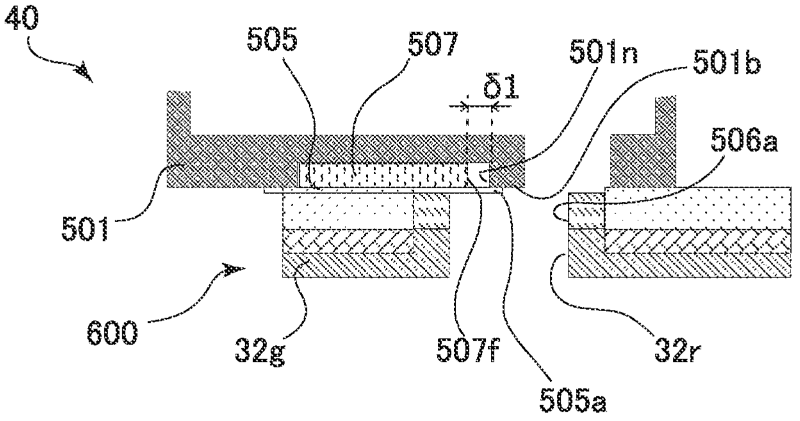
FIG. 23A is a cross-sectional view illustrating a state in which the supply base that was in the state illustrated in FIG. 22B has been rotated by a predetermined angle.

As illustrated in FIG. 23A, if the user further rotates the supply base 501 in the direction indicated by the arrow z2, the clearance δ1 formed between the step portion 501*n* of the supply base 501 and the edge surface 507*f* of the shutter member 507 is located above the toner inlet 32*r*. In this time, since the leading-edge portion 505*a* of the shutter sheet 505 is in contact with the outer circumferential portion 501*b* of the supply base 501, the toner is prevented from entering the clearance 51.

Figure 23B:
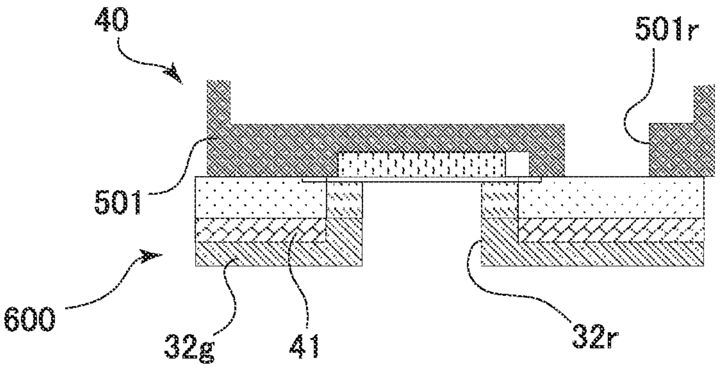
FIG. 23B is a cross-sectional view illustrating a state in which the toner inlet and the toner outlet are shielded.

As illustrated in FIG. 23B, if the user further rotates the supply base 501 in the direction indicated by the arrow z2, the toner outlet 501*r* is shielded by the seal member 504, and the toner inlet 32*r* is shielded by the shutter sheet 505 and the shutter member 507. In this state, the toner pack 40 can be separated from the cylindrical portion 32*g* of the developer container 32. If the toner pack 40 is separated from the cylindrical portion 32*g*, the toner pack 40 and the cylindrical portion 32*g* become the state illustrated in FIG. 21A, again.

Comparative Example

Next, an image forming apparatus 1K will be described as a comparative example with reference to FIG. 24. The image forming apparatus 1K includes a discharging tray 81K, on which a recording material discharged from the discharging outlet 85 is stacked. In the discharging tray 81K, an opening portion 82*a*K is formed. The opening portion 82*a*K is openably covered by an opening-and-closing member 83K.

In addition, the image forming apparatus 1K includes pillar portions 333L and 333R, formed on both sides of the image forming apparatus 1K in a width direction WD of the discharging tray 81K. The pillar portions 333L and 333R constitutes a part of the exterior of the image forming apparatus 1K, and extend upward with respect to the discharging tray 81K and the discharging outlet 85. More specifically, a top surface 87 of the image forming apparatus 1K positioned upstream of the discharging outlet 85 in the discharging direction DD, a top surface 333*t*L of the pillar portion 333L, and a top surface 333*t*R of the pillar portion 333R are formed, nearly flush with each other along a horizontal plane.

In addition, the opening portion 82*a*K is disposed in the vicinity of the pillar portion 333R. Thus, when a user accesses the developer container 32 through the opening portion 82*a*K for supplying toner, the user may feel that the work space is narrow.

Configuration of Discharging Tray

In the present embodiment, however, as illustrated in FIG. 2, the discharging tray 81 is formed flat across the whole width of the image forming apparatus 1 in the width direction WD. Note that the discharging tray 81 includes an area on which a recording material discharged from the discharging roller pair 80 (see FIG. 1) is stacked. The discharging tray 81 is a stacking portion that constitutes a part of the top surface of the exterior of the image forming apparatus 1. Hereinafter, a first area 91 and second areas 92L and 92R of the discharging tray 81 will be individually described. The first area 91 is an area which is positioned downstream of the discharging outlet 85 in the discharging direction DD, and on which a recording material discharged from the discharging roller pair 80 (see FIG. 1) is stacked.

The second areas 92L and 92R are areas positioned downstream of the discharging outlet 85 in the discharging direction DD, and outward with respect to the discharging outlet 85 in the width direction WD. Hereinafter, a second area 92 means both of the second areas 92L and 92R, but the second area 92L means only the area on the left side of the first area 91 and the second area 92R means only the area on the right side of the first area 91.

The image forming apparatus 1 includes a top surface 87 positioned upstream of the discharging outlet 85 in the discharging direction DD, and above the discharging outlet 85. The top surface 87 is a part of the top surface of the exterior of the image forming apparatus 1, and is a third area that is positioned above the first area 91 and the second area 92. In the image forming apparatus 1, the top surface 87, the first area 91, and the second area 92 constitute a top surface portion 95, which is the top surface of the exterior of the image forming apparatus 1. The supplying inlet 32*a* of the developer container 32 is disposed at a position corresponding to the first area 91 in the width direction WD, and the opening portion 82*a* that exposes the supplying inlet 32*a* is formed across the boundary between the first area 91 and the second area 92R. However, the opening portion 82*a* ay be formed only in the first area 91.

In the present embodiment, the second area 92 is formed flush with the first area 91, and at least a part of the second area 92 is positioned below the discharging outlet 85. More suitably, all of the second area 92 are positioned below the discharging outlet 85.

Thus, in a state where the opening-and-closing member 83 is opened, the accessibility for a user to access the developer container 32 can be made larger, and the work space for the user to rotate the toner pack 40 can be easily secured. FIG. 25 is a perspective view illustrating a state in which a user is attaching the toner pack 40 to the image forming apparatus 1. As illustrated in FIG. 25, a user holds, for example, the pouch 503 and the outer ring member 510 of the toner pack 40, and attaches the toner pack 40 to the developer container 32 of the image forming apparatus 1. In the attachment, since the image forming apparatus 1 of the present embodiment does not have the pillar portions 333L and 333R (see FIG. 24) of the Comparative Example, sufficient work space for the user can be secured. In addition, in the image forming apparatus, there is no obstacle that will block the motion of a hand of a user when the user rotates the rotation container unit 401 (see FIG. 8A), which includes the outer ring member 510 (as described above, a user supplies the toner, holding the outer ring member 510 of the toner pack 40). Thus, the workability for supplying the toner to the developer container 32 can be improved. Thus, the present embodiment can be one embodiment of the image forming apparatus, as described above.

In the present embodiment, when the state of the toner pack 40 is being changed from the shield state to the open state, the toner outlet 501*r* is reliably shielded by the seal member 504 and the leading-edge portion 505*a* of the shutter sheet 505. Thus, the toner of the toner pack 40 can be prevented from leaking from the toner outlet 501*r*, and the usability can be improved.

In addition, when the state of the toner pack 40 is being changed from the open state to the shield state, the space formed between the step portion 501*n* and the edge surface 507*f* and corresponding to the clearance δ1 of FIG. 23A is reliably shielded by the leading-edge portion 505*a* of the shutter sheet 505. Thus, the toner can be prevented from entering the clearance δ1. As a result, toner is prevented from flying out of the clearance δ1 when the toner pack 40 is removed, and the usability can be improved.

The toner outlet 501*r* of the toner pack 40 is formed in the outer circumferential portion 501*b*, which extends in the axis direction D1 of the supply base 501. Thus, the area of the toner outlet 501*r* can be made larger, compared to the area of a toner outlet formed in an end portion of the toner pack 40 in the axis direction D1 (for example, the end portion is an end surface of the toner pack 40 perpendicular to the axis direction D1). With this structure, the toner supply efficiency can be increased. In addition, the outer diameter of the supply base 501 and the cylindrical portion 32*g* can be made smaller.

In the present embodiment, the supply base 501 is disposed inside the inner circumferential surface of the shutter member 41. For example, if the developer container 32 becomes full of the toner while the toner is being supplied to the developer container 32, and thus only some of the toner of the toner pack 40 has been supplied to the developer container 32, toner whose surface is leveled stays in the toner outlet 501*r* of the supply base 501. However, before the toner pack 40 is separated from the developer container 32, the state of the toner pack 40 is changed from the open state to the shield state by the toner pack 40 being rotated in a state where the toner pack 40 is attached to the developer container 32, and in this time, the toner outlet 501*r* is shielded by the shutter member 41 on the outer circumferential surface side of the toner outlet 501*r*. In this manner, the toner pack 40 can be separated from the developer container 32, such that the toner which stays in the toner outlet 501*r* and whose surface is leveled can be reliably covered by the shutter member 41. As a result, the toner whose surface is leveled can be prevented from flying into the outside of the developer container 32.

Note that although the engaged portion 41*k* of the shutter member 41 of the toner pack 40 engages with the engaging portion 32*e* of the cylindrical portion 32*g* in the present embodiment, the present disclosure is not limited to this. In addition, although each of the engaged portion 41*k* and the engaging portion 32*e* has a double-D shape, the present disclosure is not limited to this. For example, the engaged portion 41*k* may have a double-D boss shape, and the engaging portion 32*e* may have a double-D hole shape. In addition, regardless of the shape of the engaged portion 41*k* and the engaging portion 32*e*, the engaged portion 41*k* and the engaging portion 32*e* may be press-fit to each other, or may have snap-fit shapes for their engagement.

Second Embodiment

Next, a second embodiment of the present invention will be described. In the second embodiment, a shutter member 507B is used in place of the shutter member 507 of the toner receiving portion 600 of the first embodiment. Thus, the same components as those of the first embodiment are omitted in the drawings, or described with the same symbols given to the drawings.

Figure 15:
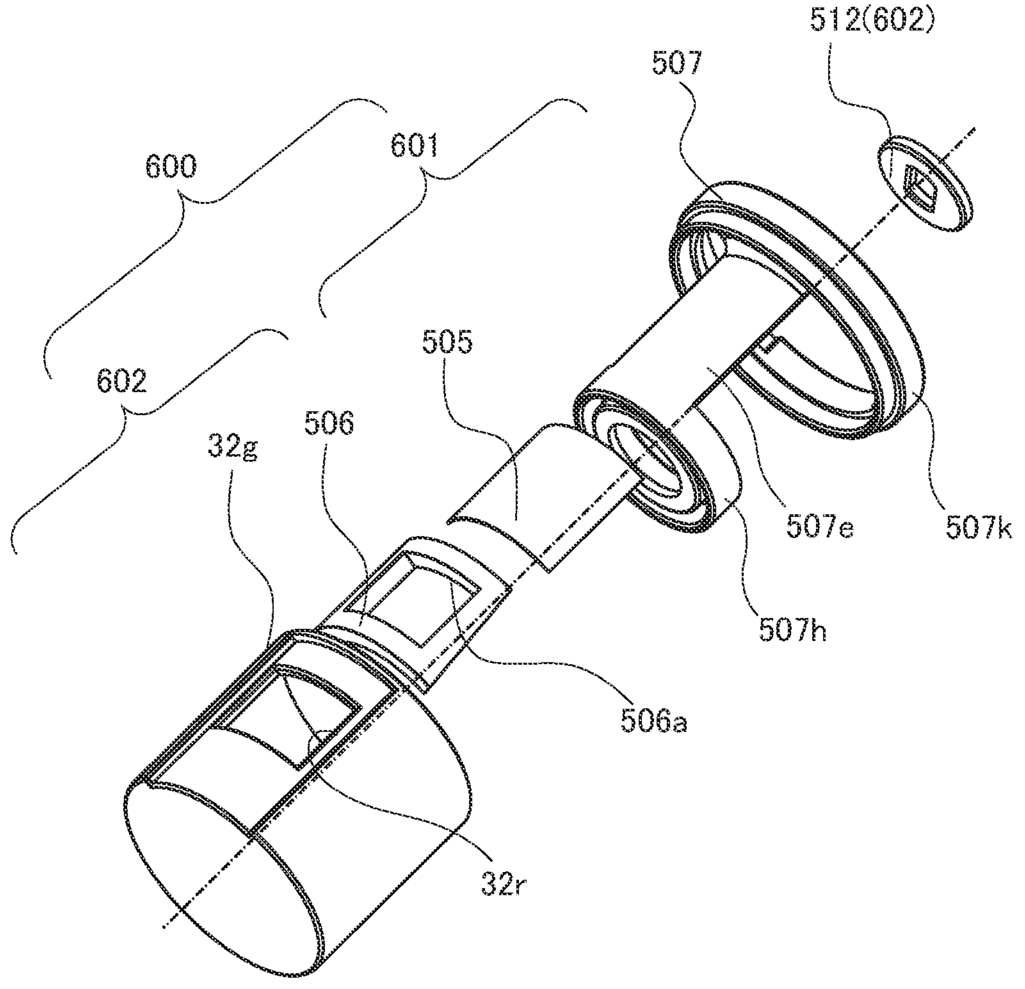
FIG. 15 is an exploded perspective view illustrating the toner receiving portion.

As in the first embodiment, the shutter member 507B of the second embodiment includes the inner diameter portion 507*h*, the outer diameter portion 507*k*, and the convex portion 507*e*, as illustrated in FIG. 15. However, the shutter member 507B differs from the shutter member 507 of the first embodiment only in that the shutter member 507B additionally includes a fitting portion 513.

Figure 26A:
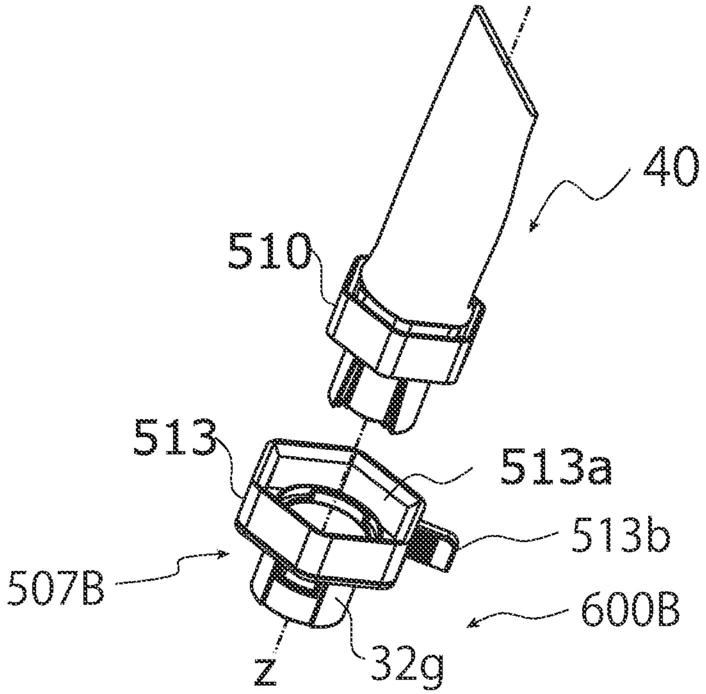
FIG. 26A is an exploded perspective view illustrating a shutter member and a toner pack of a second embodiment.
Figure 26B:
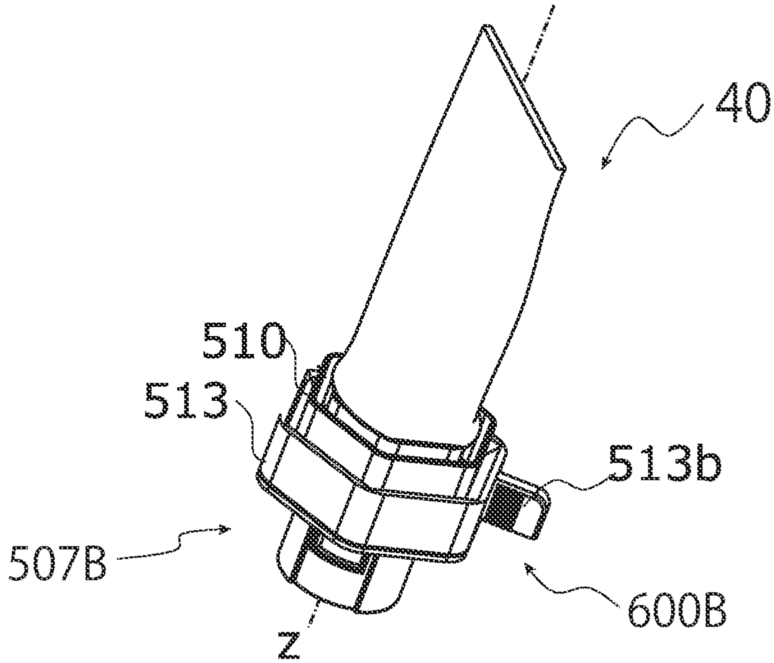
FIG. 26B is a perspective view illustrating the shutter member and the toner pack of the second embodiment.
Figure 27:
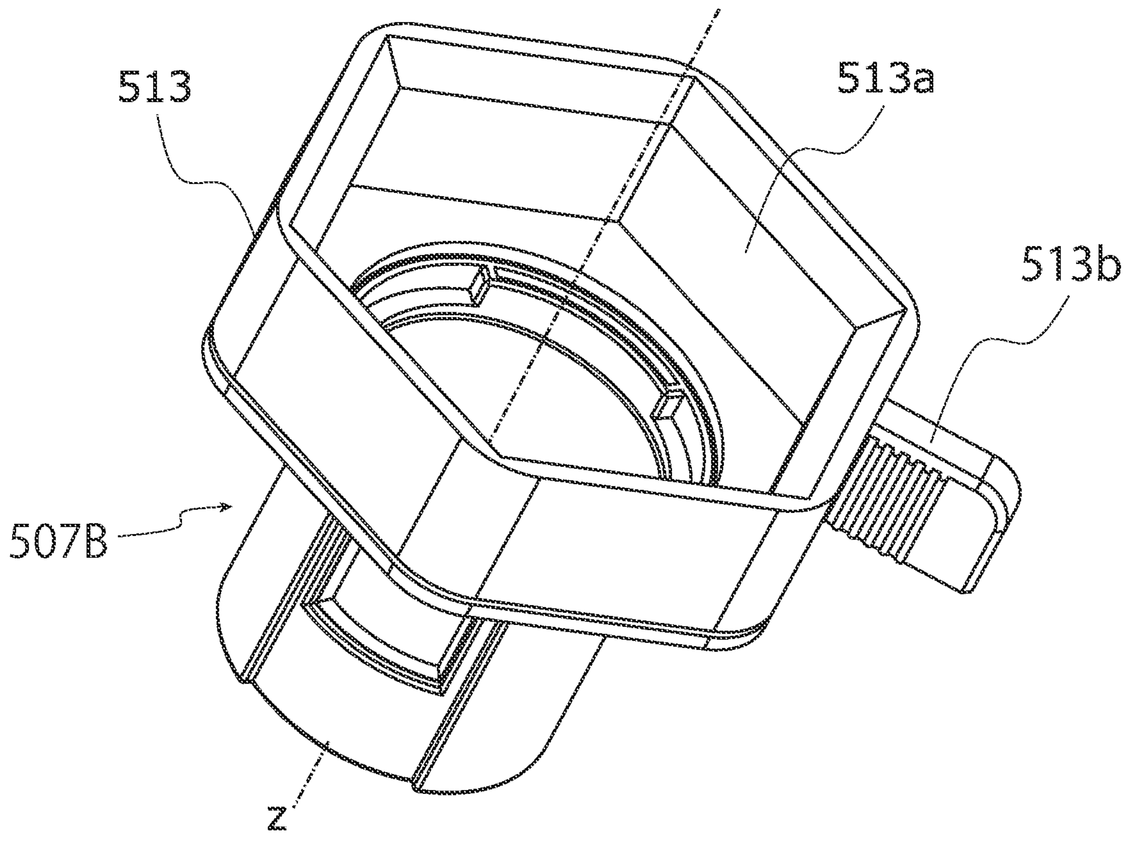
FIG. 27 is an enlarged perspective view illustrating the shutter member.

As illustrated in FIGS. 26A to 27, the fitting portion 513 of the shutter member 507B includes an opening portion 513*a* and a lever portion 513*b*. The opening portion 513*a* is a portion which is nearly hexagonal, and with which the outer ring member 510 of the toner pack 40 engages. The lever portion 513*b* is a portion that a user can rotate.

Figure 28:
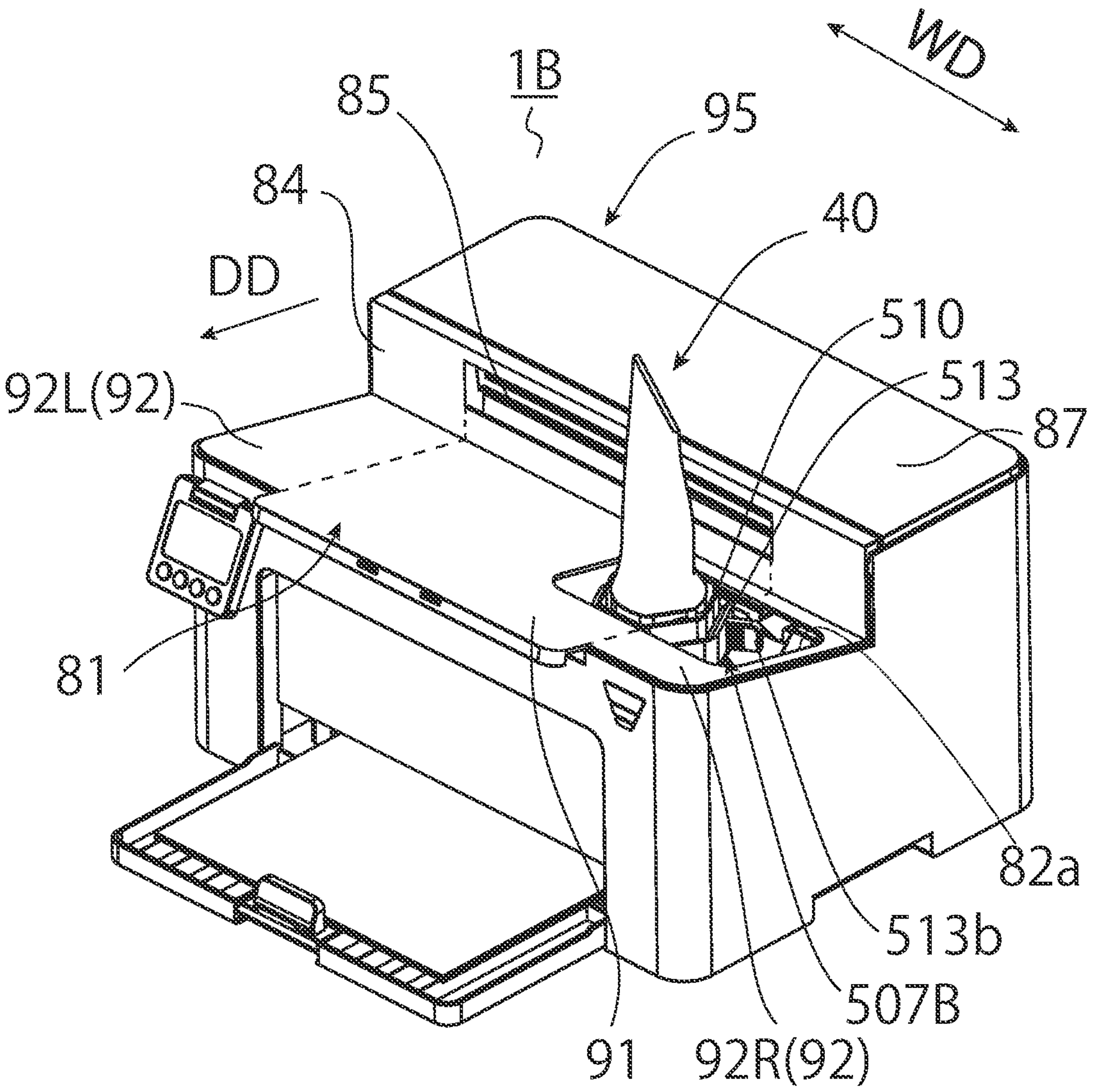
FIG. 28 is a perspective view illustrating an image forming apparatus of the second embodiment.
Figure 29:
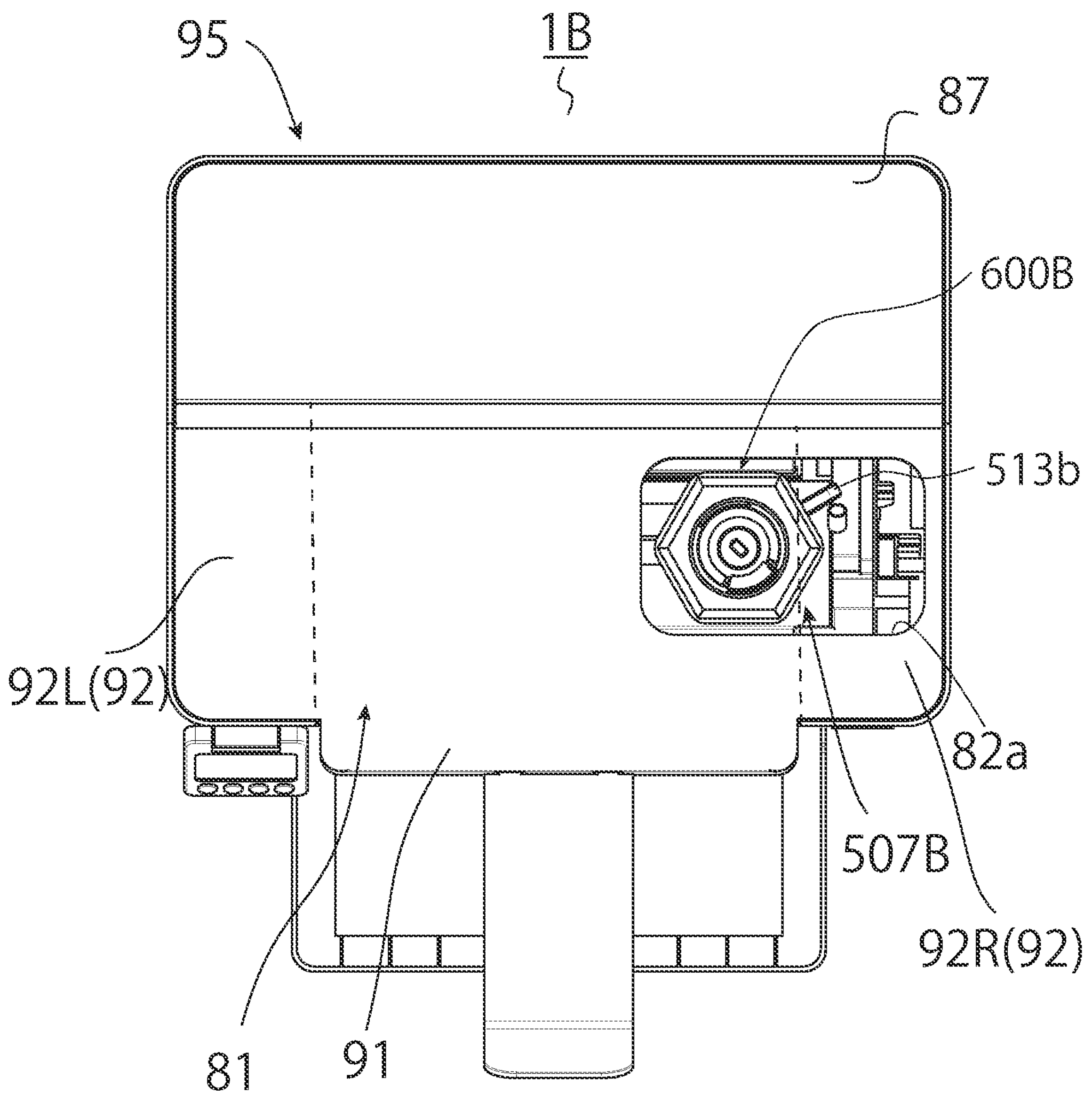
FIG. 29 is a plan view illustrating the image forming apparatus.
Figure 30A:
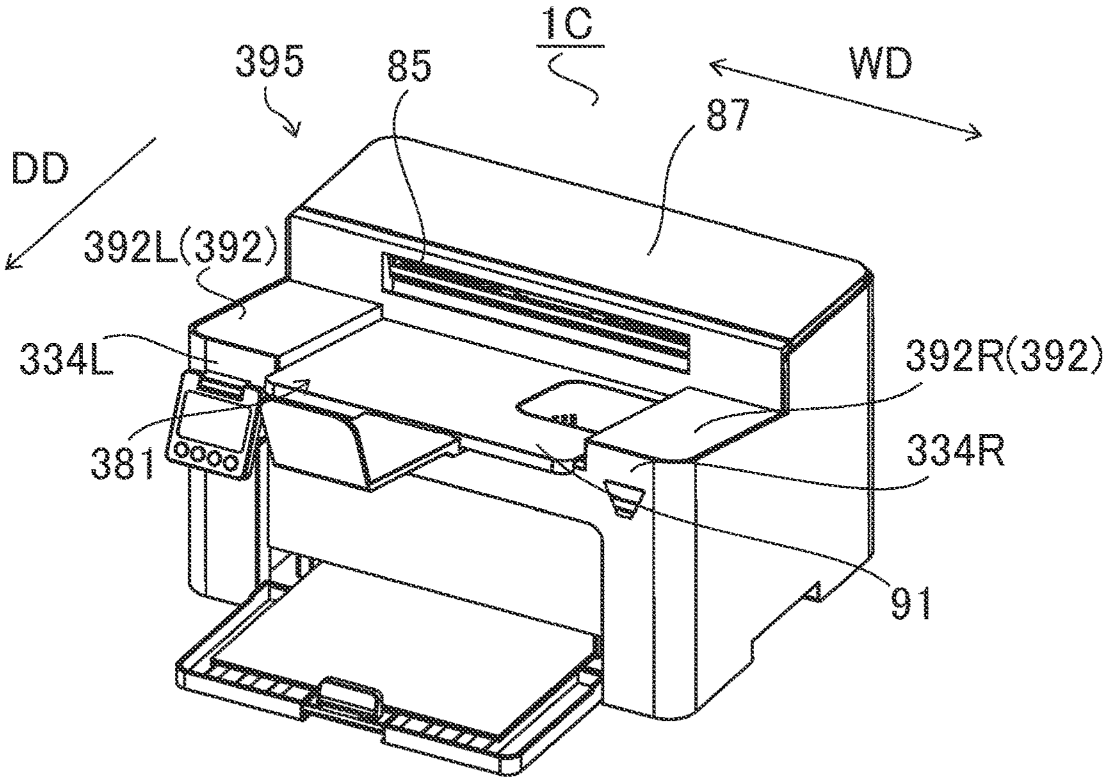
FIG. 30A is a perspective view illustrating an image forming apparatus of a third embodiment.
Figure 30B:
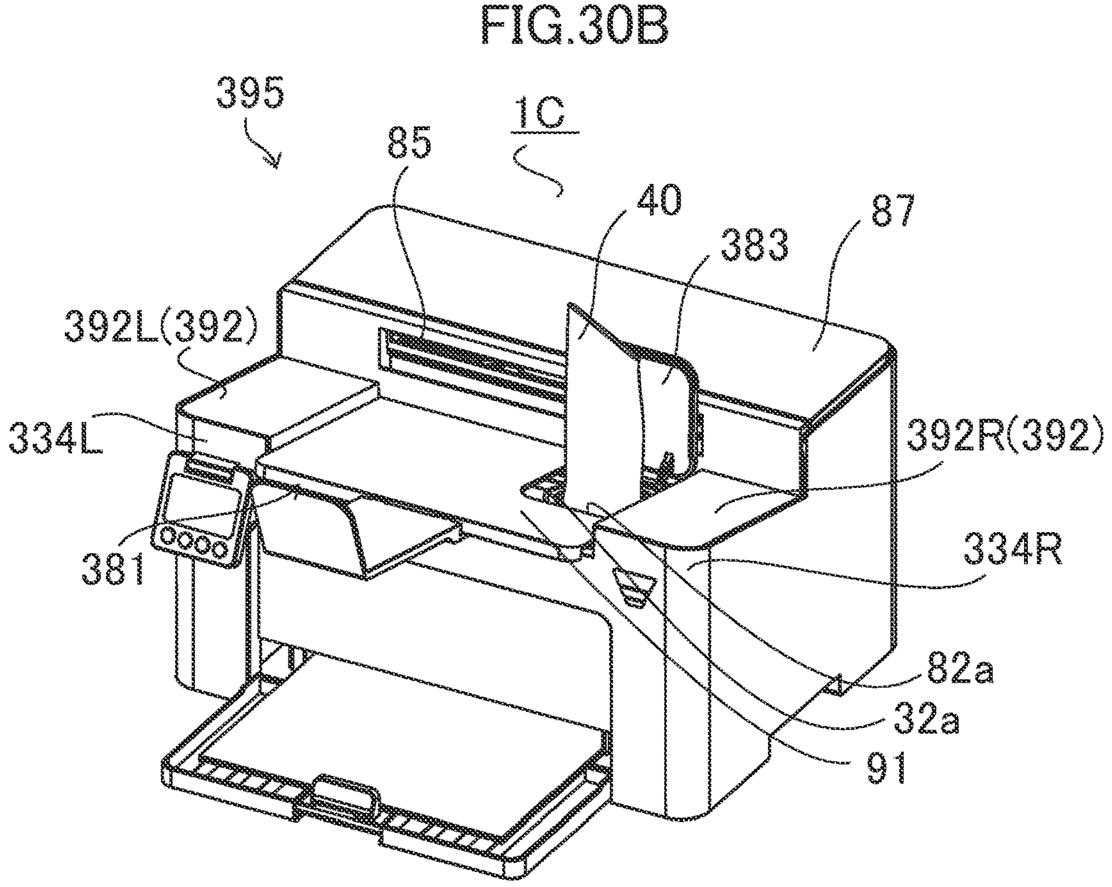
FIG. 30B is a perspective view illustrating the image forming apparatus to which the toner pack is attached.
Figure 31A:
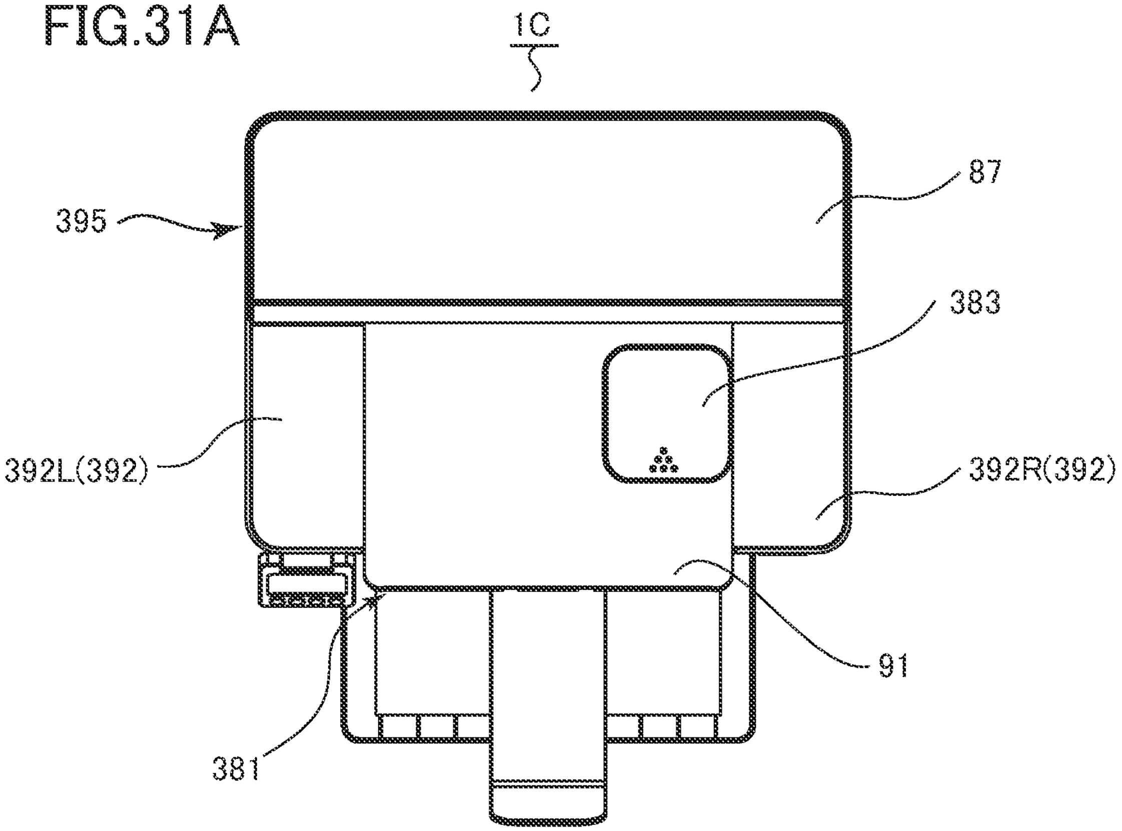
FIG. 31A is a plan view illustrating the image forming apparatus of the third embodiment.
Figure 31B:
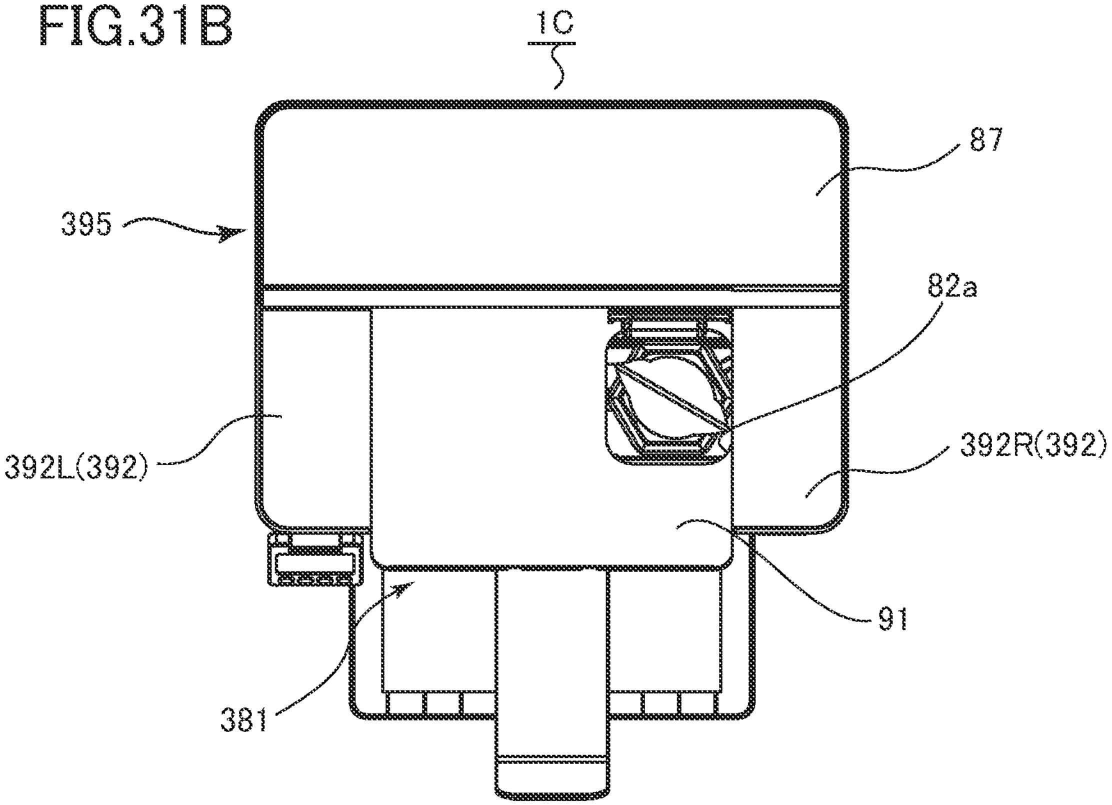
FIG. 31B is a plan view illustrating the image forming apparatus to which the toner pack is attached.

FIG. 28 is a perspective view illustrating an image forming apparatus 1B of the second embodiment. FIG. 29 is a plan view illustrating the image forming apparatus 1B of the second embodiment. The image forming apparatus 1B has a configuration and functions that are basically the same as those of the image forming apparatus 1 of the first embodiment. As illustrated in FIGS. 28 and 29, the discharging tray 81 of the image forming apparatus 1B has an opening portion 82*a* formed on the right side of the apparatus.

The fitting portion 513 of the shutter member 507B is exposed to the outside via the opening portion 82*a*. When a user supplies the toner to the developer container 32 (see FIG. 1), the user fits the toner pack 40 in the fitting portion 513. More specifically, the user fits the outer ring member 510 of the toner pack 40 to the fitting portion 513.

Then the user handles the lever portion 513*b* exposed from the opening portion 82*a*, and rotates the lever portion 513*b* on the rotation axis z (see FIG. 26B). With this operation, the shutter member 507B and the rotation container unit 401 (see FIG. 5) of the toner pack 40 rotate, and the state of the toner pack 40 and the toner receiving portion 600B changes from the shield state to the open state. As a result, the toner of the toner pack 40 can be supplied to the developer container 32.

As described above, in the present embodiment, instead of handling the outer ring member 510 as in the first embodiment, a user handles the lever portion 513*b* of the shutter member 507B, and thereby can change the state of the toner pack 40 and the toner receiving portion 600B from the shield state to the open state.

The space necessary to hold the lever portion 513*b* can be made smaller than the space necessary to hold the outer ring member 510. Thus, the operability of the lever portion 513*b* is good even in a case where the opening portion 82*a* is small, for example. As a result, the usability can be improved. Note that it is advantageous that the opening portion 82*a* is small, for ensuring the sufficient strength of the housing of the image forming apparatus 1B and preventing foreign objects from entering the interior of the image forming apparatus 1B.

By the way, a user may desire a large work space for handling the lever portion 513*b*. Also in the present embodiment, since the discharging tray 81 is formed flat across the whole width of the image forming apparatus 1B in the width direction WD, the work space necessary for a user to rotate the toner pack 40 can be easily secured. Thus, the workability for supplying the toner to the developer container 32 can be improved.

In addition, since the lever portion 513*b* is disposed away from the rotation axis z in the radial direction, more than the outer ring member 510 of the toner pack 40, the force necessary for a user to handle the lever portion 513*b* is reduced. Tus, the usability can be improved.

Note that although the outer ring member 510 of the toner pack 40 is fit in the fitting portion 513 of the shutter member 507B in the present embodiment, the present disclosure is not limited to this. For example, instead of the outer ring member 510, at least any one of the supply base 501, the inner ring member 511, and the pouch 503 may be fixed to the shutter member 507B.

Third Embodiment

Next, a third embodiment of the present invention will be described. In the third embodiment, the exterior of the image forming apparatus of the first embodiment is changed. Thus, the same components as those of the first embodiment are omitted in the drawings, or described with the same symbols given to the drawings.

In the present embodiment, the discharging tray is not flat, as not in the first embodiment. As illustrated in FIGS. 30A to 31B, a top surface portion 395 of an image forming apparatus 1C of the present embodiment includes a top surface 87, a first area 91, and second areas 392L and 392R A discharging tray 381 that serves as a stacking portion includes the first area 91 and the second areas 392L and 392R.

The first area 91 is an area which is positioned downstream of the discharging outlet 85 in the discharging direction DD, and on which a recording material discharged from the discharging roller pair 80 (see FIG. 1) is stacked. The second areas 392L and 392R are areas positioned downstream of the discharging outlet 85 in the discharging direction DD, and outward with respect to the discharging outlet 85 in the width direction WD. Hereinafter, a second area 392 means both of the second areas 392L and 392R, but the second area 392L means only the area on the left side of the first area 91 and the second area 392R means only the area on the right side of the first area 91.

The second area 392L is the top surface of a step portion 334L formed on the left side of the first area 91, and the second area 392R is the top surface of a step portion 334R formed on the right side of the first area 91. The second area 392 is positioned above the first area 91. The first area 91 and the second areas 392L and 392R are parallel to each other. That is, the step portions 334L and 334R are positioned higher than the first area 91.

The supplying inlet 32*a* and the opening portion 82*a*, which exposes the supplying inlet 32*a*, are disposed at a position corresponding to the first area 91, and not disposed in the second area 392. The opening portion 82*a* is covered by an opening-and-closing member 383, which serves as a cover portion. In addition, the supplying inlet 32*a* and the opening portion 82*a* are disposed adjacent to the step portion 334R. By the way, as the height of the step portion 334R increases, the work space necessary to supply the toner decreases, decreasing the workability.

Figure 32A:
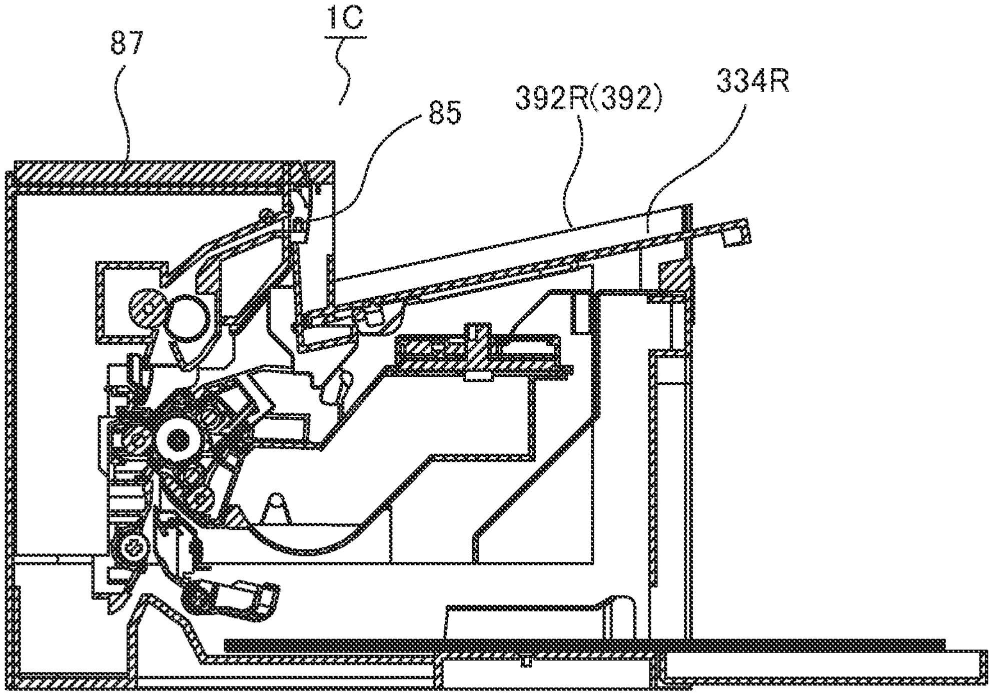
FIG. 32A is a cross-sectional view illustrating the image forming apparatus of the third embodiment.
Figure 32B:
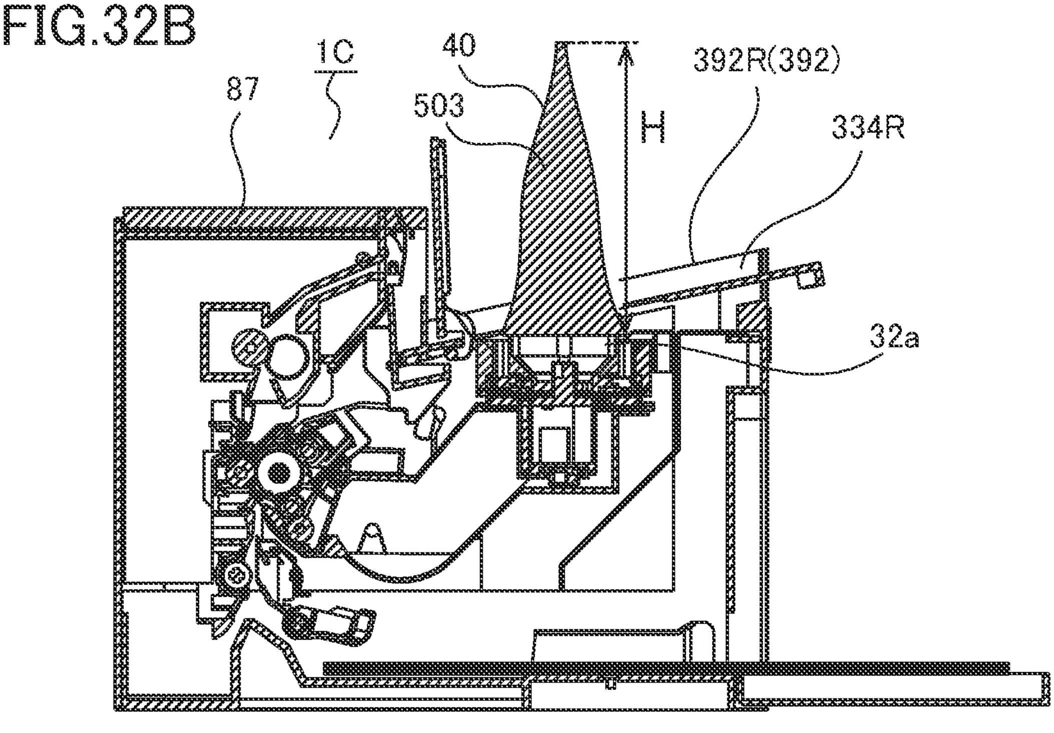
FIG. 32B is a cross-sectional view illustrating the image forming apparatus to which the toner pack is attached.

In the present embodiment, however, as illustrated in FIGS. 32A and 32B, at least a part of the second area 392 is formed below the discharging outlet 85. More preferably, in a state where the toner pack 40 is attached to the supplying inlet 32*a*, the height of the second area 392 is equal to or smaller than half a height H of the pouch 503.

Since the step portions 334L and 334R are formed such that the height of the second area 392 is equal to or smaller than half the height H of the pouch 503, the toner pack 40 can be easily recognized visually and easily held, which can improve the workability. In addition, since the step portions 334L and 334R are formed so as to be slightly higher than the first area 91, the external appearance can be improved for users. In addition, since the step portions 334L and 334R are formed even though the heights of the step portions 334L and 334R are slight, a user can abut a recording material discharged from the discharging outlet 85 against one of the step portions 334L and 334R when taking the recording material out of the discharging tray 381. With this structure, the usability can be improved for a user to take out recording materials from the discharging tray 381.

Figure 33:
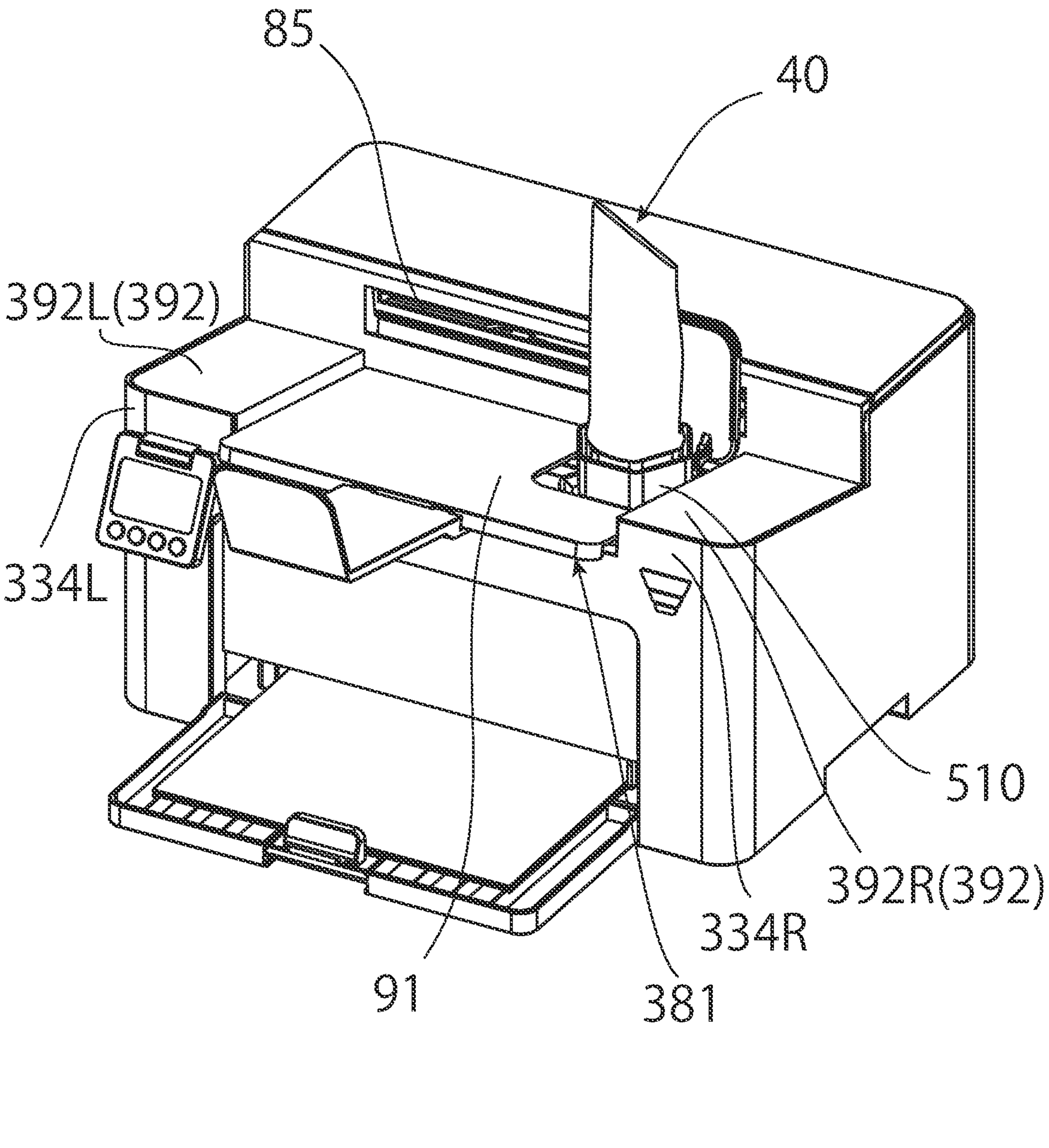
FIG. 33 is a perspective view illustrating a modification of the third embodiment.
Figure 34:
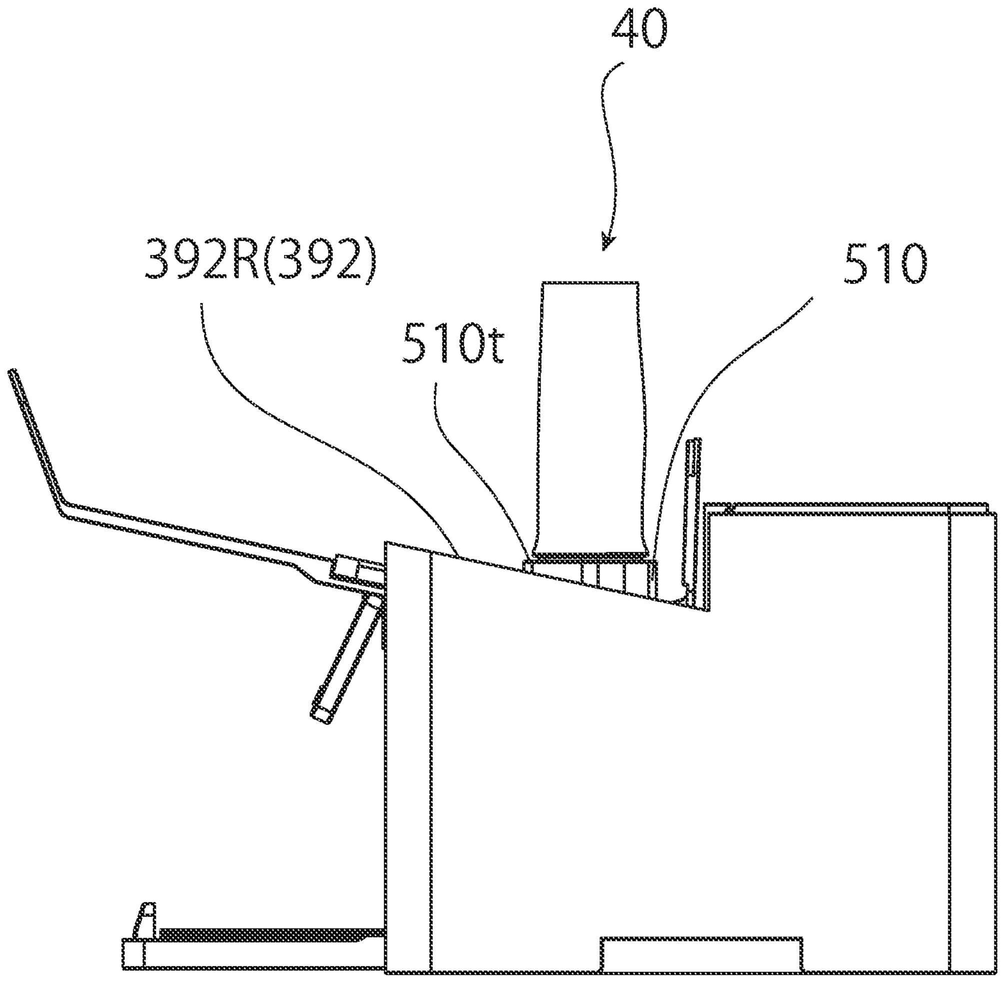
FIG. 34 is a side view illustrating the modification of the third embodiment.

As illustrated in FIGS. 33 and 34, the developer container 32 may be positioned at a higher position, and the outer ring member 510 of the toner pack 40 attached to the supplying inlet 32*a* of the developer container 32 may project upward from the second area 392. In other words, the second area 392 may be positioned below an upper end 510*t* of the outer ring member 510 (that serves as a holding portion) of the toner pack 40 attached to the supplying inlet 32*a*. With this structure, the toner pack 40 can be easily recognized visually and easily held, which can improve the workability.

Fourth Embodiment

Next, a fourth embodiment of the present invention will be described. In the fourth embodiment, the exterior of the image forming apparatus of the first embodiment is changed. Thus, the same components as those of the first embodiment are omitted in the drawings, or described with the same symbols given to the drawings.

Figure 35:
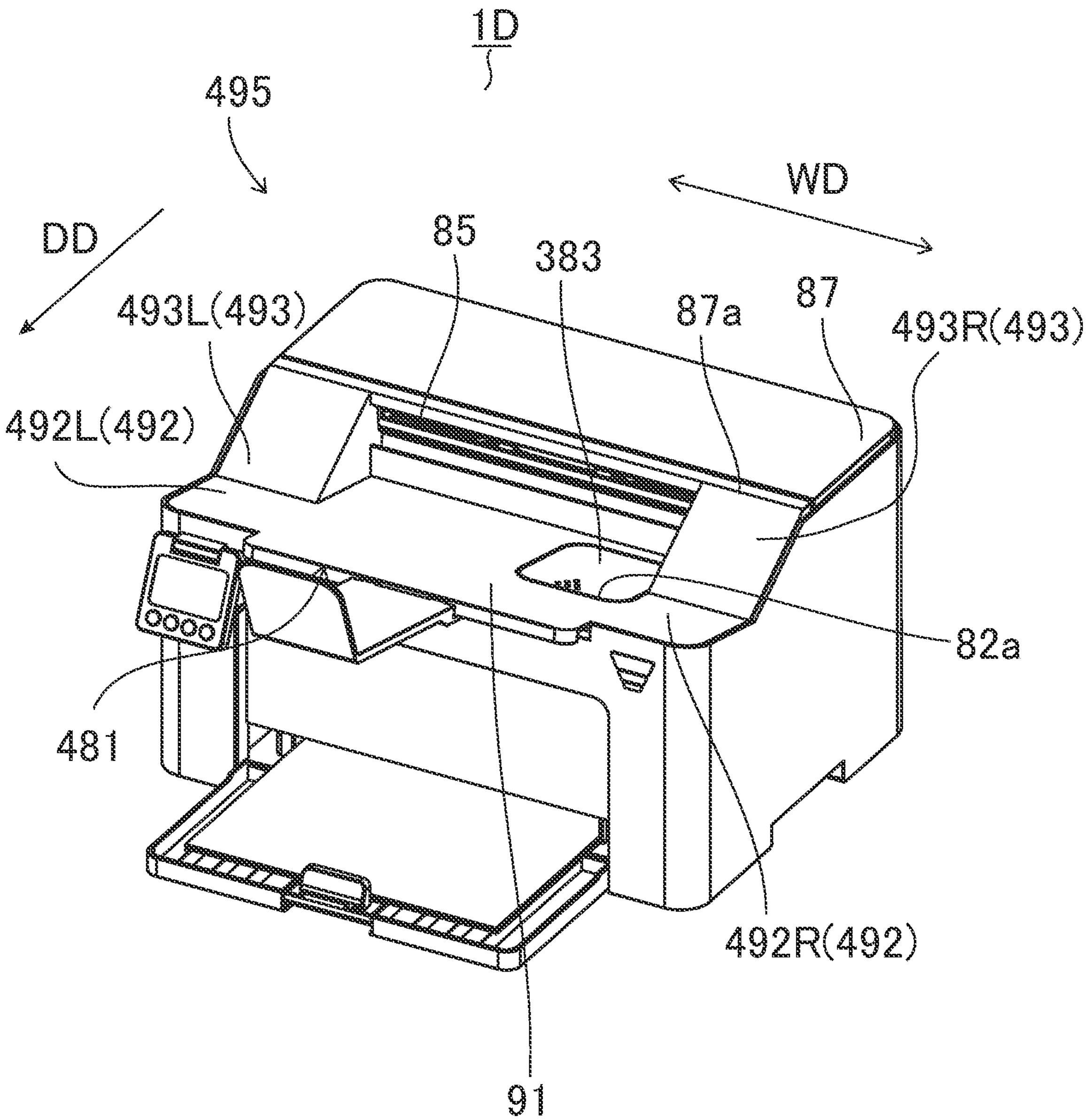
FIG. 35 is a perspective view illustrating an image forming apparatus of a fourth embodiment.

As illustrated in FIG. 35, a top surface portion 495 of an image forming apparatus 1D of the present embodiment includes a top surface 87, a first area 91, second areas 492L and 492R, and sloped portions 493L and 493R A discharging tray 481 that serves as a stacking portion includes the first area 91, the second areas 492L and 492R, and the sloped portions 493L and 493R.

The first area 91 is an area which is positioned downstream of the discharging outlet 85 in the discharging direction DD, and on which a recording material discharged from the discharging roller pair 80 (see FIG. 1) is stacked. The second areas 492L and 492R are areas positioned downstream of the discharging outlet 85 in the discharging direction DD, and outward with respect to the discharging outlet 85 in the width direction WD. Hereinafter, a second area 492 means both of the second areas 492L and 492R, but the second area 492L means only the area on the left side of the first area 91 and the second area 492R means only the area on the right side of the first area 91.

The second area 492 is formed flush with the first area 91, and at least a part of the second area 492 is positioned below the discharging outlet 85. More suitably, all of the second area 492 are positioned below the discharging outlet 85.

The sloped portions 493L and 493R connect between a downstream edge portion 87*a* of the top surface 87 in the discharging direction DD and the second area 492, and are sloped downward in the discharging direction DD. Hereinafter, a sloped portion 493 means both of the sloped portions 493L and 493R, but the sloped portion 493L means only the portion on the left side of the first area 91 and the sloped portion 493R means only the portion on the right side of the first area 91.

As described above, in the present embodiment, the top surface 87 and the second area 492 are smoothly connected with each other via the sloped portion 493. Thus, the workability for supplying the toner to the developer container 32 and the external appearance can be improved.

Fifth Embodiment

Next, a fifth embodiment of the present invention will be described. In the fifth embodiment, the exterior of the image forming apparatus of the fourth embodiment is changed. Thus, the same components as those of the fourth embodiment are omitted in the drawings, or described with the same symbols given to the drawings.

Figure 36:
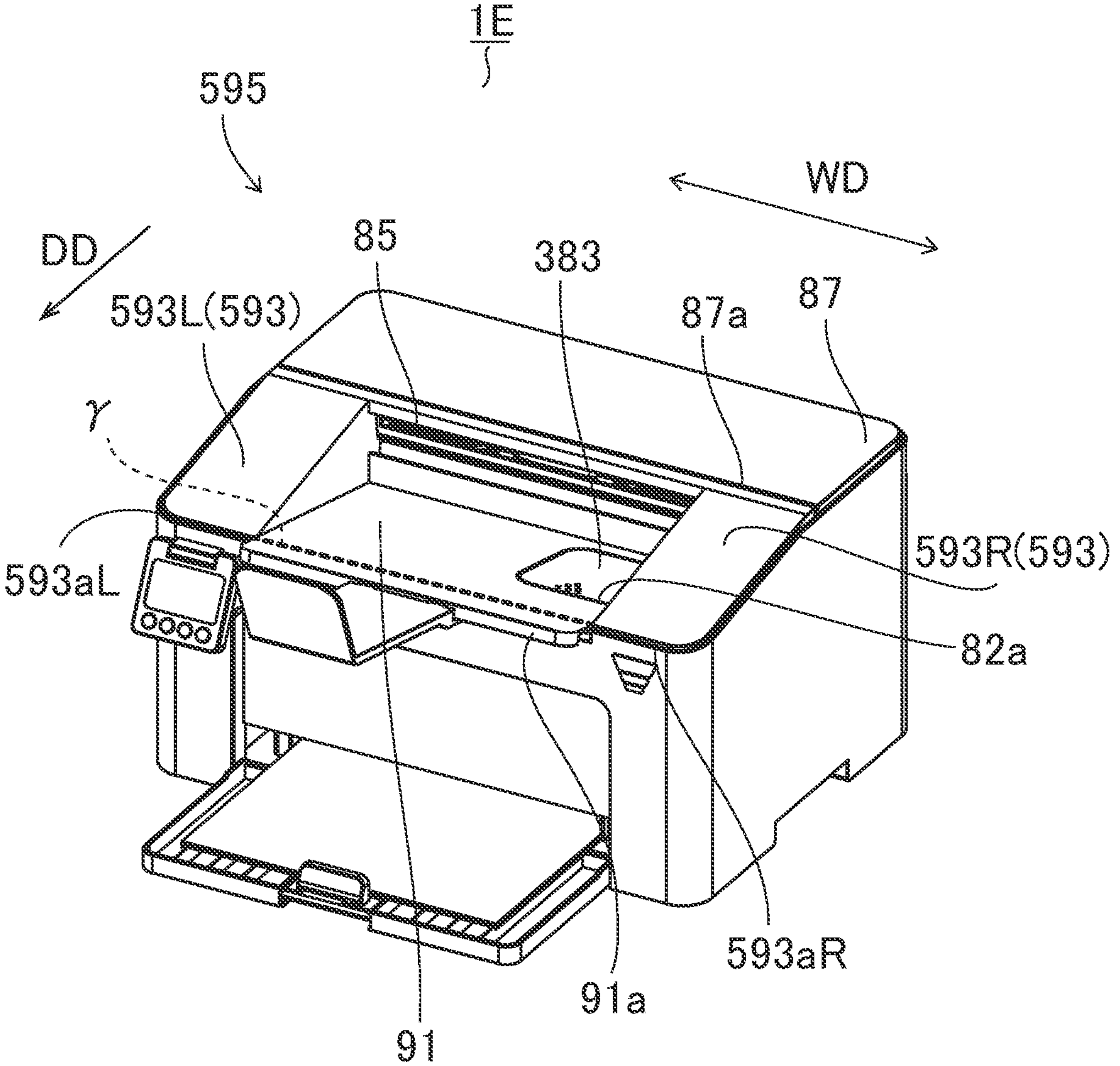
FIG. 36 is a perspective view illustrating an image forming apparatus of a fifth embodiment.
Figure 37A:
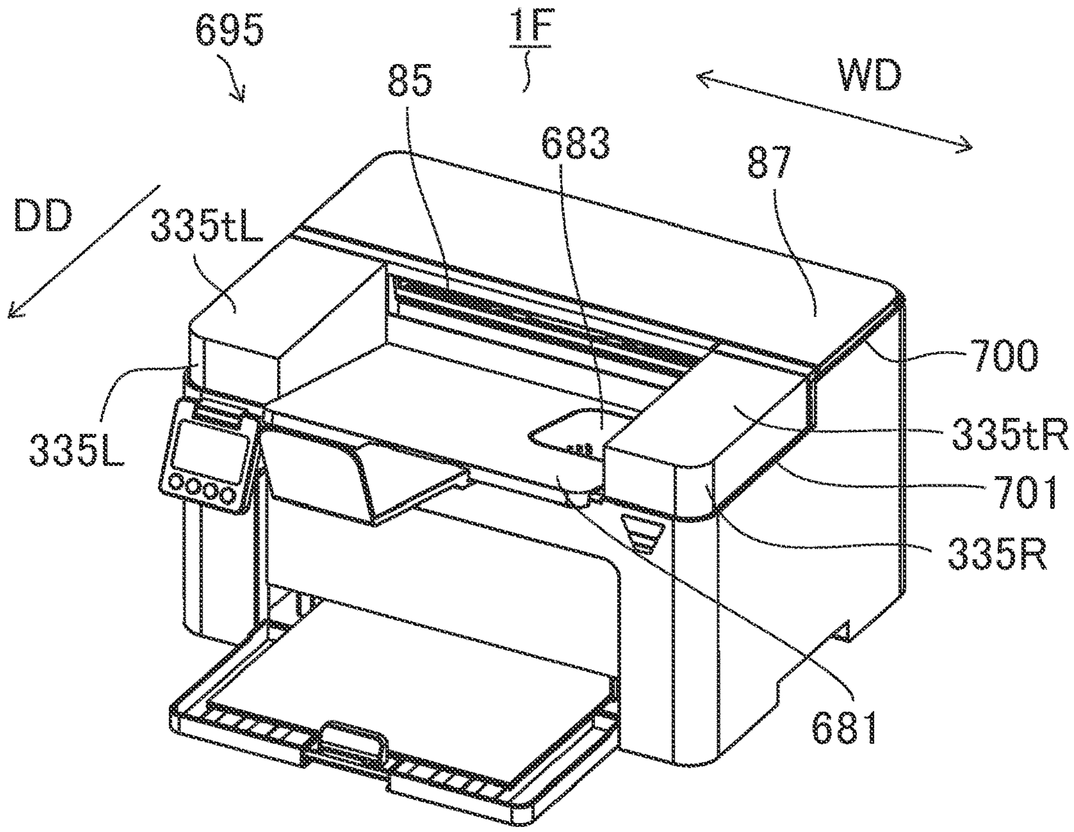
FIG. 37A is a perspective view illustrating an image forming apparatus of a sixth embodiment.
Figure 37B:
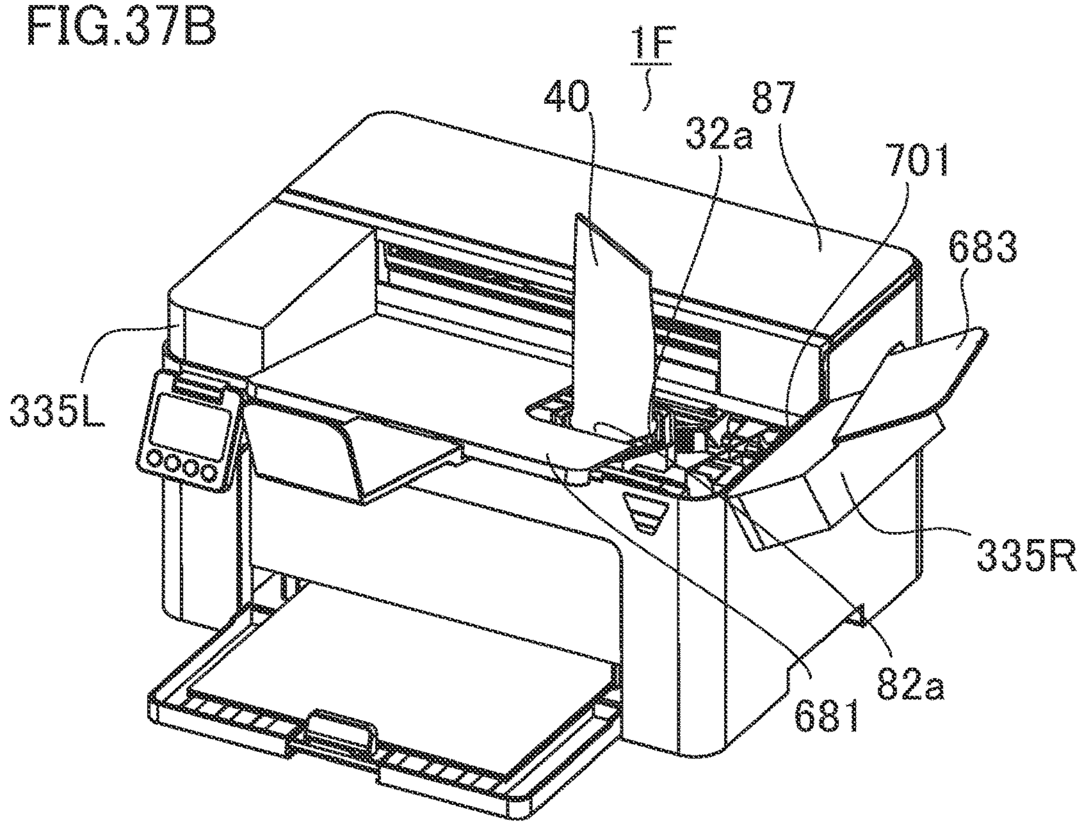
FIG. 37B is a perspective view illustrating the image forming apparatus to which the toner pack is attached.
Figure 38A:
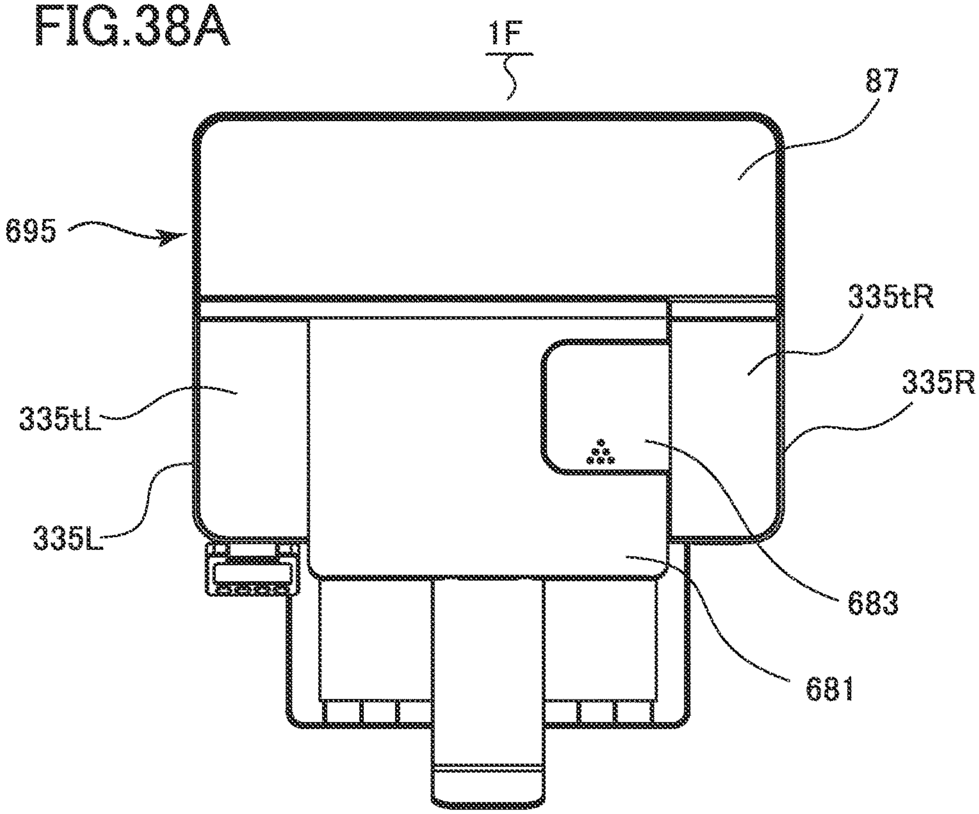
FIG. 38A is a plan view illustrating the image forming apparatus of the sixth embodiment.
Figure 38B:
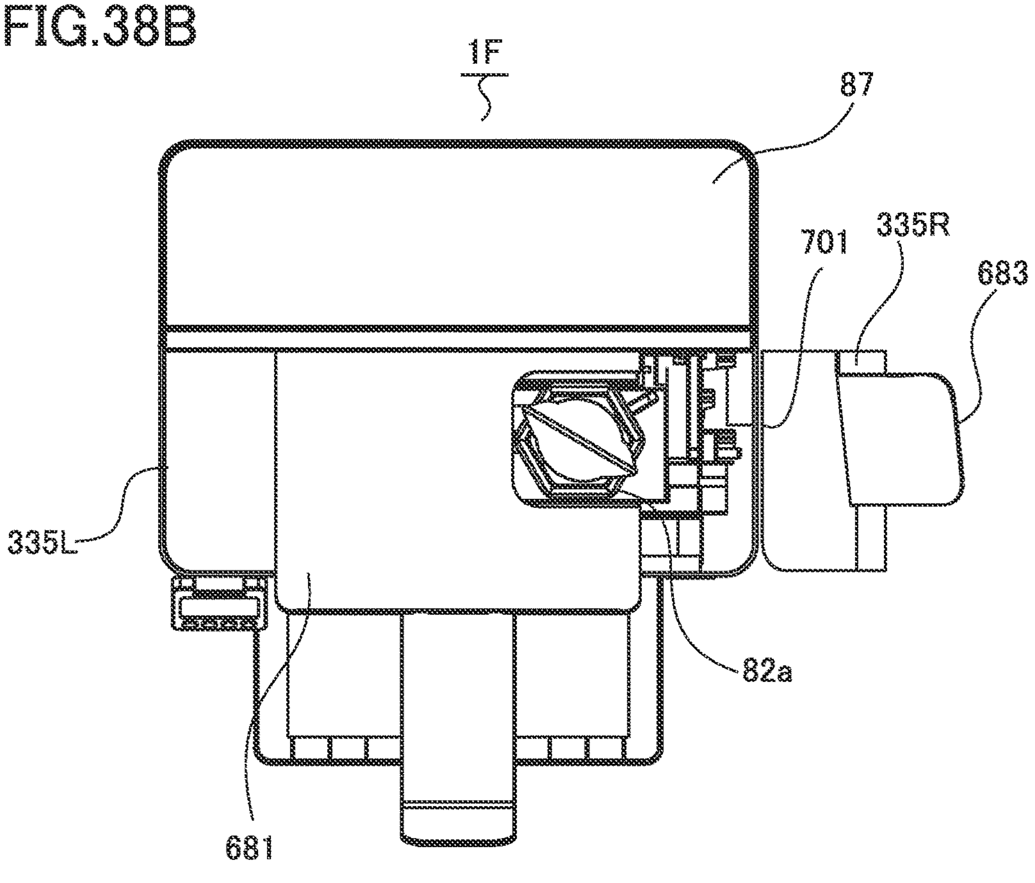
FIG. 38B is a plan view illustrating the image forming apparatus to which the toner pack is attached.
Figure 39A:
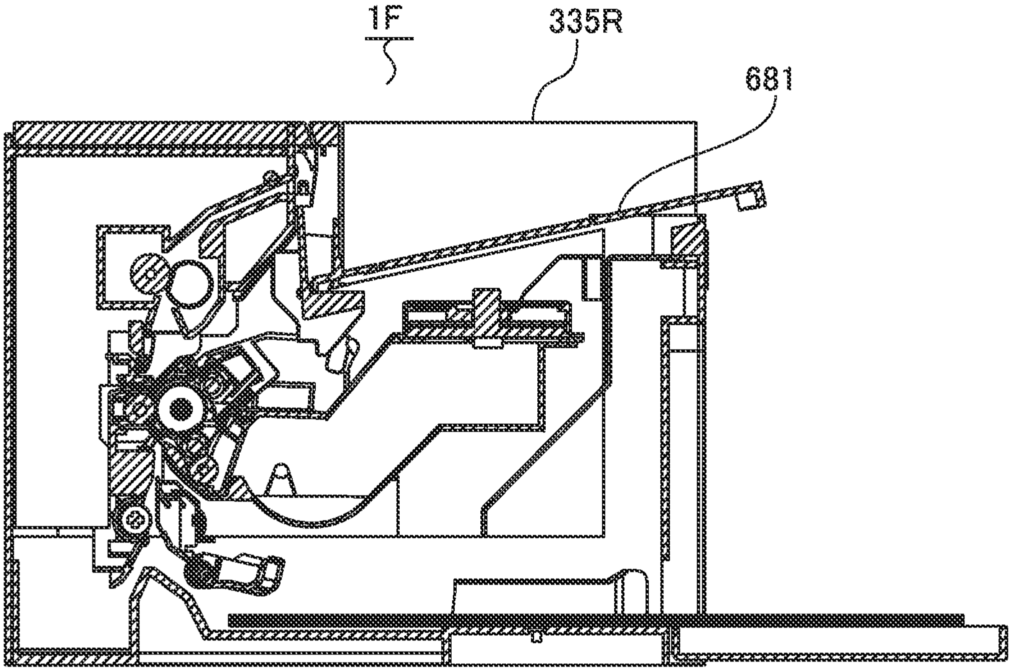
FIG. 39A is a cross-sectional view illustrating the image forming apparatus of the sixth embodiment.
Figure 39B:
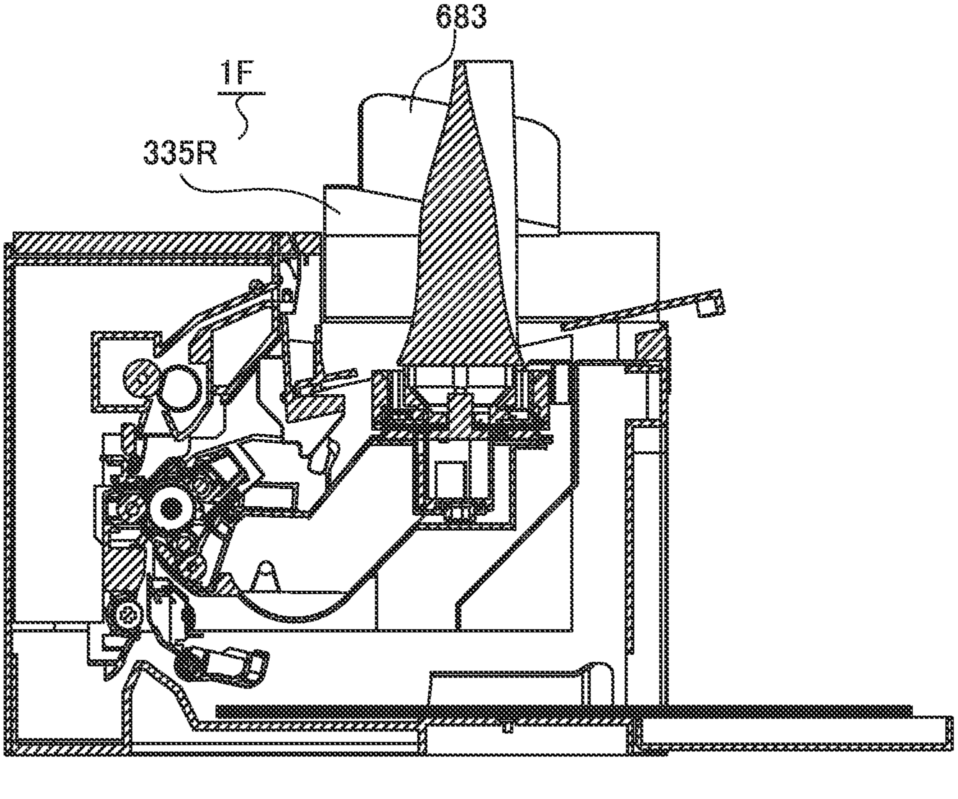
FIG. 39B is a cross-sectional view illustrating the image forming apparatus to which the toner pack is attached.

As illustrated in FIG. 36, a top surface portion 595 of an image forming apparatus 1E of the present embodiment includes a top surface 87, a first area 91, and sloped portions 593L and 593R.

The first area 91 is an area which is positioned downstream of the discharging outlet 85 in the discharging direction DD, and on which a recording material discharged from the discharging roller pair 80 (see FIG. 1) is stacked. The sloped portions 593L and 593R extend from a downstream edge portion 87*a* of the top surface 87 in the discharging direction DD, and are sloped downward m the discharging direction DD. Hereinafter, a sloped portion 593 means both of the sloped portions 593L and 593R but the sloped portion 593L means only the portion on the left side of the first area 91 and the sloped portion 593R means only the portion on the right side of the first area 91.

The sloped portion 593L is sloped such that the sloped portion 593L is equal in height to the first area 91 at a front edge portion 593*a*L, and the sloped portion 593R is sloped such that the sloped portion 593R is equal in height to the first area 91 at a front edge portion 593*a*R. The front edge portions 593*a*L and 593*a*R are positioned below the discharging outlet 85. The height of the front edge portions 593*a*L and 593*a*R is equal to the height of a broken line y illustrated in FIG. 36. Since the first area 91 is sloped upward in the discharging direction DD, a front edge portion 91*a* of the first area 91 is positioned higher than the position of the broken line y. That is, the position of the front edge portion 91*a* of the first area 91 is higher than the position of the front edge portions 593*a*L and 593*a*R of the sloped portions 593L and 593R.

Figure 40A:
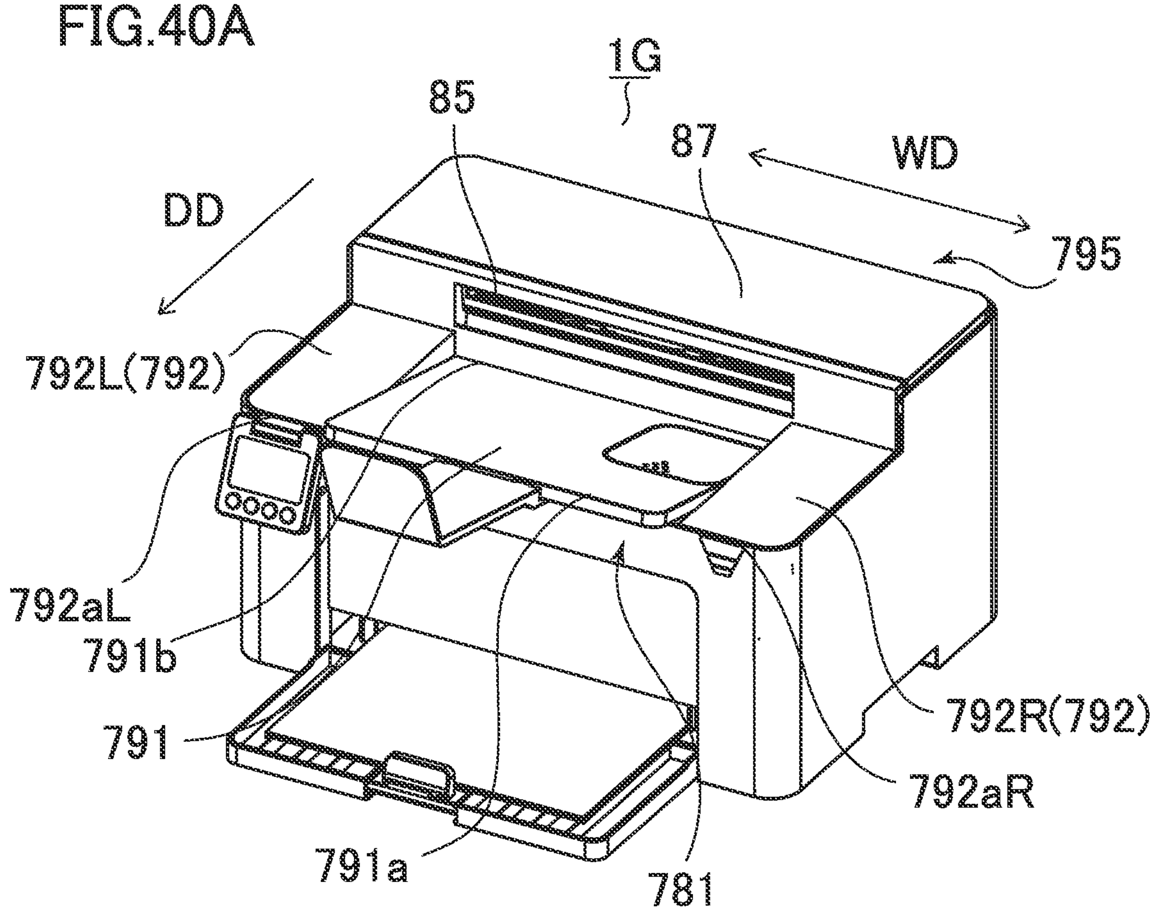
FIG. 40A is a perspective view illustrating a modification of the fifth embodiment.
Figure 40B:
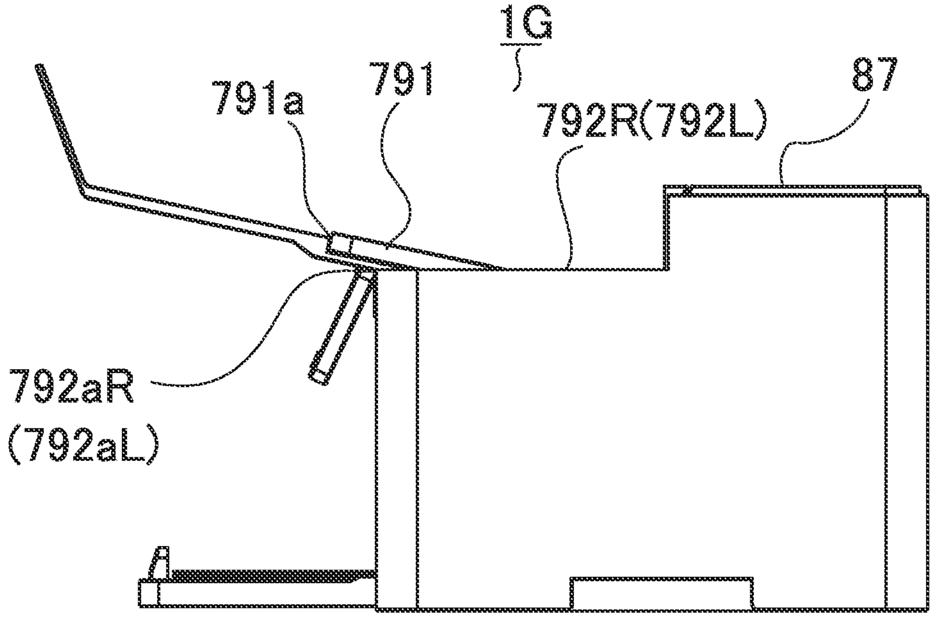
FIG. 40B is a side view illustrating the modification of the fifth embodiment.

FIG. 40A is a perspective view illustrating a modification of the fifth embodiment, and FIG. 40B is a side view illustrating the modification of the fifth embodiment. As illustrated in FIGS. 40A and 40B, a top surface portion 795 of an image forming apparatus 1G of the modification includes a top surface 87, a first area 791, and second areas 792L and 792R. A discharging tray 781 that serves as a stacking portion includes the first area 791 and the second areas 792L and 792R.

The first area 791 is an area which is positioned downstream of the discharging outlet 85 in the discharging direction DD, and on which a recording material discharged from the discharging roller pair 80 (see FIG. 1) is stacked. The second areas 792L and 792R are areas positioned downstream of the discharging outlet 85 in the discharging direction DD, and outward with respect to the discharging outlet 85 in the width direction WD. Hereinafter, a second area 792 means both of the second areas 792L and 792R, but the second area 792L means only the area on the left side of the first area 791 and the second area 792R means only the area on the right side of the first area 791.

The second area 792 extends almost horizontally, like the top surface 87. On the other hand, the first area 791 is sloped upward in the discharging direction DD. In other words, the first area 791 and the second area 792 are not parallel to each other. A rear edge portion 791*b* of the first area 791, that is, an upstream edge of the first area 791 in the discharging direction DD is positioned lower than the position of the second area 792. In addition, a front edge portion 791*a* of the first area 791, that is, a downstream edge of the first area 791 in the discharging direction DD is positioned higher than the position of the front edge portions 792*a*L and 792*a*R of the second areas 792L and 792R.

Thus, as illustrated in FIG. 40B, the first area 791 crosses the second areas 792L and 792R in a side view. Thus, at least a part of the second area 792 is positioned above the first area 791. In addition, the front edge portions 792*a*L and 792*a*R of the second areas 792L and 792R, which are downstream edges of the second areas 792L and 792R in the discharging direction DD, are positioned below the front edge portion 791*a* of the first area 791, which is a downstream edge of the first area 791 in the discharging direction DD, in a height direction.

As described above, also in the fifth embodiment and the modification of the fifth embodiment, the workability for supplying the toner to the developer container 32 and the external appearance can be improved, as in the fourth embodiment.

Sixth Embodiment

Next, a sixth embodiment of the present invention will be described. In the sixth embodiment, the exterior of the image forming apparatus of the first embodiment is changed. Thus, the same components as those of the first embodiment are omitted in the drawings, or described with the same symbols given to the drawings.

As illustrated in FIGS. 37A to 39B, an image forming apparatus 1F of the present embodiment has a discharging tray 681, which serves as a stacking surface on which a recording material discharged from the discharging outlet 85 is stacked. In addition, the image forming apparatus 1F has pillar portions 335L and 335R, formed on both sides of the discharging tray 681 in the width direction WD. The pillar portions 335L and 335R constitutes a part of the exterior of the image forming apparatus 1F, and extend upward with respect to the discharging tray 681 and the discharging outlet 85.

More specifically, a top surface portion 695 of the exterior of the image forming apparatus 1F includes a top surface 87, the discharging tray 681, a top surface 335*t*L of the pillar portion 335L, and a top surface 335*t*R of the pillar portion 335R. The top surfaces 87, 335*t*L, and 335*t*R are formed, nearly flush with each other along a horizontal plane.

Figure 24:
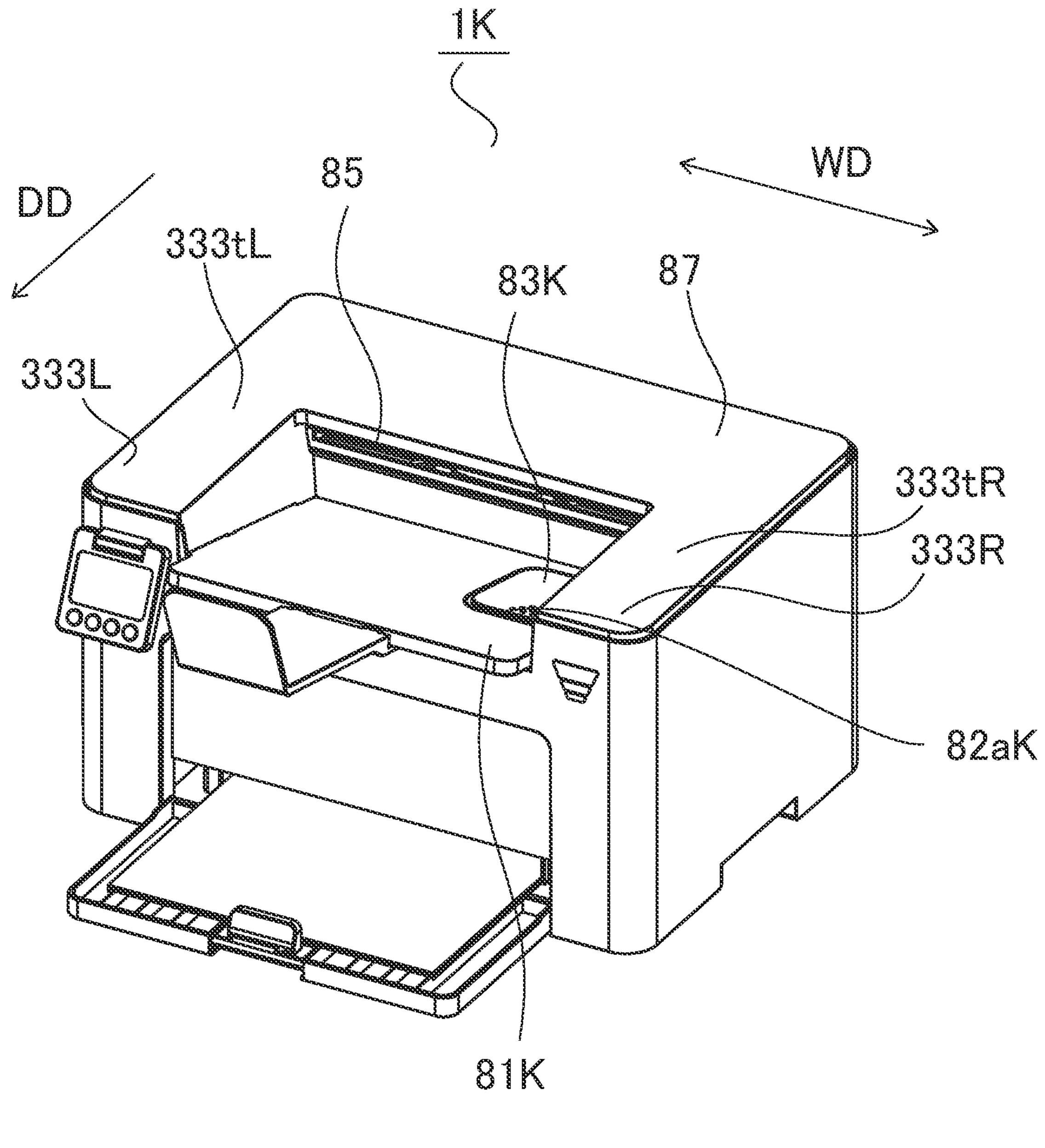
FIG. 24 is a perspective view illustrating an image forming apparatus of a comparative example.
Figure 25:
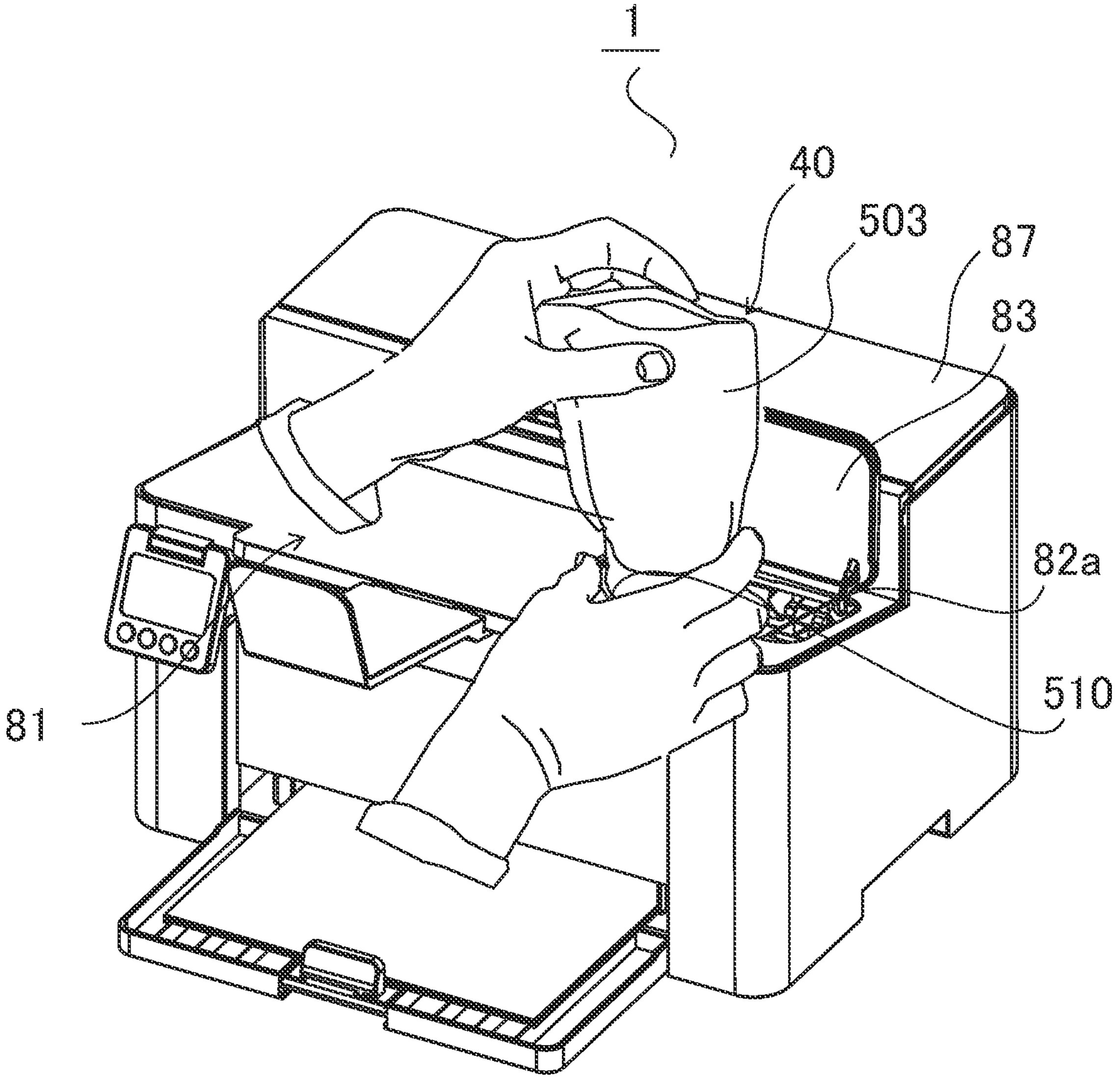
FIG. 25 is a perspective view illustrating a state in which a user is attaching the toner pack to the image forming apparatus.

As described in the comparative example with reference to FIG. 24, the supplying inlet 32*a* is disposed in the vicinity of the pillar portion 335R. Thus, when a user accesses the developer container 32 for supplying the toner, the user may feel that the work space is narrow. The supplying inlet 32*a* could be disposed in a left-side portion of the discharging tray 681. In this case, however, when the toner pack 40 is squeezed by fingers of both hands, the work space will be narrowed by the left pillar portion 335L, possibly lowering the workability. Thus, in the case where the toner pack 40 is squeezed by fingers of both hands, it is necessary to secure right and left sides of the supplying inlet 32*a* in the width direction, as work space.

Thus, in the present embodiment, the pillar portion 335R is openably supported by the housing 700 of the image forming apparatus 1F that houses the developer container 32. The pillar portion 335R that serves as a moving member includes a cover portion 683 and can be opened toward the right side, on a hinge portion 701 of the housing 700. After the pillar portion 335R is closed toward the housing 700, the cover portion 683 covers the opening portion 82*a*, which can expose the supplying inlet 32*a*. In addition, after the pillar portion 335R is closed toward the housing 700, the pillar portion 335R projects upward with respect to the discharging outlet 85. In other words, in a state where the pillar portion 335R is closed with respect to the housing 700, the top surface 335*t*R of the pillar portion 335R is located above the discharging outlet 85.

When the pillar portion 335R is opened from the housing 700 toward the right side, that is, toward a direction separating away from the supplying inlet 32*a*, the cover portion 683 opens the opening portion 82*a*, and the supplying inlet 32*a* is exposed.

As described above, in the present embodiment, when the pillar portion 335R is opened from the housing 700, the pillar portion 335R is moved away from the supplying inlet 32*a*, so that sufficient work space can be secured around the supplying inlet 32*a*. In addition, the cover portion 683 is opened together with the pillar portion 335R. Thus, since it is not necessary to individually open the pillar portion 335R and the cover portion 683, the workability can be improved.

Note that although only the pillar portion 335R can be opened from and closed toward the housing 700 in the present embodiment, the present disclosure is not limited to this. For example, the pillar portion 335L may also be opened from and closed toward the housing 700. In addition, the pillar portion 335R may not be opened and closed on the hinge portion 701. For example, the pillar portion 335R may slide, or may be removed from the housing 700.

In addition, although the cover portion 683 is integrated with the pillar portion 335R in the present embodiment, the present disclosure is not limited to this. For example, the cover portion 683 may be disposed separately from the pillar portion 335R.

In addition, although the second area is disposed on both sides of the first area in the width direction in any of the above-described embodiments, the present disclosure is not limited to this. For example, only one of the right and left second areas that is closer to the supplying inlet 32*a* may be disposed, and the other may not be disposed. As an example, in the configuration of FIG. 2 in which the second area 92R is disposed, the pillar portion 333L (see FIG. 24) described in the comparative example may be disposed instead of the second area 92L.

Figure 41A:
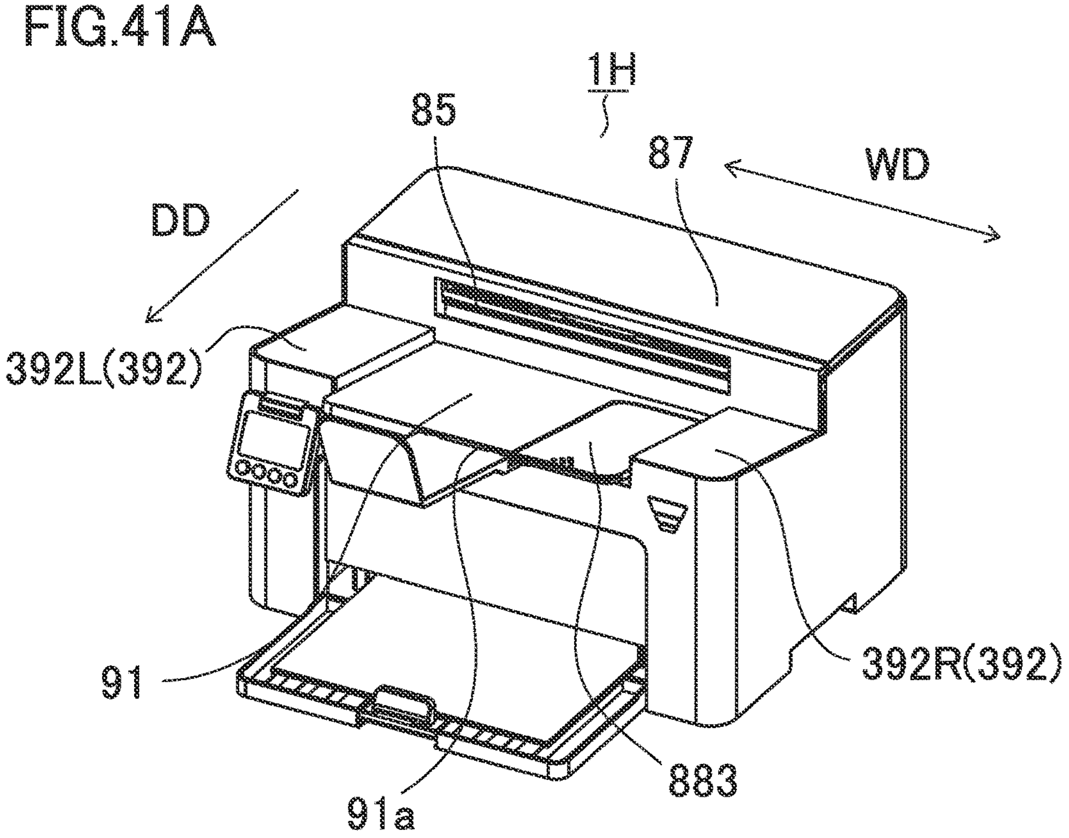
FIG. 41A is a perspective view illustrating a modification of the third embodiment.
Figure 41B:
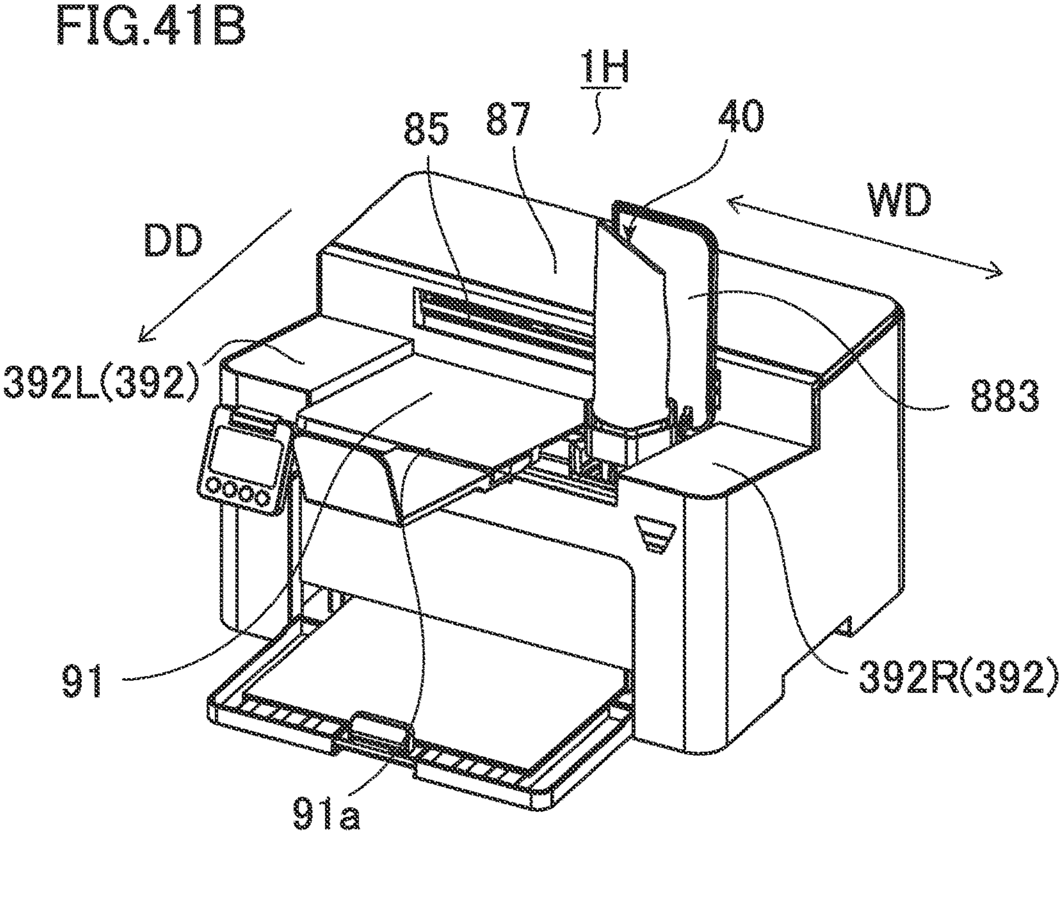
FIG. 41B is a perspective view illustrating the modification in which an opening-and-closing member is opened.

In addition, although the opening-and-closing members 83 and 383 are sized to be within the first area in any of the above-described embodiments, the present disclosure is not limited to this. For example, as illustrated in FIGS. 41A and 41B, an opening-and-closing member 883 of an image forming apparatus 1H may be sized so as to constitute a part of a front edge portion 91*a* of the first area 91. In addition, any of the above-described embodiments and modifications may be combined as appropriate.

In addition, although the recording material is discharged to the outside of the image forming apparatus by the discharging roller pair 80 in any of the above-described embodiments, the present disclosure is not limited to this. For example, the recording material may be discharged by a belt conveyance apparatus, or by comb-teeth rollers that are shifted in position from each other in the axis direction.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-020198, filed Feb. 7, 2020, and Japanese Patent Application No. 2020-070709, filed Apr. 10, 2020, which are hereby incorporated by reference herein in their entirety.

What is claimed is:

1. An image forming apparatus to which a supplying container that stores developer is configured to be detachably attached and which forms a toner image on a recording material, the image forming apparatus comprising:

a developer container comprising a storage portion and a supplying inlet, the storage portion being configured to store developer, the developer being supplied from the supplying container to the storage portion through the supplying inlet;

a discharging portion configured to discharge a recording material, onto which a toner image has been transferred, in a discharging direction;

a discharging outlet through which the recording material is discharged to an outside of the image forming apparatus by the discharging portion;

a top portion which is a part of a top surface of an exterior of the image forming apparatus, the top portion being positioned downstream of the discharging outlet in the discharging direction, and an external surface that is a part of a side surface of the exterior of the image forming apparatus, wherein the top portion comprises:

a first surface on which the recording material discharged from the discharging outlet is stacked, the first surface being configured to pivot between a closed position where the first surface covers the supplying inlet and an open position where the first surface exposes the supplying inlet; and a second surface which is positioned outward with respect to the discharging outlet in a width direction orthogonal to the discharging direction, wherein the supplying inlet is located below the first surface, wherein a downstream end of the first surface is positioned downstream of a downstream end of the second surface in the discharging direction, wherein the supplying inlet is exposed in a case where the first surface pivots from the closed position to the open position without the second surface pivoting, wherein the external surface is disposed downstream of the second surface and extends along a vertical direction and the width direction, wherein a downstream end, in the discharging direction, of the first surface is disposed downstream of the external surface in the discharging direction in a case where the first surface is positioned at the closed position, and wherein the supplying container attached to an apparatus body of the image forming apparatus hinders the first surface from pivoting from the open position to the closed position.

2. The image forming apparatus according to claim 1, wherein the developer container is configured to be supplied with the developer through the supplying inlet from an outside of the image forming apparatus in a state where the supplying container is attached to an apparatus body of the image forming apparatus.

3. The image forming apparatus according to claim 2, further comprising a third surface that is a part of the top surface of the exterior of the image forming apparatus, and that is disposed above the discharging outlet.

4. The image forming apparatus according to claim 2, wherein an operation portion which is configured to be operated to supply the developer through the supplying inlet from the supplying container to the developer container is located below the first surface in a state where the supplying container is attached to the apparatus body of the image forming apparatus.

5. The image forming apparatus according to claim 1, wherein the first surface covers a part of the discharging outlet at the open position.

6. The image forming apparatus according to claim 1, wherein the first surface pivots around a pivot axis disposed in an upstream side of the first surface in the discharging direction.

7. The image forming apparatus according to claim 1, wherein a downstream end, in the discharging direction, of the first surface is higher than the second surface in a case where the first surface is positioned at the closed position.

8. The image forming apparatus according to claim 1, wherein the first surface is inclined upward toward a downstream end thereof in the discharging direction in a case where the first surface is positioned at the closed position.

9. The image forming apparatus according to claim 1, wherein all of the second surface is disposed downstream of the discharging outlet in the discharging direction and disposed above the first surface positioned at the closed position.

10. The image forming apparatus according to claim 1, wherein the first surface and the second surface do not overlap each other in the width direction.

11. The image forming apparatus according to claim 1, wherein the supplying container is configured such that a longitudinal direction thereof is along the vertical direction in a case where the supplying container is attached to an apparatus body of the image forming apparatus, and wherein all of the supplying container attached to the apparatus body is disposed on a same side as the second surface with respect to a center of the image forming apparatus in the width direction.

* * * * *